(12) United States Patent
Hosoya et al.

(10) Patent No.: US 8,016,490 B2
(45) Date of Patent: Sep. 13, 2011

(54) THIN-WALL BEARING

(75) Inventors: Masachi Hosoya, Fujisawa (JP);
Toshiaki Yamaguchi, Maebashi (JP);
Tsuyoshi Saitou, Chigasaki (JP);
Hiroyuki Itou, Chigasaki (JP); Yasushi Tomizuka, Yokohama (JP); Toyohisa Yamamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 986 days.

(21) Appl. No.: 11/665,682

(22) PCT Filed: Jan. 31, 2006

(86) PCT No.: PCT/JP2006/301561
§ 371 (c)(1),
(2), (4) Date: Apr. 17, 2007

(87) PCT Pub. No.: WO2006/080527
PCT Pub. Date: Aug. 3, 2006

(65) Prior Publication Data
US 2007/0297705 A1    Dec. 27, 2007

(30) Foreign Application Priority Data

Jan. 31, 2005   (JP) ................. 2005-023488
May 20, 2005   (JP) ................. 2005-148101
Aug. 23, 2005   (JP) ................. 2005-241286
Jan. 23, 2006   (JP) ................. 2006-014222

(51) Int. Cl.
*F16C 33/42*   (2006.01)
*F16C 19/06*   (2006.01)

(52) U.S. Cl. ......... 384/531; 384/450; 384/462; 384/527

(58) Field of Classification Search .................. 384/450, 384/462, 470, 492, 523, 527, 526, 531; 29/898.067
See application file for complete search history.

(56) References Cited

U.S. PATENT DOCUMENTS

| 4,126,362 | A  | * | 11/1978 | Hamblin et al. | ............. 384/526 |
| 5,082,375 | A  | * | 1/1992  | Hillmann       | ............. 384/526 |
| 6,121,208 | A  |   | 9/2000  | Toyota         |                       |
| 6,352,371 | B1 | * | 3/2002  | Goto et al.    | ............. 384/470 |
| 6,450,692 | B2 |   | 9/2002  | Toyota         |                       |
| 6,464,397 | B2 | * | 10/2002 | Kobayashi      | ............. 384/450 |

(Continued)

FOREIGN PATENT DOCUMENTS

DE    1234455 B   *   2/1967

(Continued)

OTHER PUBLICATIONS

International Search Report dated Mar. 20, 2006 with an English translation of the pertinent portions (Six (6) pages).

(Continued)

*Primary Examiner* — Marcus Charles
(74) *Attorney, Agent, or Firm* — Crowell & Moring LLP

(57) ABSTRACT

A thin-wall bearing, comprising a retainer (4) formed in a divided type having a plurality of resin plate-like members (5), (5), ... curved along an inner ring (1) and an outer ring (2). The retainer (4) comprises pockets (6) opening to the axial end part thereof and rollingly holding balls (3). Slit-like through holes (14) extending in the axial direction and opening to the axial end part where the opening parts (7) of the pockets (6) are positioned are formed at the center parts of pillars (10) between the pockets (6) and (6) adjacent to each other. As a result, the thin-wall bearing can have excellent lubricity.

6 Claims, 33 Drawing Sheets

U.S. PATENT DOCUMENTS

| | | | |
|---|---|---|---|
| 6,843,604 B2 * | 1/2005 | Hiramatsu | 384/523 |
| 2003/0235367 A1 | 12/2003 | Yamazaki | |
| 2006/0008192 A1 * | 1/2006 | Sekimoto et al. | 384/523 |

FOREIGN PATENT DOCUMENTS

| | | | | |
|---|---|---|---|---|
| DE | 2416282 A | * | 10/1975 | |
| DE | 19904658 A1 | * | 8/1999 | |
| JP | 62-246621 A | | 10/1987 | |
| JP | 01-284542 | | 11/1989 | |
| JP | 05-240257 | | 9/1993 | |
| JP | 07-332361 | | 12/1995 | |
| JP | 8-152025 A | | 6/1996 | |
| JP | 08184318 A | * | 7/1996 | |
| JP | 10-9270 A | | 1/1998 | |
| JP | 11-51066 A | | 2/1999 | |
| JP | 11-158630 | | 6/1999 | |
| JP | 2001-072987 A | | 3/2001 | |
| JP | 2001-173667 A | | 6/2001 | |
| JP | 2002-020775 | | 1/2002 | |
| JP | 2002-339979 | | 11/2002 | |
| JP | 2002-339979 A | | 11/2002 | |
| JP | 2002339981 A | * | 11/2002 | |
| JP | 2002-357225 A | | 12/2002 | |
| JP | 2003-13974 A | | 1/2003 | |
| JP | 2003-314572 A | | 11/2003 | |
| JP | 2003-329049 A | | 11/2003 | |
| JP | 2004-19921 A | | 1/2004 | |
| JP | 2004-019922 | | 1/2004 | |
| JP | 2004-043537 | | 2/2004 | |
| JP | 2004-347025 A | | 12/2004 | |
| JP | 2005-036959 A | | 2/2005 | |
| JP | 2005069266 A | * | 3/2005 | |
| JP | 2005-240257 A | | 9/2005 | |
| JP | 2005-351443 A | | 12/2005 | |
| JP | 2006-046531 A | | 2/2006 | |

OTHER PUBLICATIONS

International Preliminary Report on Patentability w/English translation.

Decision for Dismissal of Amendment in Japanese Patent Application No. JP 2007-500650 dated Aug. 10, 2010.

Japanese Office Action dated May 18, 2010 including English-language translation (Six (6) pages).

* cited by examiner

PRIOR ART

PRIOR ART

PRIOR ART

PRIOR ART

PRIOR ART

F I G. 45
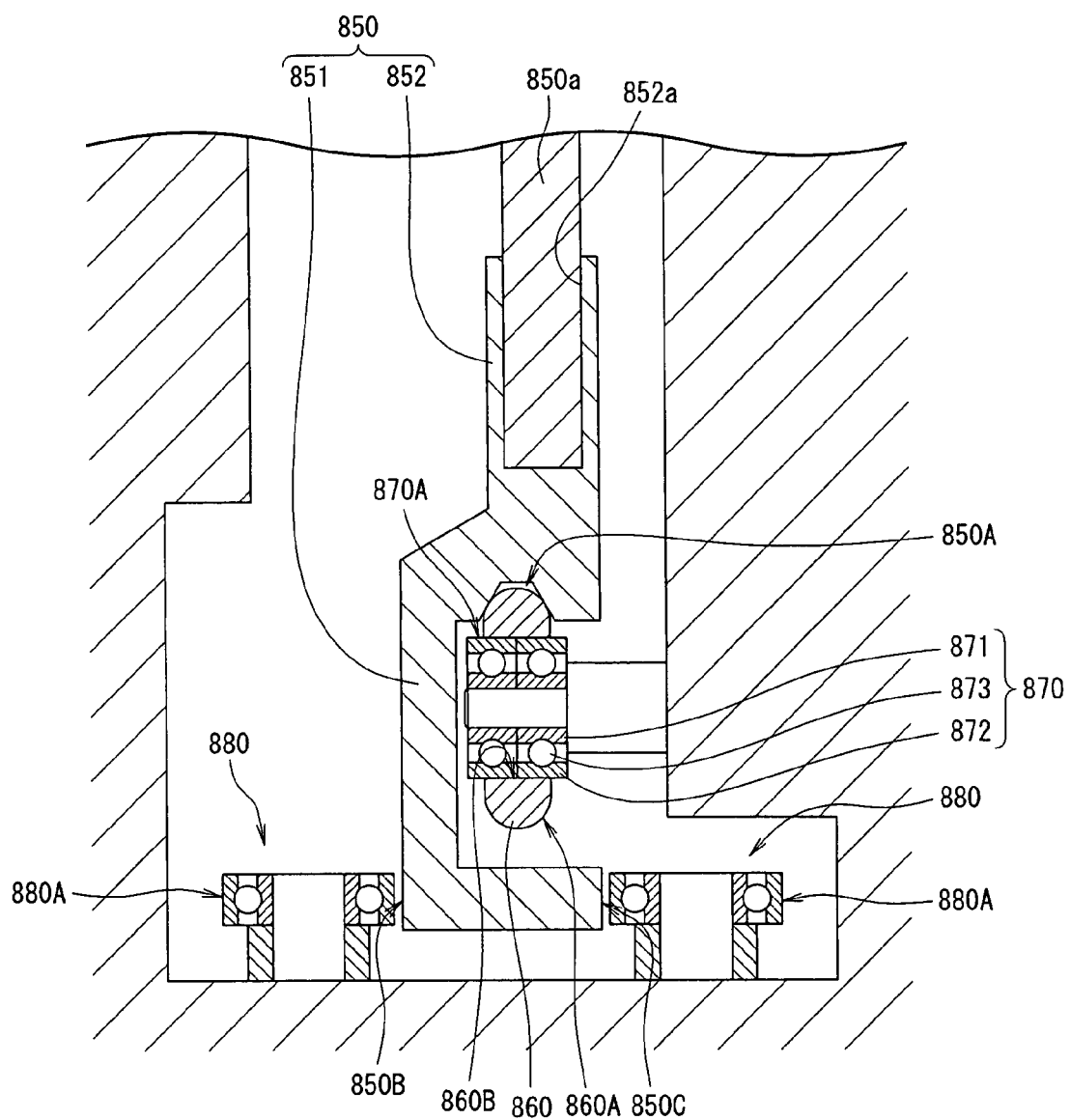

THIN-WALL BEARING

BACKGROUND ART

Field of the Invention

The present invention concerns a thin-wall bearing.

A thin-wall bearing is used, for example, in manipulators for use in semiconductor production apparatus and since the manipulators are usually used in a vacuum circumstance, the thin-wall bearing is also adapted to a vacuum specification. For example, an inner ring and an outer ring are constituted with martensitic stainless steel such as SUS440C, a rolling member is constituted with martensitic stainless steel such as SUS440C or ceramics such as silicon nitride or silicon carbide, and a cage is constituted with brass, SUS304, SUS316, etc. Then, fluoro-grease is used as a lubricant and, particularly in a circumstance in which release of an outgas is not preferred, a lubrication film containing a fluorine-containing polymer having functional groups and a fluoro-oil, or a lubrication film containing a lubricant oil comprising an alkylated cyclopentane or polyphenyl ether as a main ingredient and a fluoro-resin is suitable.

The thin-wall bearing is a bearing having a larger inner diameter compared with a thickness and a rolling bearing satisfying the following formula is defined as the thin-wall bearing in the invention. In the following formula, D is an outer diameter and d is an inner diameter.

$$(D-d)/d \leq 0.187$$

As a cage for such a thin-wall bearing, for attaching a cage after assembling rolling elements between inner and outer rings, a ring-like cage 101 having openings 104 at the axial end each for inserting a rolling element (ball) 102 into a pocket 103 is generally used (refer to FIGS. 7 to 9). The opening width of the opening 104 is made smaller than the diameter of the rolling member 102 and disposed with a so-called "snap-fit part" and, when the rolling element 102 is inserted to the pocket 103, the rolling element 102 passes the opening 104 while elastically enlarging the opening 104 (refer to FIG. 8). After insertion, the opening 104 elastically resumes the original state (refer to FIG. 9). For detaching the rolling element 102 inserted in the pocket 103 out of the cage 101, it is necessary that the rolling element 102 passes therethrough while elastically enlarging the opening 104, the rolling element 102 is not easily detached in its nature from the cage 101.

However, in the case of the thin-wall bearing, since the rolling element tends to be detached from the pocket of the cage when the cage is made of a metal, a resin cage has often been used for suppressing this. A reason why the rolling element tends to be detached from the pocket of the cage when the cage is made of the metal is to be described.

In the thin-wall bearing, since the thickness of the bearing is thin, the diameter of the rolling element is smaller compared with the case of general bearings. However, since a load has to be received by the rolling element of the small diameter, the number of the rolling elements has to be increased. During rotation of the bearing, respective rolling elements are usually in various states of motion and sometimes plural rolling elements push against each other while sandwiching a cage bar presents therebetween on both sides. In this case, the cage is urged to the inner and the outer rings by the rolling elements in motion and, in a case where the number of the rolling elements pushing to each other is large, portions in sliding movement being urged to the inner and outer rings are increased. Then, since the frictional force of the sliding movement increases and the cage can no more follow the revolution of the rolling elements, to result in a phenomenon that the rolling elements are detached out of the pockets and the cage springs up from the bearing.

In the cage made of a resin, since the cage locally deforms to absorb energy even when it can no more follow after the revolution of the rolling elements, it causes less phenomenon that the rolling element is detached out of the pocket and the cage springs up from the bearing when compared with a metal cage.

In view of the above, while resin cages are often used for the thin-wall bearings, they involve the following problems. That is, while the resin cage is manufactured by injection molding, since a number of thin-wall bearings of different types and sizes are present, manufacture of dies on every bearings is impossible in view of the cost.

Then, in order to solve such a problem, the following method has been adopted. This is a method of bending a plate-like member 201 made of a resin having pockets 203 capable of rollingly retaining rolling elements so as to conform an inner ring and an outer ring, arranging plural bent plate-like members 201 along the inner ring and the outer ring and causing the plural plate-like member 201 arranged circularly to operate in the same manner as the circular cage as shown in FIG. 7 (refer to FIG. 10). Further, there is also a method of constituting a cage by circularly bending a single long plate-like member 301 (refer to FIG. 11). In subsequent descriptions, a cage constituted by arranging plural plate-like members in a circular shape and a cage constituted from a single plate-like member bent into a circular shape as shown in FIGS. 10 and 11 are sometimes referred to as "divisional cage".

According to the method described above, since it may suffice to prepare a single type of plate-like member by injection molding or compression molding and use a preferred number of plate-like members conforming the type and the size of the thin-wall bearing, it is not necessary to manufacture dies on every bearings, which is advantageous in view of the cost. Further, the plate-like member described above can be manufactured also by preparing a long band-like member by injection molding or compression molding and cutting the same.

As can be seen from FIG. 12 (upper view is a perspective view of a cage and a lower view is an end face view of the cage as observed on the axial side where the opening 404 is situated), a pillar 410 between adjacent pockets 403 is laterally enlarged toward the axial end on the side where the opening 404 situates for providing "snap-fit part". When the cage 401 is taken out of a die after molding, the wide portion 412 sometimes springs back and the circumferential end 412a of the wide portion 412 deforms to protrude in the radial outward of the cage 401 (a portion deformed so as to protrude is sometimes referred to as "protruded deformation part" in the subsequent description).

This is caused because the circumferential ends 412a, 412a pull to each other by the tensile strength remaining in the wide portion 412. Particularly, in a case of a divisional cage, since the plate-like member is bent by heating being placed in a die, spring back tends to be caused in the wide portion.

During rotation of the thin-wall bearing, while the outer diametrical surface of the cage is in sliding movement with the outer ring, when deformation is caused to the circumferential end of the wide portion by spring back, the protruded deformation part is worn by sliding movement with the outer ring to result in an abrasion powder. Then, since the abrasion powder absorbs a base oil of a lubricant, the lubricity of the thin-wall bearing may possibly be lowered.

Further, as shown in FIG. 13, in a case of using the divisional cage, the circumferential end of the plate-like member 421 moves slidably in contact with the inner ring 422 or the outer ring 423 during rotation of the thin-wall bearing.

Since a corner is present at the circumferential end of the plate-like member 421, and the corner is in contact with the inner ring 422 or the outer ring 423, the surface pressure increases and the circumferential end of the plate-like member 421 is easily worn to result in an abrasion powder. Since the generated abrasion powder absorbs the base oil of the lubricant, this may possibly deteriorate the lubricity of the thin-wall bearing.

In view of the above, the present invention has a subject of solving the problems in the prior art as described above and providing a thin-wall bearing of favorable lubricity.

DISCLOSURE OF THE INVENTION

For solving the subject described above, the present invention comprises the following constitution. That is, a thin-wall bearing of the invention has an inner ring, an outer ring, a plurality of rolling elements disposed rollingly between the inner ring and the outer ring, and a cage made of resin having pockets each opened to an axial end and rollingly retaining the rolling elements and satisfying the following formula in which a through hole is formed in a cage bar:

$$(D-d)/d \leqq 0.187$$

In the formula, D is a bearing outer diameter and d is a bearing inner diameter.

The through hole is preferably in a slit-like shape. Further, the through hole is preferably a hole opened in the axial end, or a bore hole not opened to the axial end. Further, the cage is preferably constituted with one or more plate-like members disposed circularly along the inner ring and the outer ring. The plate-like member is preferably formed with a chamfered portion at the circumferential end. Further, it is preferred that the plate-like member is preferably disposed with both plate surfaces being directed to the inner ring and the outer ring respectively, and the chamfered portion is formed such that the thickness of the plate-like member is gradually reduced toward the circumferential end. Then, the chamfered portion is preferably a curved surface shape or a planar shape.

Further, it is preferred that the corner formed at the boundary between the circumferential end face and the chamfered portion of the plate-like member is not in contact with the inner ring and the outer ring, and a corner or the chamfered portion formed at the boundary between the plate surface and the chamfered portion of the plate-like member is in contact with the inner ring or the outer ring.

Further, at least one of the raceway surface of the inner ring, the raceway surface of the outer ring and the rolling contact surface of the rolling element may be covered with at least one of the following three types of lubrication films.

(1) A lubrication film containing a fluorine-containing polymer having functional groups and a perfluoro polyether (2) A lubrication film containing a fluorine-containing polymer having functional groups, a perfluoro polyether and a fluoro resin (3) A lubrication film containing a lubricant oil comprising an alkylated cyclopentane or a polyphenyl ether as a main ingredient and a fluoro resin Further, the thin-wall bearing of the invention has a feature in a thin-wall bearing having an inner ring, an outer ring, a plurality of rolling elements disposed rollingly between the inner ring and the outer ring, and a cage having a pockets for rollingly retaining the rolling elements, in which the cage is constituted with one or more resin plate-like members disposed circularly along the inner ring and the outer ring and satisfying the following formula in that a chamfered portion is formed to the circumferential end of the plate-like member.

$$(D-d)/d \leqq 0.187$$

In the formula, D is a bearing outer diameter and d is a bearing inner diameter.

The plate-like member is disposed with both of the plate surfaces being directed to the inner ring and the outer ring respectively and the chamfered portion is formed such that the thickness of the plate-like member is gradually reduced toward the circumferential end. Then, the chamfered portion is preferably in a curved surface shape or planar shape.

Further, it is preferred that the corner formed at the boundary between the circumferential end face and the chamfered portion of the plate-like member is not in contact with the inner ring and the outer ring, and a corner or the chamfered portion formed at the boundary between the plate surface and the chamfered portion of the plate-like member is in contact with the inner ring or the outer ring.

Further, at least one of the raceway surface of the inner ring, the raceway surface of the outer ring and the rolling contact surface of the rolling element may be covered with at least one of the following three types of lubrication films.

(1) A lubrication film containing a fluorine-containing polymer having functional groups and a perfluoro polyether (2) A lubrication film containing a fluorine-containing polymer having functional groups, a perfluoro polyether and a fluoro resin (3) A lubrication film containing a lubricant oil comprising an alkylated cyclopentane or a polyphenyl ether as a main ingredient and a fluoro resin

BRIEF EXPLANATION OF THE DRAWINGS

FIG. 45 is a view showing a vacuum conveying device as an example of the rolling support device of the Sixth Embodiment.

BEST MODE FOR PRACTICING THE INVENTION

First Embodiment

Figure 1:
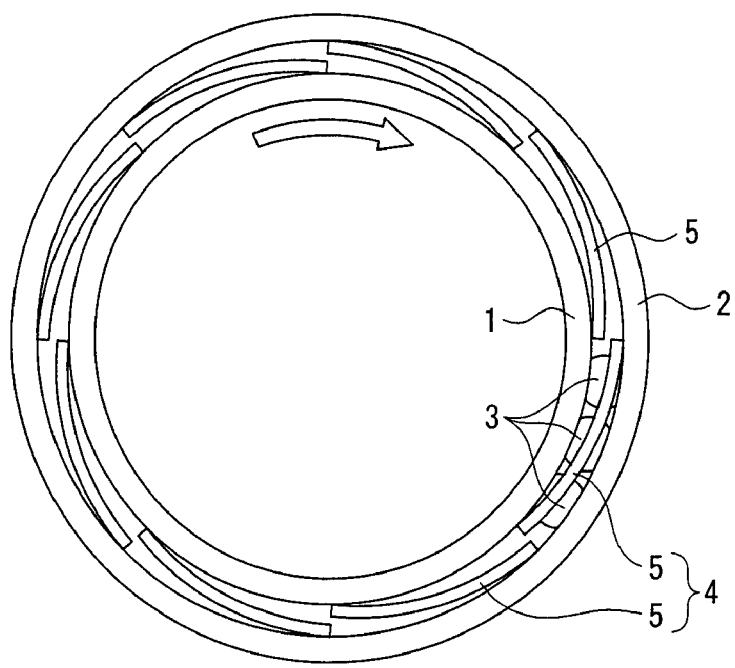
FIG. 1 is a front elevational view for explaining structure of a thin-wall bearing of a First Embodiment.
Figure 2:
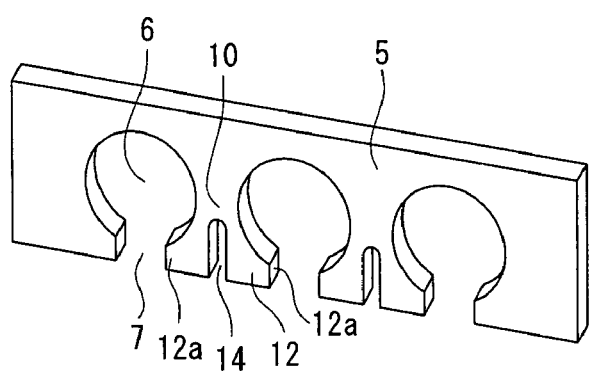
FIG. 2 is a perspective view showing the structure of a plate-like member.

An embodiment of a thin-wall bearing according to the present invention is to be described in details with reference to the drawings. FIG. 1 is a front elevational view showing the structure of a thin-wall bearing of the embodiment and FIG. 2 is a perspective view showing the structure of a plate-like member.

A thin-wall bearing in FIG. 1 has an inner ring 1, an outer ring 2, a plurality of balls 3 (only a portion is illustrated) disposed rollingly between the inner ring 1 and the outer ring 2, a cage 4 for rollingly retaining the balls 3, and a lubricant (not illustrated) such as a lubrication oil or grease in which the inner diameter d and the outer diameter D satisfy the following formula:

$$(D-d)/d \leq 0.187$$

The cage 4 is a divisional cage having pockets 6 capable of retaining balls 3 rollingly, and constituted with plural plate-like members 5, 5, - - - made of a resin (by the number of 8 in the illustrated example) which is bent so as to cope with the inner ring 1 and the outer ring 2. That is, the plate-like members 5, 5, - - - disposed with both plate surfaces being directed to the inner ring 1 and the outer ring 2 respectively and arranged circularly along the inner ring 1 and the outer ring 2 act in the same manner as a cage comprising an integral circular member.

Figure 11:
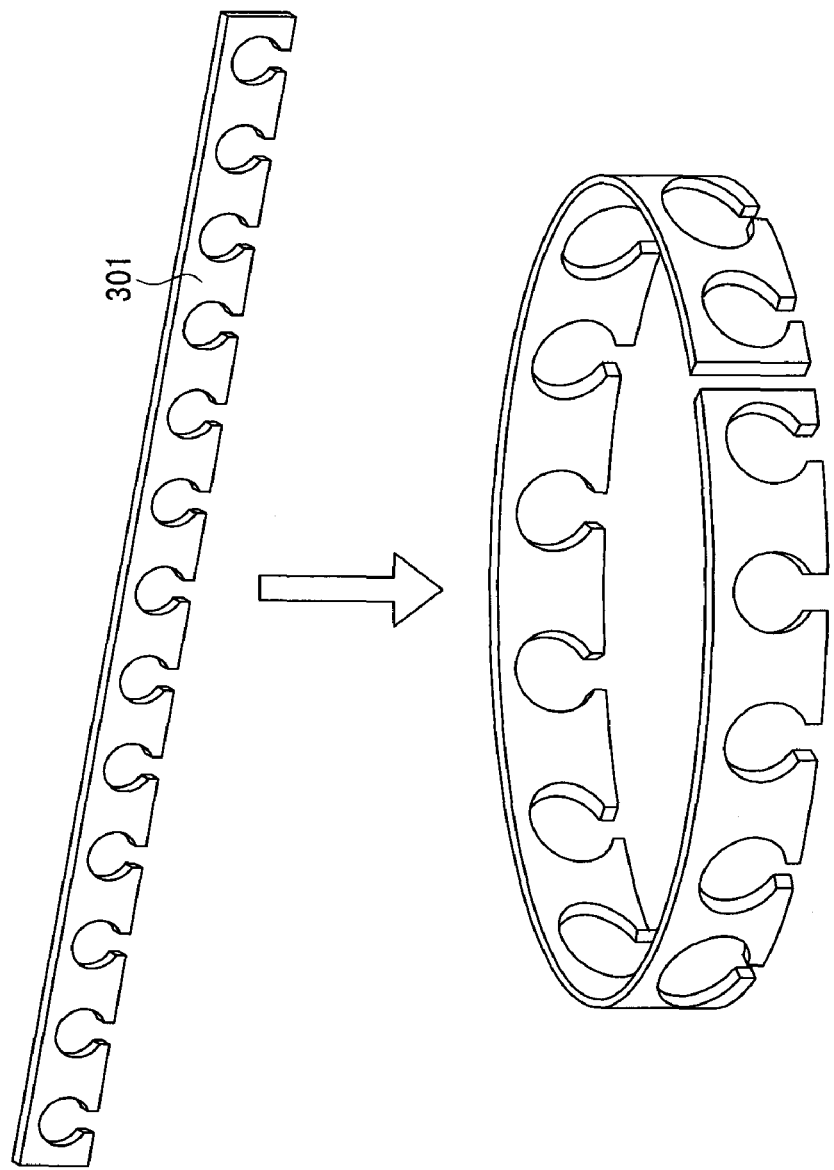
FIG. 11 is a perspective view showing an existent divisional cage.
Figure 12:
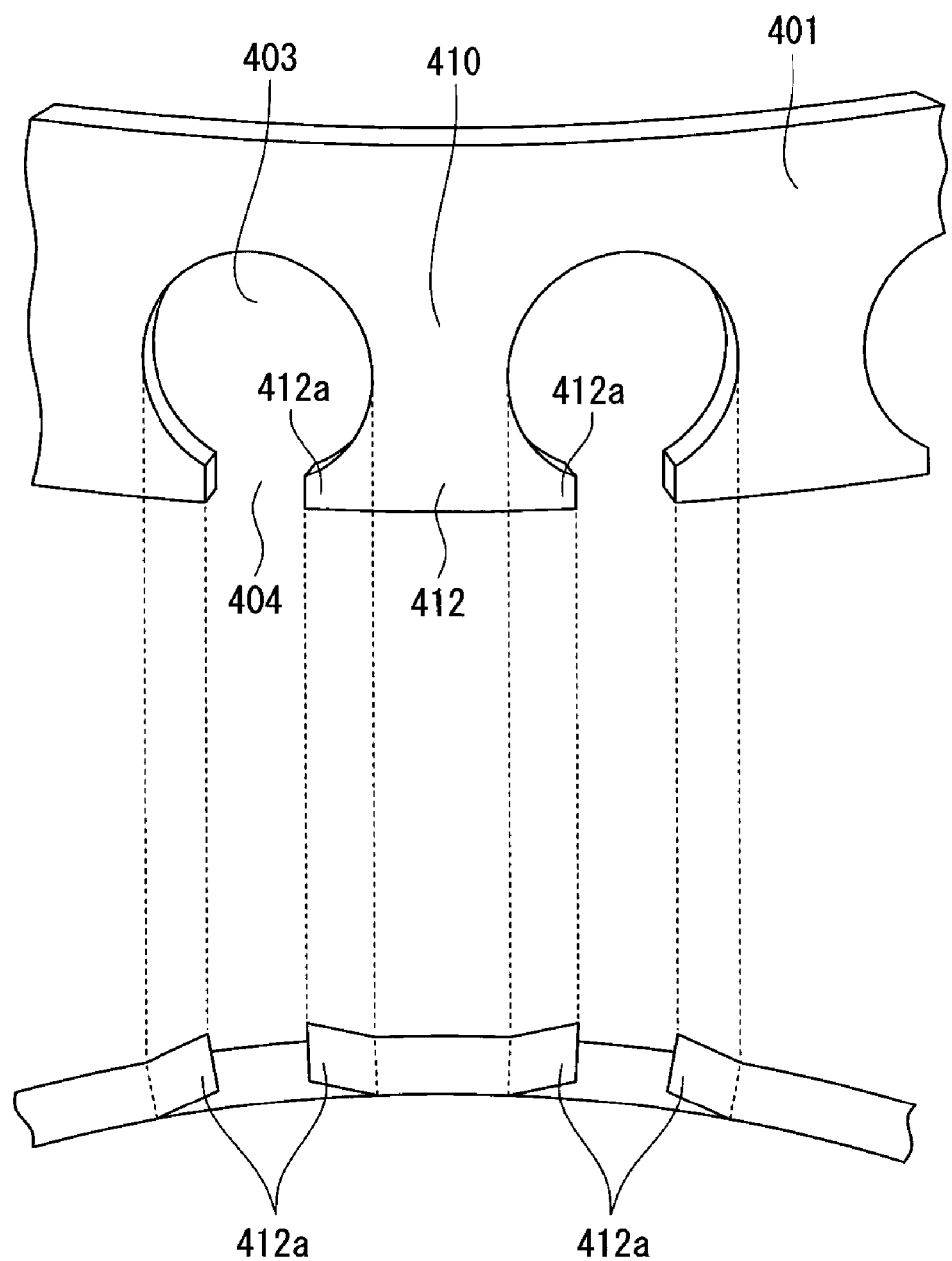
FIG. 12 is a perspective view and an end face view explaining a portion near the cage bar of an existent cage.
Figure 13:
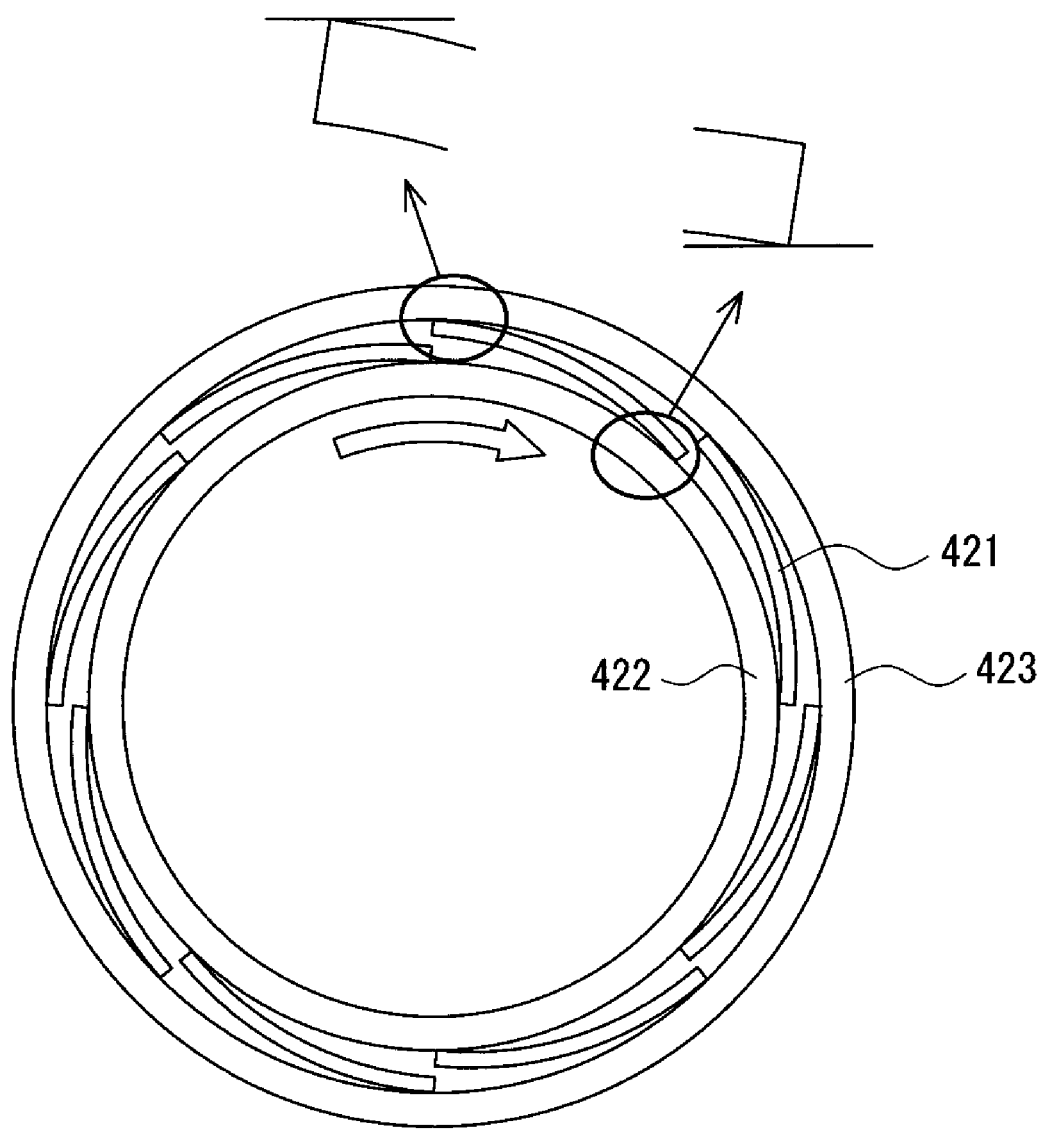
FIG. 13 is view showing the state where the corner at the circumferential end of the plate-like member is in contact with an inner ring and an outer ring during rotation of the thin-wall bearing.

The circumferential length and the number of use of the plate-like member 5 are not particularly restricted, and the circumferential length and the number of use may be set such that the sum for the circumferential length of all of the plate-like members 5, 5, - - - is substantially equal with the circumferential length of the thin-wall bearing and almost of the balls 3 can be retained in the pockets 6. So long as the conditions described above can be satisfied, the number of use of the plate-like member 5 may be one (that is, it may be one as shown in FIG. 11 described above). Further, for the thin-wall bearing of this embodiment, a circular cage comprising a single circular member may also be used instead of the divisional cage.

An opening 7 for inserting the ball 3 into the pocket 6 is disposed to the axial end of the plate-like member 5. The open width of the opening 7 is smaller than the diameter of the ball 3 being provided with a so-called snap fit portion. Upon insertion of the ball 3 into the pocket 6, the ball 3 elastically enlarges the opening 7 to thereby pass through the opening 7. After insertion of the ball 3, the opening 7 elastically restores the original state. Further, as can be seen from FIG. 3 (the upper view is a perspective view for a cage and the lower view is an end face view of the cage as observed on the axial side where the opening 7 is situated), a pillar 10 between adjacent pockets 6, 6, enlarges in view of the width toward the axial end on the side where the opening 7 situates for providing the snap fit portion (wide portion 12). Then, a slit-like (elongate) through hole 14 that extends in the axial direction and opens at the axial end on the side where the opening 7 is situated is formed.

Upon manufacture of the cage 4, when the cage 4 is taken out of a die after resin molding, the wide portion 12 springs back and circumferential ends 12a, 12a of the wide portion 12 sometimes deform so as to protrude radially outward of the cage 4. Particularly, in a divisional cage, since the plate-like member 5 is bent by heating being put in a die, the wide portion 12 tends to spring back more than the cage comprising an integral circular member.

However, in a case of the cage 4 of this embodiment, since the through hole 14 is formed in the pillar 10, and the tensile stress remaining in the wide portion 12 is separated by the through hole 14 and the circumferential ends 12a, 12a do not pull to each other, spring back is less caused in the wide portion 12. Accordingly, since a protruded deformation portion is scarcely caused (refer to the end face view in FIG. 3), generation of abrasion powder due to wear of the circumferential end 12a of the wide portion 12 is suppressed and, as a result, excellent lubricity of the thin-wall bearing can be maintained easily.

Figure 3:
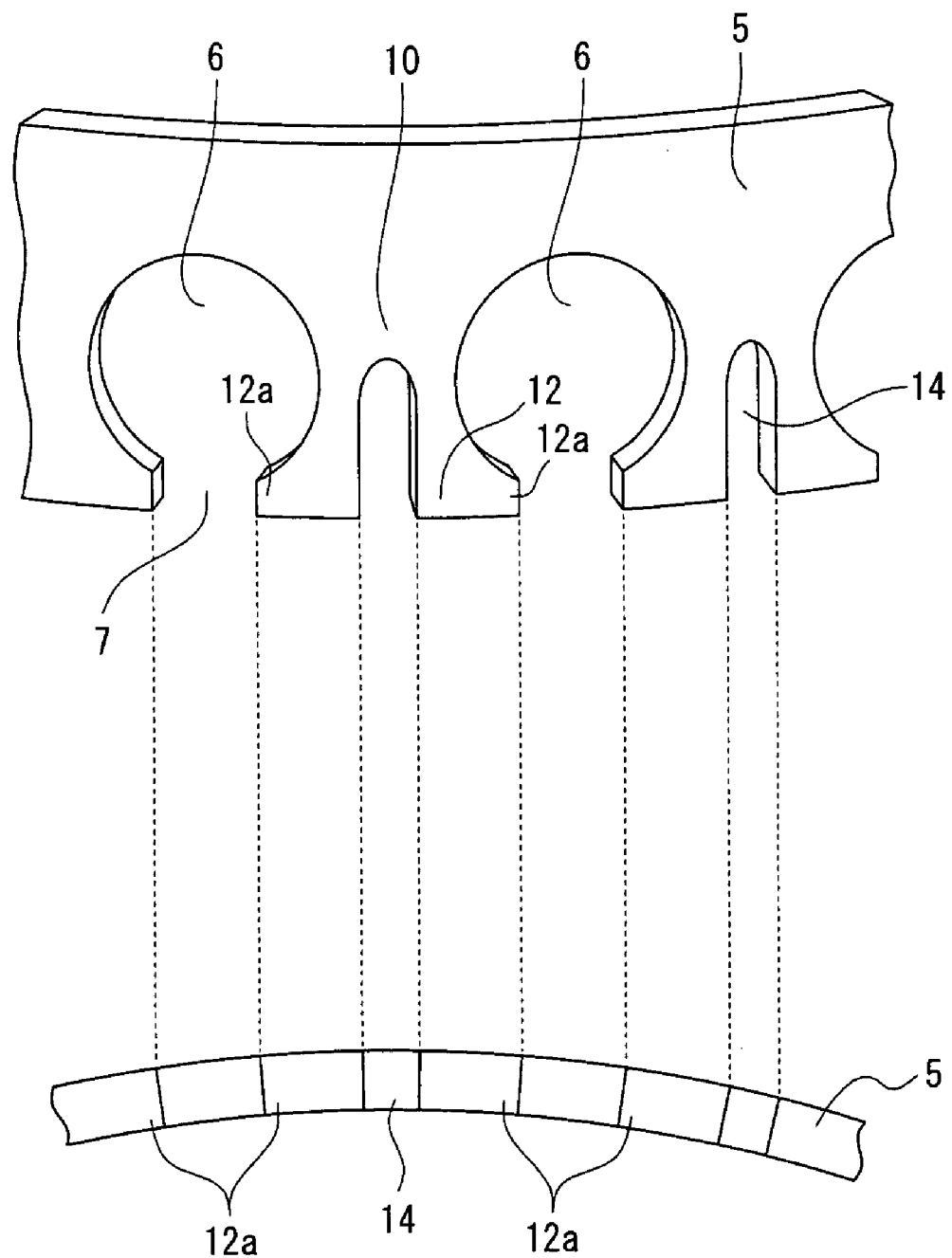
FIG. 3 is a perspective view and an end face view explaining a portion near the cage bar.
Figure 4:
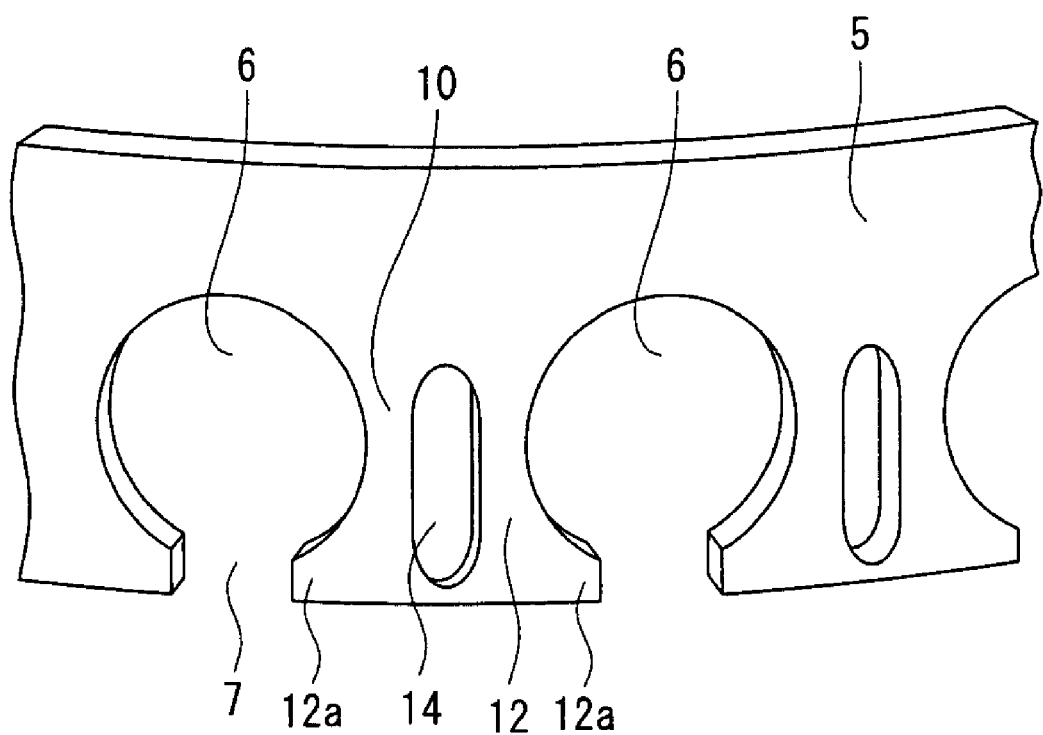
FIG. 4 is a perspective view of a cage in which a through hole is a bore hole.

The shape of the through hole 14 is not restricted to the slit shape but may be of other shapes such as circular, elliptic, or rectangular shape. Further as shown in FIG. 4, the through hole 14 may be a bore hole not opened to the axial end. In a case of the through hole 14 opened to the axial end as shown in FIG. 3, a corner is formed to the opening of the through hole 14 and the corner tends to be worn more compared with a planar portion due to the sliding movement with the inner ring 1 or the outer ring 2. In a case where the through hole 14 is formed as the bore hole as shown in FIG. 4, since the corner is not formed, wear is less caused.

Figure 5:
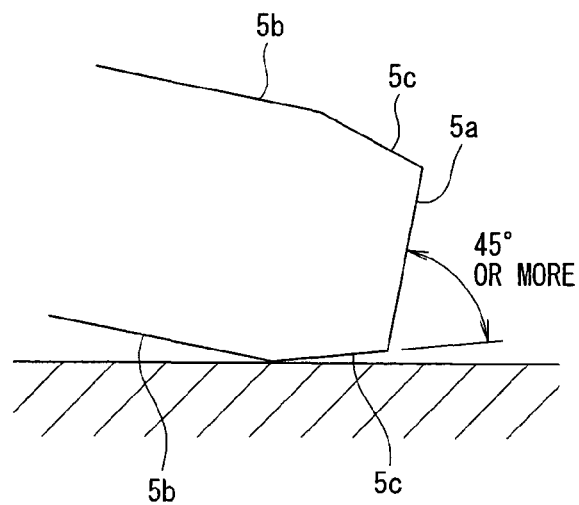
FIG. 5 is a view showing a planar chamfered portion formed to the plate-like member.
Figure 6:
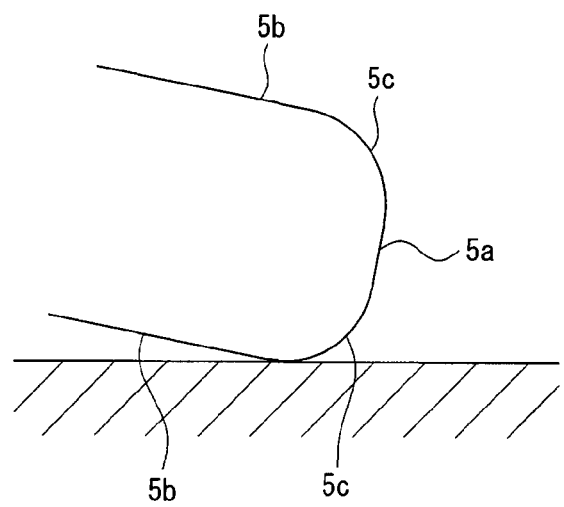
FIG. 6 is a view showing a curved chamfered portion in the plate-like member.
Figure 7:
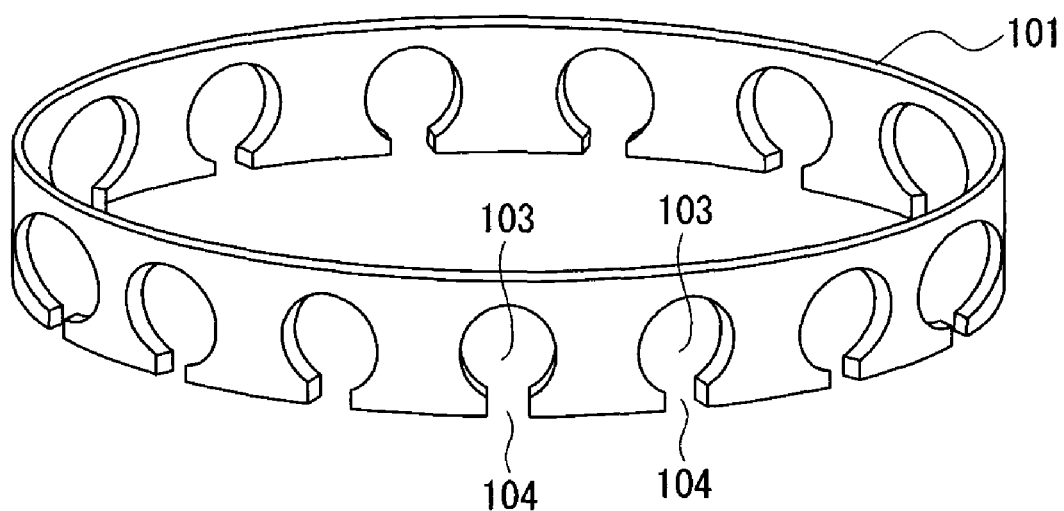
FIG. 7 is a perspective view showing a general cage used in a thin-wall bearing.
Figure 8:
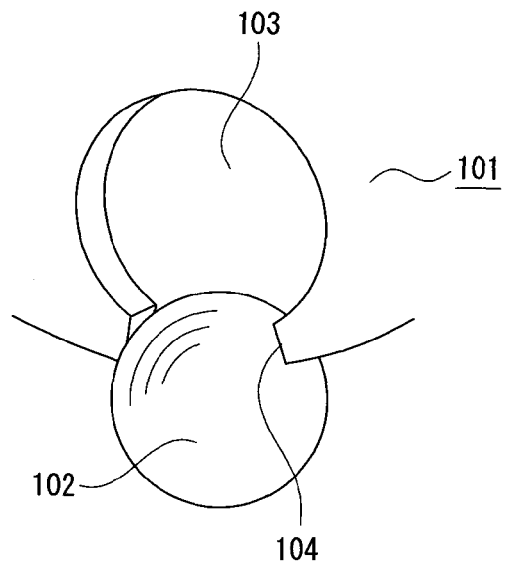
FIG. 8 is a view showing the state of inserting a rolling element from the opening to the pocket of a cage.
Figure 9:
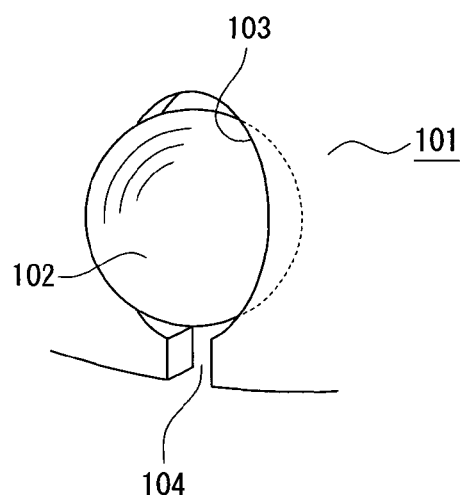
FIG. 9 is a view showing the state of inserting a rolling element into the pocket of the cage.
Figure 10:
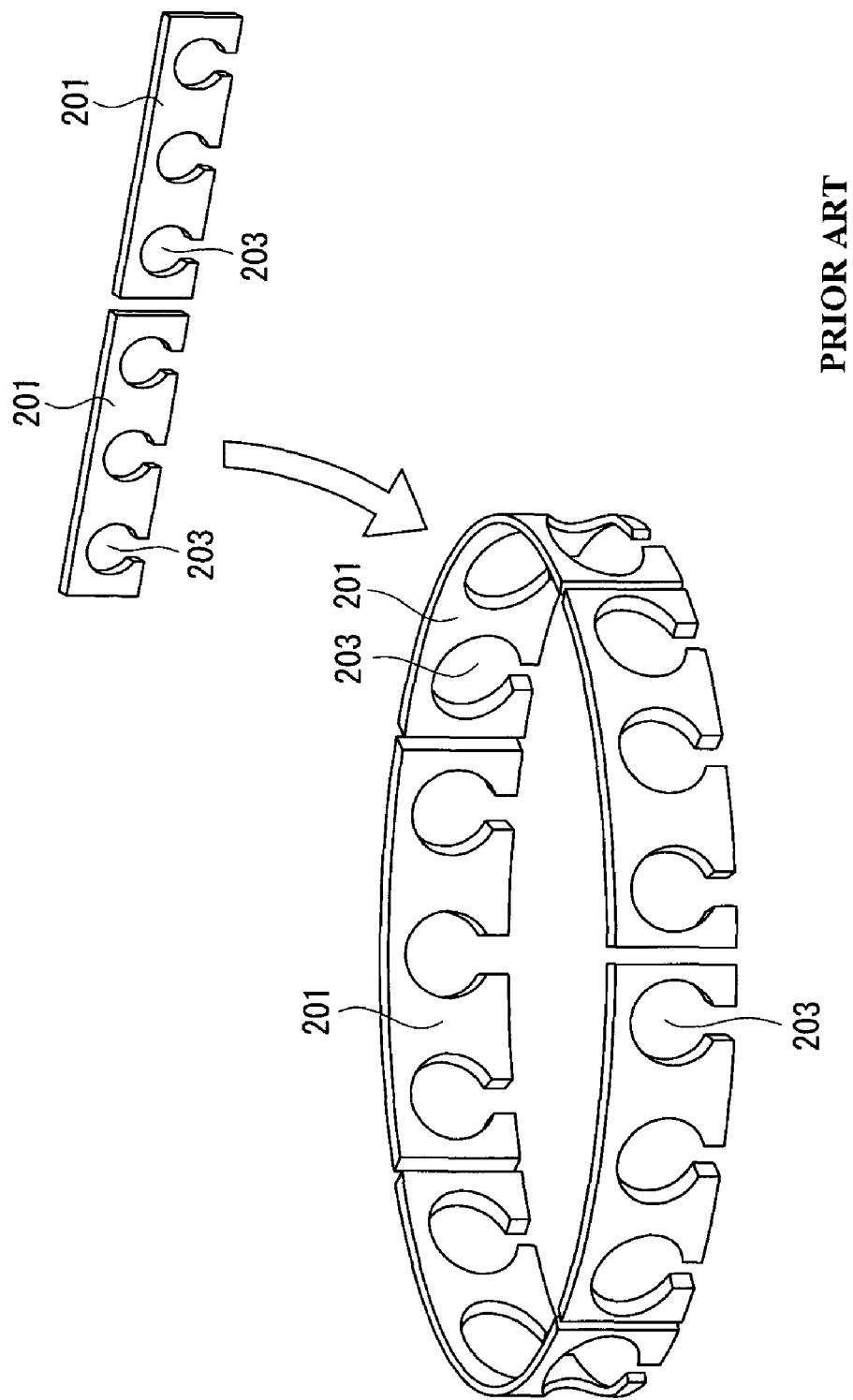
FIG. 10 is a perspective view showing an existent divisional cage.

Further, both circumferential ends of the plate-like member 5 are chamfered, by which the corner substantially at a right angle is removed, and a chamfered portion 5c is formed between the circumferential end face 5a and plate face 5b of the plate-like member 5 (refer to FIG. 5). The chamfered portion 5c is planar and since the chamfered portion 5c is formed, the thickness of the plate-like member 5 is removed gradually toward the circumferential end. Then, by adjusting the degree of bending of the plate-like member 5, the corner formed at the boundary between the circumferential end face 5a and the chamfered portion 5c of the plate-like member 5 is not in contact with the inner ring 1 and the outer ring 2 but the corner formed at the boundary between the plate face 5b and the chamfered portion 5c of the plate-like member 5 or the chamfered portion 5c is in contact with the inner ring 1 or the outer ring 2 during rotation of the thin-wall bearing. Further, as shown in FIG. 6, the chamfered portion 5c may be in a curved surface shape.

Accordingly, when the contact portion between the plate-like member 5 and the inner ring 1 or the outer ring 2 is a corner at a blunt angle, the surface pressure is lowered and the circumferential end of the plate-like member 5 is less worn. Then, in a case where the chamfered portion 5c is a curved surface shape, the surface pressure is further lowered. As a result, since the generation amount of the abrasion powder is decreased, the amount of the base oil of the lubricant absorbed to the abrasion powder is also decreased, and the lubricity less lowers. Further, due to the presence of the chamfered portion 5c, since the base oil of the lubricant is introduced more easily to the contact portion between the plate-like member 5 and the inner ring 1 or the outer ring 2, wearing is less caused.

Further, in a case where the chamfered portion 5c is planar shape, as shown in FIG. 5, it is preferred that an angle formed between the extension of the chamfered portion 5c and the circumferential end face 5a is preferably 45° or more and less than 90° (that is, the angle formed between the chamfered portion 5c and the circumferential end face 5a is 90° or more and less than)135°). With such a constitution, since the angle of the corner formed at the boundary between the plate face 5b and the chamfered portion 5c of the plate-like member 5 is more blunt, the surface pressure at the contact portion between the plate-like member 5 and the inner ring 1 or the outer ring 2 is further lowered and the circumferential end of the plate-like member 5 is less worn. In addition, since the gap between the circumferential end of the plate-like member 5 and the inner ring 1 or the outer ring 2 is decreased, the base oil of the lubricant tends to be introduced more to the contact portion between the plate-like member 5 and the inner ring 1 or the outer ring 2.

The plate-like member 5 can be prepared by a customary resin molding method, for example, injection molding or compression molding. Further, the plate-like member 5 may also be prepared by preparing a long band-like member by injection molding or compression molding and then cutting the same. By manufacturing the cage 4 with such a method, the manufacturing cost of the thin-wall bearing is reduced.

While the type of the resin material for the plate-like member 5 is not particularly restricted, polyamide resins of excellent flexibility such as nylon 66 are often used. Further, in view of the low outgas property, fluoro resins such as polytetrafluoroethylene or polyether ether ketone are also used. Further, in a case where the thin-wall bearing is used under a high temperature condition, polyether ether ketone, polyimide resin, polyamideimide resin, etc. excellent in the wear resistance are used.

The thin-wall bearing of this embodiment described above can be used suitably for example in manipulators for semiconductor production apparatus. Since the manipulators are usually used in a vacuum circumstance, the lubricant used for the thin-wall bearing is preferably those for use in high vacuum circumstance having low outgas property. Since the following three kinds of lubrication films (hereinafter referred to as DFO lubricant) have lower outgas property than fluoro grease, they are suitable to the thin-wall bearing of this embodiment.

(1) A lubrication film containing a fluorine-containing polymer having functional groups and a perfluoro polyether (2) A lubrication film containing a fluorine-containing polymer having functional groups, a perfluoro polyether and a fluoro resin (3) A lubrication film containing a lubricant comprising an alkylated cyclopentane or a polyphenyl ether as a main ingredient, and a fluoro resin Since the lubrication using the DFO lubricant is lubrication using a thin film of the lubricant, it involved a problem that the lubricity was lower than the case of sealing the fluoro-grease or the like in abundance in the bearing. Accordingly, when this was applied to the thin-wall bearing using the existent divisional cage made of the resin, a protruded deformation portion or a circumferential end of the plate-like member tended to be worn and the lubricity was further lowered by the abrasion powder. Accordingly, application of the DFO lubricant to the thin-wall bearing using the existent cage made of the resin (particularly, divisional cage) was often difficult. However, since the thin-wall bearing of this embodiment results in less abrasion powder as described above, the DFO lubricant can be applied with no problem.

The DFO lubricant is to be described. The DFO lubricant is a lubricant containing a fluorine-containing polymer having functional groups of high affinity to metals and a fluoro-oil (for example, perfluoro polyether (PFPE)) and has an extremely high viscosity. The fluorine-containing polymer having functional groups adsorbs to the surface of a metal extremely strongly by the function of the functional groups. On the other hand, the molecules of the fluoro-oil also have a nature of re-deposition again once after they are disconnected and are less released. Accordingly, they are excellent in the low outgas property.

As the fluorine-containing polymer having the functional groups, fluoro-polyether polymers or polyfluoro alkyl polymers are preferred. The fluoro-polyether polymers include polymers with a number average molecular weight of from 1,000 to 50,000 having the repeating unit shown by the following chemical formula 1. The fluoro polyether polymer has a functional group to be described later to at least one of molecule ends.

$$-C_XF_{2X}-O- \quad (X \text{ is an integer of 1 to 4}). \quad \text{[Chemical Formula 1]}$$

Further, the polyfluoroalkyl polymers include those shown by the following chemical formula 2. Y in the chemical formula 2 is a functional group of high affinity with a metal and, preferably, includes epoxy group, amino group, carboxyl group, hydroxyl group, mercapto group, isocyanate group, sulfone group, ester group, etc. For the polyfluoro alkyl polymers, those shown, for example, by chemical formulae, 3, 4 can also be used suitably in addition to those shown by the chemical formula 2.

$$CF_3(CF_2)_7-Y, H(CF_2)_6-Y, CF_2Cl(CF_2)_{11}-Y$$

$$(CF_3)_2CF(CF_2)_7-Y, CF_2ClCF_3CF(CF_2)_7-Y \quad \text{[Chemical Formula 2]}$$

[Chemical formula 3]

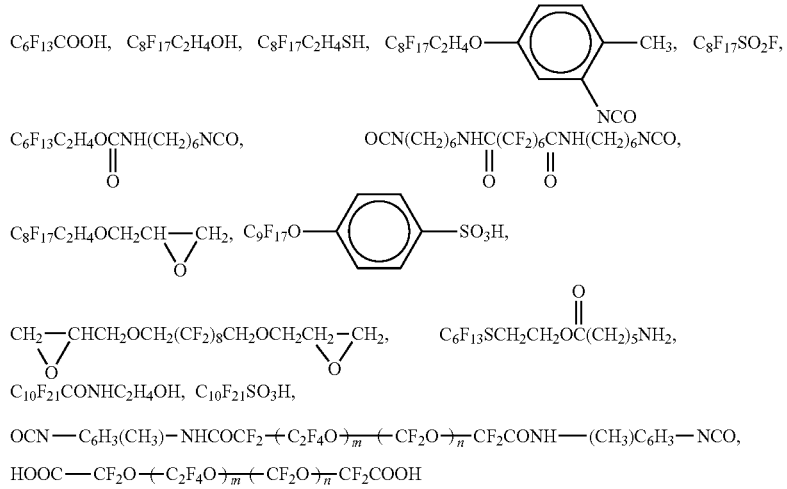

[Chemical Formula 4]

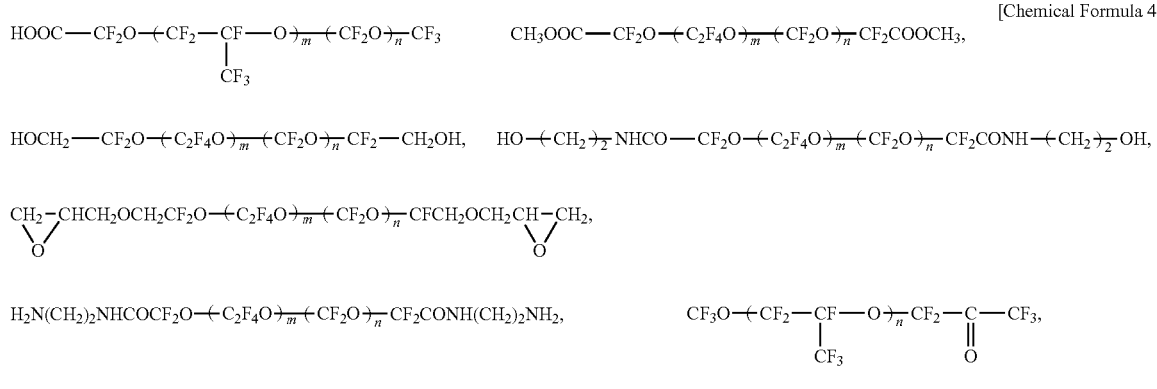

Since such functional groups are bonded with a metal constituting an inner ring or an outer ring when the DFO lubricant is coated on the surface of the inner ring or the outer ring, a lubrication film strongly bonded to the surface of the inner ring or the outer ring is formed. In a case of a fluorine-containing polymer having plural functional groups in one molecule, it may suffice that at least one of them is bonded with the metal. For the fluorine-containing polymer, those exemplified above may be used each alone or two or more of them may be used in combination. In a case of using two or more of them in combination, the combination is preferably selected such that the functional groups do not react with each other to decrease the functional groups to be bonded with the metal.

Specific examples of the fluorine-containing polymer having the functional groups described above include, for example, Krytox 157FSL, 157FSM, and 157FSH, manufactured by DuPont Co., Demnum modified products SA, SH, SY-3 manufactured by Daikin Industries Ltd., and Fonblin ZDEAL, ZDIAC, ZDISCO, ZDOL, ZDOLTX2000, etc. manufactured by Aujimond Co.

Further, while the type of the fluoro-oil such as PFPE is not particularly restricted, those having a vapor pressure as low as possible are used preferably in order to suppress the outgas. Specifically, they include, for example, Krytox 143AB, 143AC, and 143AD manufactured by DuPont Co., FONBLIN YHVAC 18/8, 25/9, 40/11, 140/13, Z25, Z60 manufactured by Aujimond Co., and S-65, S-100, and S-200, manufactured by Daikin Industries Ltd.

Specific examples of the DFO lubricant containing the fluorine-containing polymer having functional groups and the fluoro-oil such as PFPE include those using S-200 manufactured by Daikin Industries Ltd. as PFPE, to which Krytox 157FSH manufactured by DuPont Co. as the fluorine-containing polymer having the functional groups is added by 5%, and which is diluted to 2% with a fluoro solvent (for example, AK225 manufactured by Asahi Chemical Industry Co.).

Further, when a powder of a fluoro resin is added, the DFO lubricant can be made less dusting. Further, in a case of using a lubricant comprising an alkylated cyclopentane or a polyphenyl ether as a main ingredient instead of the fluoro-oil, the life of the thin-wall bearing can be made longer. The alkylated cyclopentane includes, for example, tri(2-octyl-dodecyl)cyclopentane.

While the DFO lubricant may be used being sealed in the inner space of a bearing formed between an inner ring and an outer ring of a thin-wall bearing, it is preferred to coat the same on the raceway surface of the inner ring or the outer ring, followed by drying by heating, depressurization, or the like to form a lubrication film.

Second Embodiment

Figure 14:
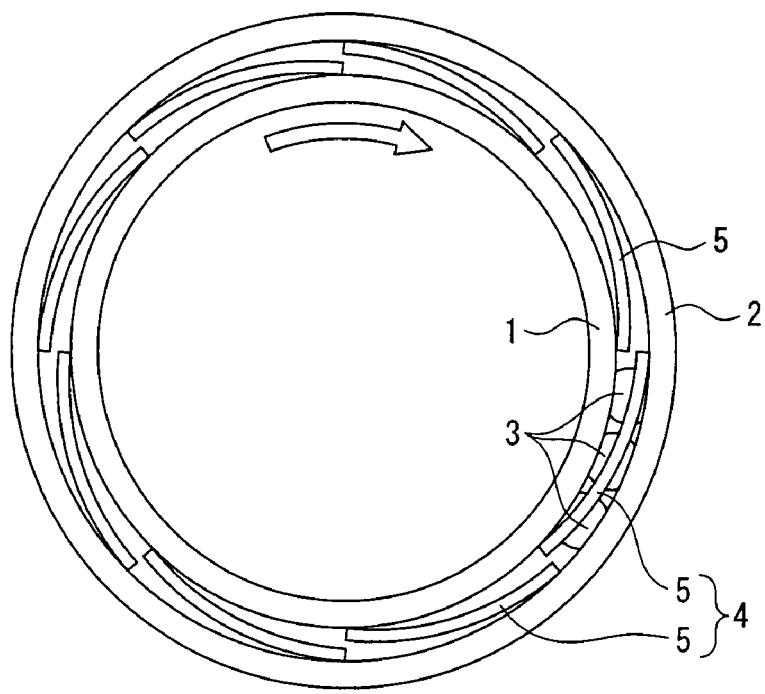
FIG. 14 is a front elevational view for explaining the structure of a thin-wall bearing of a Second Embodiment.
Figure 15:
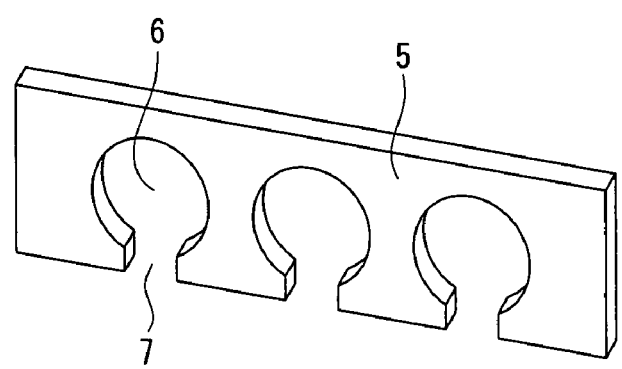
FIG. 15 is a perspective view showing the structure of a plate-like member.

An embodiment of a thin-wall bearing according to the present invention is to be described in details with reference to the drawings. FIG. 14 is a front elevational view showing the structure of a thin-wall bearing of the embodiment and FIG. 15 is a perspective view showing the structure of a plate-like member. In each of the drawings referred to in the Second Embodiment, those portions identical with or corresponding to each of the drawings referred to in the First Embodiment carry the same reference numerals as those in the case of the First Embodiment.

A thin-wall bearing in FIG. 14 has an inner ring 1, an outer ring 2, a plurality of balls 3 (only a portion is illustrated) disposed rollingly between the inner ring 1 and the outer ring 2, a cage 4 for rollingly retaining the balls 3, and a lubricant (not illustrated) such as a lubrication oil or grease in which the inner diameter d and the outer diameter D satisfy the following formula:

$(D-d)/d \leqq 0.187$

The cage 4 is a divisional cage having pockets 6 capable of retaining balls 3 rollingly, and constituted with plural plate-like members 5, 5, - - - made of a resin (by the number of 8 in the illustrated example) which is bent so as to conform with the inner ring 1 and the outer ring 2. That is, the plate-like members 5, 5, - - - disposed circularly with both plate surfaces being directed to the inner ring 1 and the outer ring 2 along the inner ring 1 and the outer ring 2 act in the same manner as a cage circular.

The circumferential length and the number of the plate-like members 5 used are not particularly restricted, and the circumferential length and the number of use may be set such that the sum for the circumferential length of all of the plate-like members 5, 5, - - - are substantially equal with the circumferential length of the thin-wall bearing and almost of the balls 3 can be retained in the pockets 6. So long as the conditions described above can be satisfied, the number of the plate-like member 5 used may be one (that is, it may constituted as shown in FIG. 11 described above)

An opening 7 for inserting the ball 3 into the pocket 6 is disposed to the axial end of the plate-like member 5. The open width of the opening 7 is smaller than the diameter of the ball 3 being provided with a so-called snap fit portion. Upon insertion of the ball 3 into the pocket 6, the ball 3 elastically enlarges the opening 7 to thereby pass through the opening 7. After insertion of the ball 3, the opening 7 elastically resumes the original state.

Figure 16:
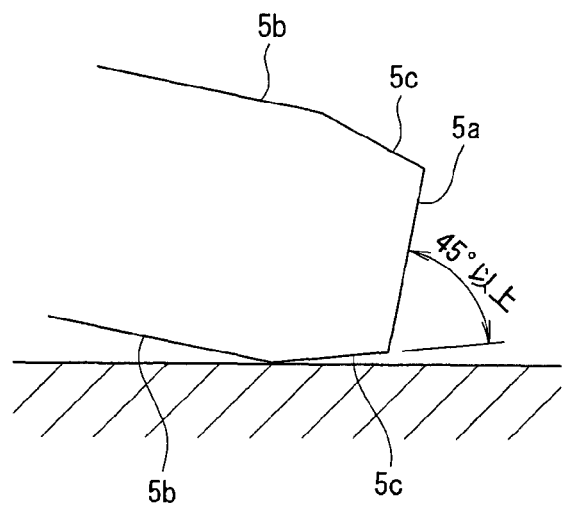
FIG. 16 is a view showing a planar chamfered portion formed to the plate-like member.
Figure 17:
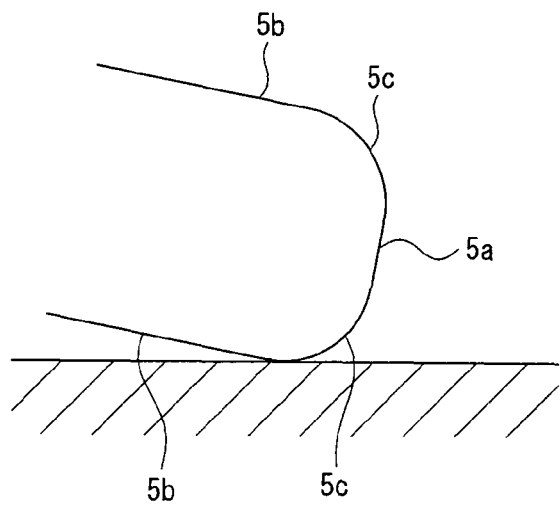
FIG. 17 is a view showing a curved chamfered portion in the plate-like member.

Further, both circumferential ends of the plate-like member 5 are chamfered, by which the corner substantially at a right angle is removed, and a chamfered portion 5c is formed between the circumferential end face 5a and the plate face 5b of the plate-like member 5 (refer to FIG. 16). Since the chamfered portion 5c is planar and since the chamfered portion 5c is formed, the thickness of the plate-like member 5 is reduced gradually toward the circumferential end. Then, by adjusting the degree of bending of the plate-like member 5, the corner formed at the boundary between the circumferential end face 5a and the chamfered portion 5c of the plate-like member 5 is not in contact with the inner ring 1 and the outer ring 2 but the corner formed at the boundary between the plate face 5b and the chamfered portion 5c of the plate-like member 5 or the chamfered portion 5c is in contact with the inner ring 1 or the outer ring during rotation of the thin-wall bearing. Further, as shown in FIG. 17, the chamfered portion 5c may be in a curved surface shape.

Accordingly, when the contact portion between the plate-like member 5 and the inner ring 1 or the outer ring 2 is a corner at a blunt angle, the surface pressure is lowered and the circumferential end of the plate-like member 5 is less worn. Then, when the chamfered portion 5c is a curved surface shape, the surface pressure is further lowered. As a result, since the generation amount of the abrasion powder is decreased, the amount of the base oil of the lubricant absorbed to the abrasion powder is also decreased, and the lubricity less lowers. Further, due to the presence of the chamfered portion 5c, since the base oil of the lubricant is introduced more easily to the contact portion between the plate-like member 5 and the inner ring 1 or the outer ring 2, wear is less caused.

Further, in a case where the chamfered portion 5c is planar, as shown in FIG. 16, it is preferred that an angle formed between the extension of the chamfered portion 5c and the circumferential end face 5a is 45° or more and less than 90° (that is, the angle formed between the chamfered portion 5c and the circumferential end face 5a is 90° or more and less than 135°). With such a constitution, since the angle for the corner formed at the boundary between the plate face 5b and the chamfered portion 5c of the plate-like member 5 is more blunt, the surface pressure at the contact portion between the plate-like member 5 and the inner ring 1 or the outer ring 2 is further lowered and the circumferential end of the plate-like member 5 is less worn. In addition, since the gap between the circumferential end of the plate-like member 5 and the inner ring 1 or the outer ring 2 is decreased, the base oil of the lubricant tends to be introduced more to the contact portion between the plate-like member 5 and the inner ring 1 or the outer ring 2.

The plate-like member 5 can be prepared by a customary resin molding method, for example, injection molding or compression molding. Further, the plate-like member 5 may also be prepared by preparing a long band-like member by injection molding or compression molding and then cutting the same. By manufacturing the cage 4 with such a method, the manufacturing cost of the thin-wall bearing is reduced.

While the type of the resin material for the plate-like member 5 is not particularly restricted, polyamide resins of excellent flexibility such as nylon 66 are often used. Further, in view of the low outgas property, fluoro resins such as polytetrafluoroethylene or polyether ether ketone are also used. Further, in a case where the thin-wall bearing is used under a high temperature condition, polyether ether ketone, polyimide resin, polyamideimide resin, etc. excellent in the wear resistance are used.

The thin-wall bearing of this embodiment described above can be used suitably for example in manipulators for semiconductor production apparatus. Since the manipulators are usually used in a vacuum circumstance, the lubricant used for the thin-wall bearing is preferably those for use in high vacuum circumstance having low outgas property. Since the following three kinds of lubrication films (hereinafter referred to as DFO lubricant) have lower outgas property than fluoro grease, they are suitable to the thin-wall bearing of this embodiment.

(1) A lubrication film containing a fluorine-containing polymer having functional groups and a perfluoro polyether (2) A lubrication film containing a fluorine-containing polymer having functional groups, a perfluoro polyether and a fluoro resin (3) A lubrication film containing a lubricant comprising an alkylated cyclopentane or a polyphenyl ether as a main ingredient, and a fluoro resin Since the lubrication using the DFO lubricant is lubrication using a thin film of the lubricant, it involved a problem that the lubricity was lower than the case of sealing the fluoro-grease or the like in abundance in the bearing. Accordingly, when this was applied to the thin-wall bearing using the existent divisional cage made of the resin, the circumferential end of the plate-like member tended to be worn and the lubricity was further lowered by the abrasion powder. Accordingly, application of the DFO lubricant to the thin-wall bearing using the existent divisional cage made of the resin was often difficult. However, since the thin-wall bearing of this embodiment results in less abrasion powder as described above, the DFO lubricant can be applied with no problem.

The DFO lubricant is to be described. The DFO lubricant is a lubricant containing a fluorine-containing polymer having functional groups of high affinity to metals and a fluoro-oil (for example, perfluoro polyether (PFPE)) and has an extremely high viscosity. The fluorine-containing polymer having functional groups adsorbs to the surface of a metal extremely strongly by the effect of the functional groups. On the other hand, the molecules of the fluoro-oil also have a nature of re-deposition again even after their disconnection and are less released. Accordingly, they are excellent in the low outgas property.

As the fluorine-containing polymer having the functional groups, fluoro-polyether polymers or polyfluoro alkyl polymers are preferred. The fluoro-polyether polymers include polymers with a number average molecular weight of from 1,000 to 50,000 having a repeating unit shown by the following chemical formula 5. The fluoro polyether polymer has a functional group to be described later to at least one of molecule ends.

—$CXF2X$—O— (X is an integer of 1 to 4).    [Chemical Formula 5]

Further, the polyfluoroalkyl polymers include those shown by the following chemical formula 6. Y in the chemical formula 6 is a functional group of high affinity with a metal and, preferably, includes epoxy group, amino group, carboxyl group, hydroxyl group, mercapto group, isocyanate group, sulfone group, ester group, etc. For the polyfluoro alkyl polymers those shown, for example, by chemical formulae, 7, 8 can also be used suitably in addition to those shown by the chemical formula 6.

$CF_3(CF_2)_7$—Y, $H(CF_2)_6$—Y, $CF_2Cl(CF_2)_{11}$—Y $(CF_3)_2CF(CF_2)_7$—Y, $CF_2ClCF_3CF(CF_2)_7$—Y    [Chemical Formula 6]

[Chemical formula 7]

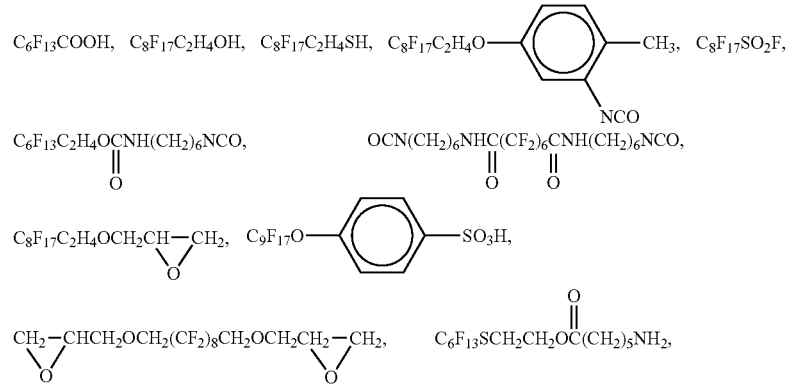

-continued

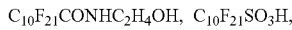

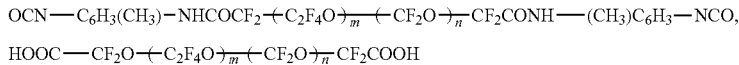

[Chemical Formula 8]

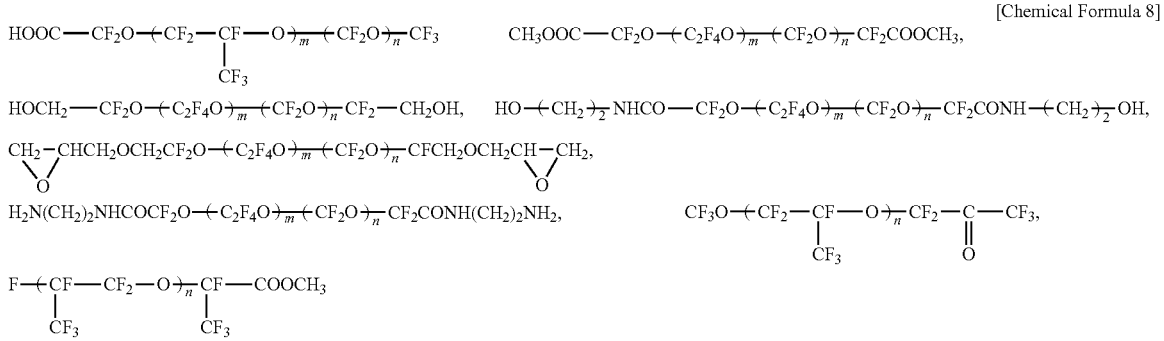

Since such functional groups are bonded with a metal constituting an inner ring or an outer ring when the DFO lubricant is coated on the surface of the inner ring or the outer ring, a lubrication film strongly bonded to the surface of the inner ring or the outer ring is formed. In a case of a fluorine-containing polymer having plural functional groups in one molecule, it may suffice that at least one of them is bonded with the metal. For the fluorine-containing polymers, those exemplified above may be used each alone or two or more of them may be used in combination. In a case of using two or more of them in combination, the combination is preferably selected such that the functional groups do not react with each other to decrease the functional groups to be bonded with the metal.

Specific examples of the fluorine-containing polymer having the functional groups described above include, for example, Krytox 157FSL, 157FSM, and 157FSH manufactured by DuPont Co., Demnum modified products SA, SH, SY-3 manufactured by Daikin Industries Ltd, Fonblin ZDEAL, ZDIAC, ZDISCO, ZDOL, ZDOLTX2000, etc. manufactured by Aujimond Co.

Further, while the kind of the fluoro-oil such as PFPE is not particularly restricted, those having a vapor pressure as low as possible are used preferably in order to suppress the outgas. Specifically, they include, for example, Krytox 143AB, 143AC, and 143AD manufactured by DuPont Co., FoNblin YHVAC 18/8, 25/9, 40/11, 140/13 Z25, Z60 manufactured by Aujimond Co., and S-65, S-100, and S-200, etc. manufactured by Daikin Industries Ltd.

Specific examples of the DFO lubricant containing the fluorine-containing polymer having functional groups and the fluoro-oil such as PFPE include those using S-200 manufactured by Daikin Industries Ltd. as PFPE, to which Krytox 157FSH manufactured by DuPont Co. as the fluorine-containing polymer having the functional groups is added by 5%, and which is diluted to 2% with a fluoro solvent (for example, AK225 manufactured by Asahi Chemical Industry Co.).

Further, when a powder of a fluoro resin is added, the DFO lubricant can be made less dusting. Further, in a case of using a lubricant comprising an alkylated cyclopentane or polyphenyl ether as a main ingredient instead of the fluoro-oil, the life of the thin-wall bearing can be made longer. The alkylated cyclopentane includes, for example, tri(2-octyldodecyl)cyclopentane.

While the DFO lubricant may be used being sealed in the inner space of a bearing formed between an inner ring and an outer ring of a thin-wall bearing, it is preferred to coat the same on the raceway surface of the inner ring or the outer ring, followed by drying by heating, depressurization, or the like to form a lubrication film.

Third Embodiment

This embodiment concerns a rolling bearing used, for example, in semiconductor production apparatus and, particularly, it relates a thin-wall rolling bearing suitable to use in a lean lubrication circumstance.

At first, lean lubrication and a thin-wall rolling bearing are to be described. Lean means no wasteful loss and less oil and lean lubrication shows a method of lubricating only the raceway surface of a bearing with an extremely small required minimum amount of lubricant (oil or grease). Since the amount of the lubricant is small, temperature elevation caused by resistance when a rolling element proceeds in the lubricant is lowered to decrease error in view of the mechanical accuracy caused by temperature. In addition, the lubricant per se is stirred up and scattered due to the passage of the rolling element during rotation of the bearing to sometimes contaminate the peripheral circumstance. However, in a case of the lean lubrication, since the lubrication film is extremely thin inherently, the amount of the scattered lubricant is slight, which may cause environmental contamination.

Specific examples of the lean lubrication includes a system of previously coating a lubricant such as oil plating or grease plating (DFO lubrication is also one of such systems), a method of supplying a lubricant during rotation of a bearing such as oil air lubrication or oil mist lubrication, a method of forming a solid lubrication film on a raceway surface, for example, by MoS2 sputtering or composite plating containing polytetrafluoroethylene (PTFE), or PTFE-containing resin coating, a method of transferring a lubricant to the rolling element by slidably moving a lubricant-containing member such as a PTFE-containing resin cage or a resin member containing MoS2 loaded between rolling element and a rolling element.

Then, a thin-wall roll bearing is those having a bearing cross section of an approximately square shape in which the inner diameter size of the bearing is larger compared with the thickness size of the bearing, which include a so-called Kaydon type. In NBX type contained in the catalogue for N-series thin-wall bearings manufactured by NSK Ltd., since the ratio between the bearing thickness and the inner diameter of NBX2504 having the minimum inner diameter is about 0.187 and it is 0.025 for NBX101625 of the maximum inner diameter, the thin-wall rolling bearing is defined by using numerical values as a bearing in which the ratio between the bearing thickness size and the bearing inner diameter size is 0.187 or less.

Figure 21:
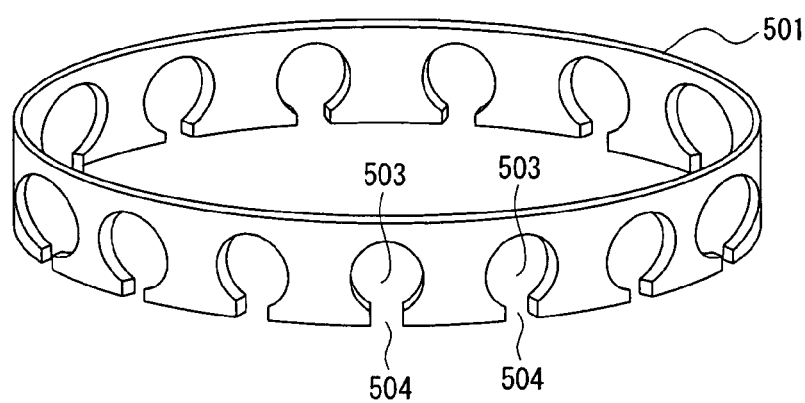
FIG. 21 is a perspective view showing a cage used in an existent rolling bearing.
Figure 22:
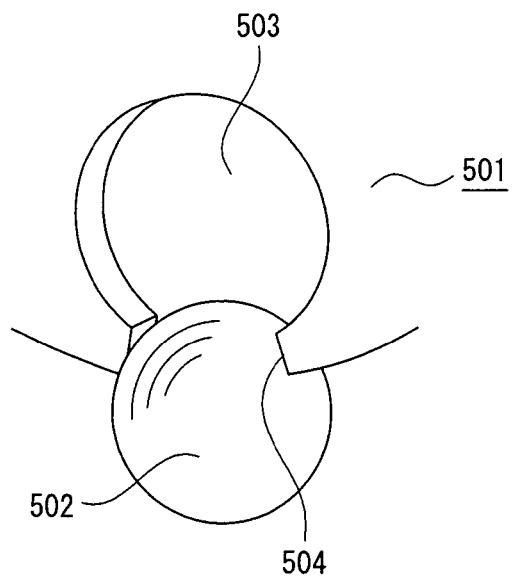
FIG. 22 is a perspective view showing a state of inserting a rolling element from the opening to the pocket portion of a cage.

In a case of using a cage to such a thin-wall rolling bearing, for mounting a cage after assembling rolling elements between an inner ring and an outer ring, a ring-shape cage 501 having an opening 504 for inserting a rolling element (ball) 502 into a pocket portion 503 at the axial end as shown in FIG. 21 and FIG. 22. "Thickness" mentioned herein is a value one-half of the difference of the inner and outer diameter size of the bearing.

Figure 23:
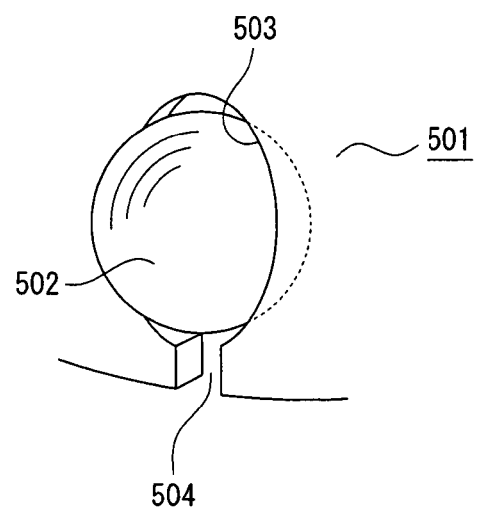
FIG. 23 is a perspective view showing the state of inserting a rolling element in the pocket portion of the cage.

A "snap fit portion" is disposed to the opening 504 and when the rolling element 502 is inserted into the pocket portion 503, the rolling element 502 is inserted into the pocket portion 503 by elastically expanding the opening 504 by the rolling element 502 and allowing it to pass through the opening 504, and the opening 504 elastically restores an original position after insertion (FIG. 23). In order to detach the rolling element 502 inserted in the pocket portion 503 from the cage 501, it is necessary that the rolling element 502 elastically expands the opening 504 and passes therethrough, so that the rolling element 502 is not easily detached from the cage 501 in this structure. The material of the gage 501 is made of a metal and, usually, it is often made of brass or stainless steel.

However, in the existent thin-wall rolling bearing described above, the following problems sometimes occur in a case of use under a lean lubrication circumstance. That is, while the outer diametrical portion or the inner diametrical portion of the cage sometimes conducts sliding movement with the outer ring or the inner ring during rotation of the bearing, in a rich lubrication circumstance where grease is present in abundance, the cage is not worn in a great amount by the sliding movement with the outer ring or the inner ring. However, in the lean lubrication, the cage is worn greatly and the abrasion powder is caught between the raceway surface and the rolling element to possibly lower the rotational performance of the bearing remarkably.

Further, due to the restriction that the bearing thickness is small in the thin-wall roll bearing, the diameter of the rolling element is usually smaller for the size of the bearing inner diameter when compared with usual bearings and since a load has to be received by the rolling elements of the small diameter, the number of the rolling elements loaded between the inner and outer rings has to be increased. For example, since rolling elements are loaded by the number of 80 or more in a thin-wall rolling bearing having an inner diametrical size of about 200 mmφ, individual rolling elements are in various states of movement during rotation of the bearing and put in a state where they push and shove each other by way of the cage.

In this case, under a rich lubrication circumstance, since the friction coefficient is small even when sliding movement occurs between the rolling element and the pocket portion of the cage, the cage is less urged to move in the direction other than the rotational direction by the force from the rolling element. However, under the lean lubrication circumstance, since the friction coefficient is not small between the rolling element and the pocket portion of the cage, the force from the rolling element causes the cage to move also in the direction other than the rotational direction.

Then, a synthesized force from the rolling element to the entire cage may exert in the direction of detaching the cage out of the rolling element and, in a case where the force exceeds a force corresponding to the elastic force of the snap fit portion of one or two cage pocket portions, the rolling element is detached out of the one or two cage pockets. Then, this propagates successively and the rolling elements are detached out of the cage pocket portions and, finally, this results in a phenomenon that about one-half circumferential portion of the cage detaches and springs up out of the bearing. Then, for overcoming such a disadvantage, use of a cage made of a resin may be considered.

When a cage made of the resin is used in lean lubrication, the force from the rolling element no more displaces the entire cage in the direction other than the rotational direction due to the elasticity and flexibility of the resin and the problem that a portion of the cage springs up out of the bearing can be prevented. Further, since the surface pressure is decreased, even when sliding movement is caused between the cage and the inner or the outer ring, this can prevent wear of the cage in a great amount.

However, for forming the cage made of the resin into a ring shape, it is at first necessary to mold a ring-like member by injection molding and preparation of injection molding dies on every bearing designations inevitably imposes a large burden in view of the cost. Actually, there are bearing designations for which the number of products to be manufactured is limited such as thin-wall bearings for use in semiconductor production apparatus which are used under a vacuum circumstances with DFO lubrication as a most conspicuous example of the lean lubrication and it is difficult to manufacture molding dies for all of them.

Figure 24:
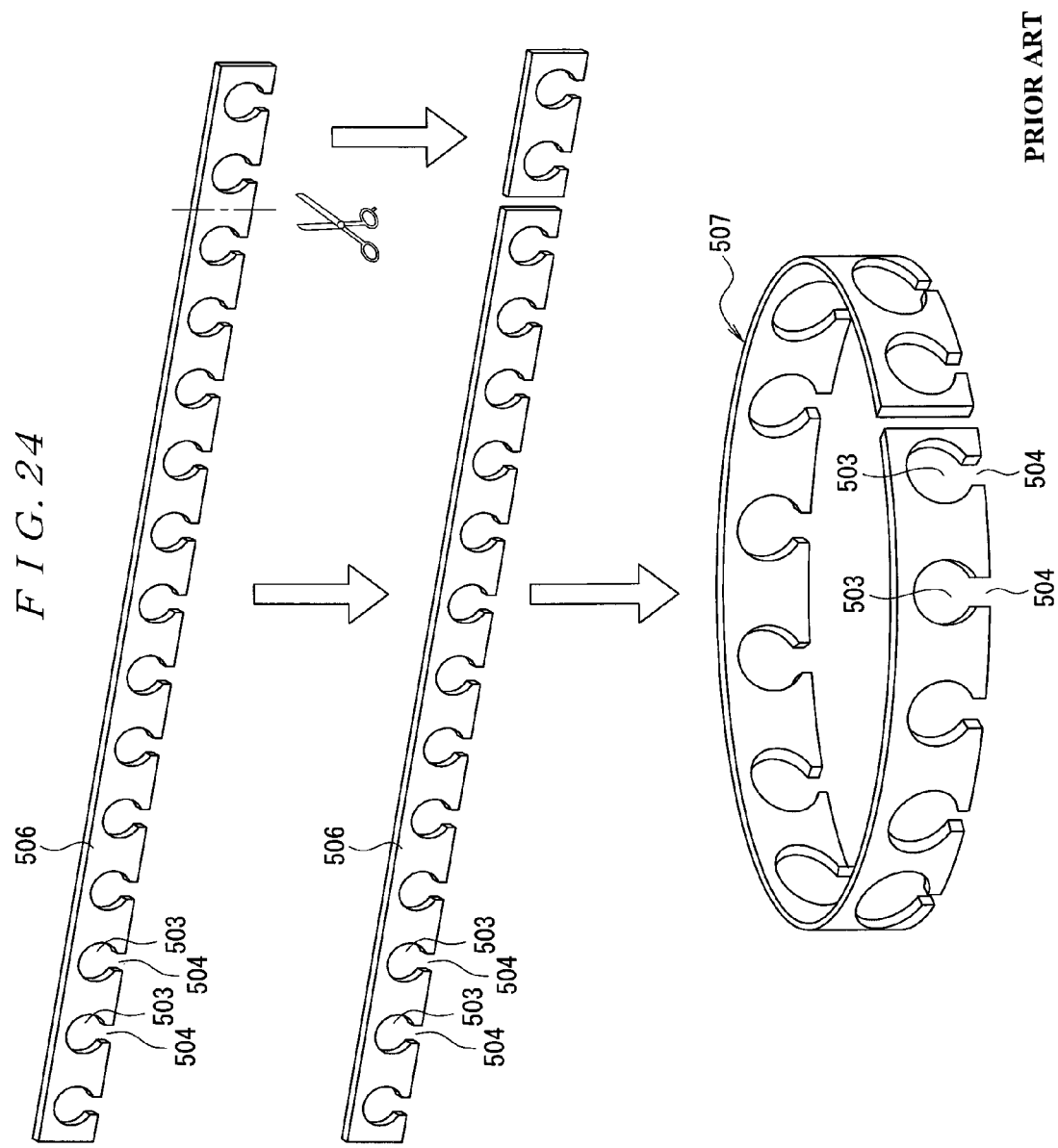
FIG. 24 is an explanatory view for explaining a cage of other existent example.

Then, as a countermeasure next to the best, the following method is adopted. At first, as shown in FIG. 24, a long band-like member 506 for a cage having plural pocket portions 503 of retaining rolling elements rollingly is provided. The cage member 506 is prepared by injection molding or compression molding. In a case of using the cage member 506 to a bearing having a pitch circle diameter of the cage, for example, of about 200 mm, an inner die having an outer diametrical size of about 200 mm and an outer die of a larger diameter than the inner die by so much as the thickness of the cage are provided, and the cage member 506 is loaded to a gap formed between the inner die and the outer die. The length of the cage member 506 to be loaded is adjusted by cutting at a predetermined position corresponding to the size of the bearing.

Then, the cage member 506 is maintained at a predetermined annealing temperature for a predetermined time in accordance with the kinds of the resin in a state loaded between the inner die and the outer die. In a case where resin is made of nylon 66, it is maintained at 150° C. for 30 min and, in a case of PEEK, it is maintained at 230° C. for 3 hrs. The annealing step is called as a heat setting and the cage member 506 is molded into a ring shape by the heat setting, which keeps the shape as it is also after taking out of the die and is used as a ring-like cage 507.

Figure 25:
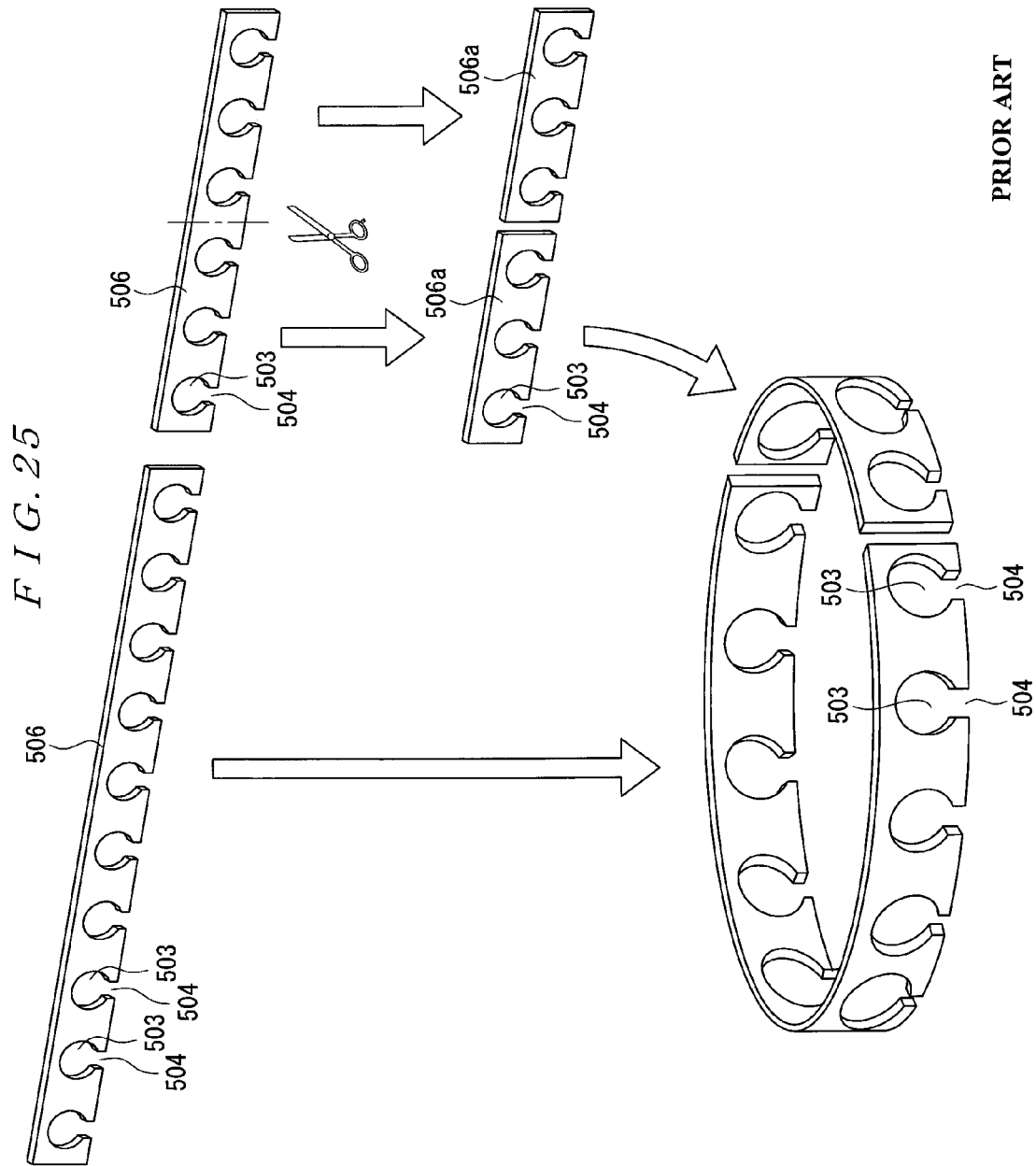
FIG. 25 is an explanatory view for explaining a cage of other existent example.

In a case where the size of the bearing is large, and the circumferential length is insufficient by a single cage member 506, as shown in FIG. 25, the length is adjusted by plural pieces, for example, by combining a not disconnected single cage member 506 and a disconnected cage member 506a of one-half length, and this can also cope with a cage of longer circumferential length than a single cage member 506. In the thin-wall bearings, the bearing thickness is generally equal with that of an identical series even when the inner diameter is different and all of them can be applied so long as only the circumferential length of the cage can be adjusted. In the method of heat setting the cage member 506 into a ring-shape cage, an identical cage member can be utilized to all of the bearing designations in the series so long as heat setting inner die and outer die are provided even when the bearing designation is different and, accordingly, it is no more necessary to manufacture the injection molding die on every bearing designations, which is advantages in view of the cost.

However, by the method of thermosetting the cage member 506 into a ring-like cage as in the prior art, in the case where the material for the cage member 506 is PEEK or the like, the material has to be kept at 230° C. at the lowest for 3 hr and, actually, temperature elevation up to the temperature before the step of keeping the cage member 506 between the inner die and the outer die, gradual cooling after the keeping step, etc. are necessary. Accordingly, it requires 8 hrs or more till the completion of the step for 1 lot to consume much labor, electric power, and time to result in a problem of increasing the cost. Further, since the band-like cage member 506 is bent by the heat setting, there is a possibility that the cage deforms by spring back or deformation occurs with time during use of the bearing at a high temperature and, further, the pocket portion 503 or the opening 504 expand outward and deforms by the bending of the band-like cage member 506.

The invention has been achieved for solving such a disadvantage and it is an object thereof to provide a rolling bearing capable of preventing a portion of the cage from springing up to the outside of the bearing even in a case of use under a lean lubrication circumstance, capable of preventing a great amount of wear of the cage, as well as capable of constituting the cage by utilizing an identical planar member for the bearings of all bearing designations in the series. Further, it also intends to provide a rolling bearing capable of saving the bending step of the cage to reduce the cost and capable of preventing the cage or the cage pocket portion from deformation.

For attaining the foregoing object, the invention has a feature in a rolling bearing in which a plurality of rolling elements are disposed rollingly in the circumferential direction by way of a cage between an outer ring and an inner ring in that the cage is constituted by disposing a plurality of planar members made of a resin having pocket portions for retaining the rolling elements rollingly in the circumferential direction.

In this case, assuming the length in the longitudinal direction of the planar member as L, the thickness of the planar member as t, the inner diameter size of the outer ring as D, and the inner diameter size of the inner ring as d, it is preferred to satisfy the relation: $t<0.5(D^2-L^2)^{1/2}-0.5d$.

Further, the lubrication means is preferably DFO lubrication. The DFO lubrication referred to in the invention includes one or both of an absorptive lubrication ingredient and a solid lubricant in the thin film with oil plating and, specifically, the method described in JP2001-254803A can be exemplified. It includes various forms depending on the combination of the oil as the base agent, and the lubrication ingredient and the solid lubricant or the film thickness. They include, for example, DFO using a fluoro-oil as the base oil and incorporated with a PTFE powder, a so-called long life DFO using cyclopentane (hydrocarbon oil) as the base oil, a so-called low dusting DFO using a fluoro-oil as the base oil and incorporated with a PTFE powder, etc.

According to the invention, since the cage is constituted by disposing a plurality of planar members made of a resin having pocket portions for rollingly retaining rolling elements in the circumferential direction, even in a case of use under a lean lubrication circumstance, the planar member constituting the cage is not displaced due to the elasticity and flexibility of the resin in the direction other than the rotational direction by the force from the rolling elements, and spring up of a portion of the cage to the outside of the bearing can be prevented and, in addition, even when a sliding movement is caused between the planar member made of the resin constituting the cage and the inner ring or the outer ring, since the surface pressure is decreased, wear of the planar member in a great amount can be prevented.

Further, since the cage is constituted by disposing a plurality of planar members made of the resin in the circumferential direction, the cage can be constituted by utilizing an identical planar member to bearings of all of the bearing designations in the series, as well as the heat setting step for bending the planar member is no more necessary thereby capable of reducing the cost. Further, since the heat setting step for bending the planar member into an arcuate shape is no more necessary, it is possible to prevent deformation of the planar member by spring back and deformation with time during use of the bearing at a high temperature, and prevent the pocket portion from outward expansion and deformation by bending.

Furthermore, assuming the length in the longitudinal direction of the planar member as L, the thickness of the planar member as t, the inner diameter size of the outer ring as D, and the inner diameter size of the inner ring as d, since one planar member can be adapted such that it does not conduct sliding movement with the outer ring and the inner ring at three points simultaneously by satisfying the relation: $t<0.5(D^2-L^2)^{1/2}-0.5d$, wear of the planar member can be avoided.

Figure 18:
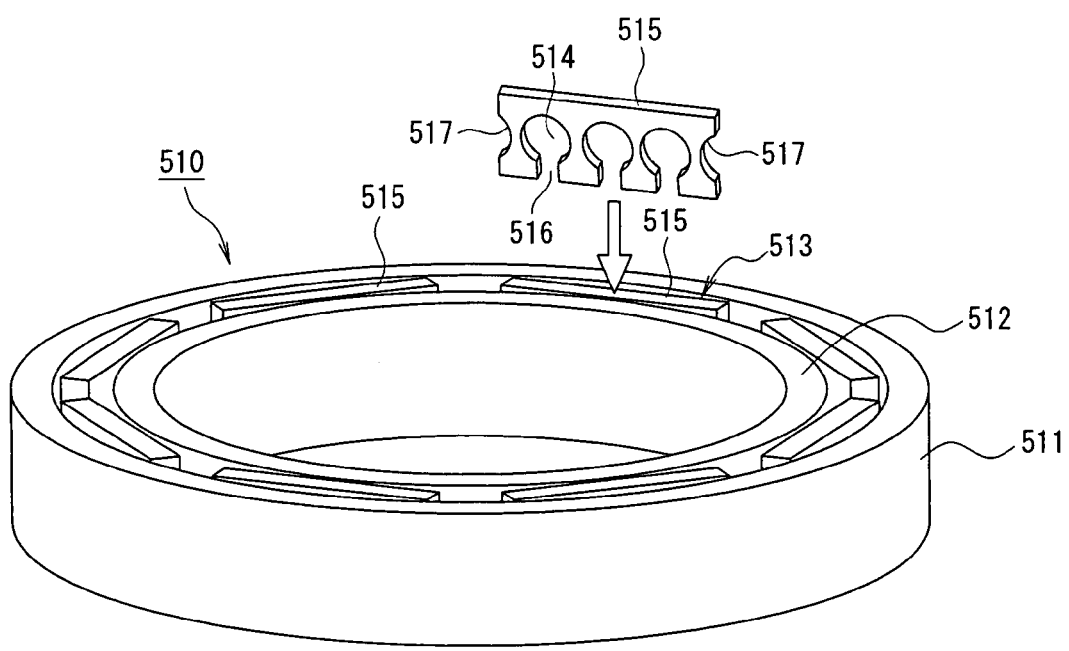
FIG. 18 is an explanatory perspective view for explaining a rolling bearing as an example of a Third Embodiment.
Figure 19:
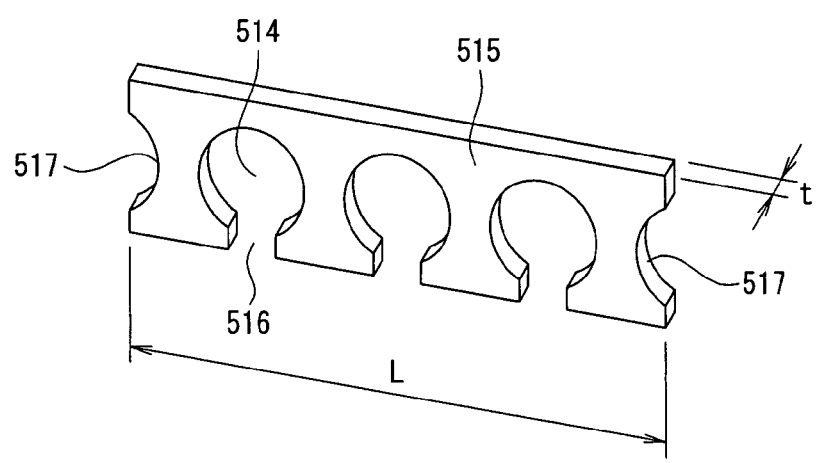
FIG. 19 is a perspective view for explaining a planar member.
Figure 20:
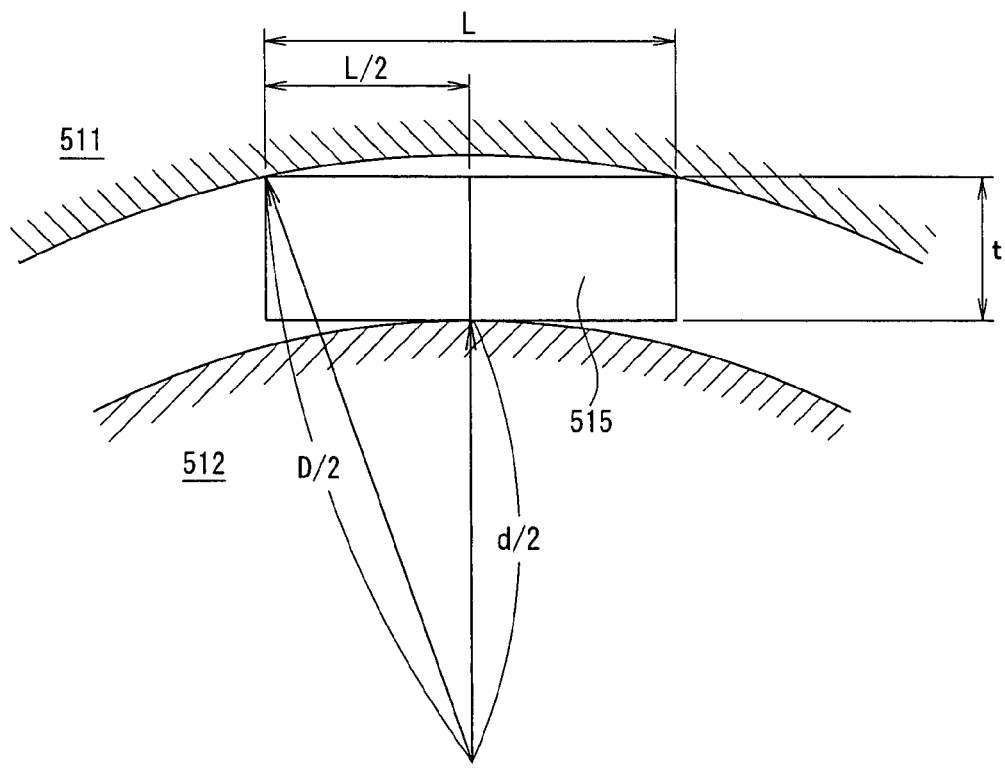
FIG. 20 is an explanatory view for explaining a relation between the length L in the longitudinal direction and the thickness t of the planar member.

An example of the embodiment of the invention is to be described with reference to the drawings. FIG. 18 is an explanatory perspective view for explaining a rolling bearing as an example of the embodiment of the invention, FIG. 19 is a perspective view for explaining a planar member, and FIG. 20 is an explanatory view for explaining a relational formula between the length L in the longitudinal direction and the thickness t of the planar member. In this embodiment, a thin-wall (for example, with the ratio of the bearing thickness size and the bearing inner diameter size being 0.187 or less) rolling bearing used under the lean lubrication circumstance is used as an example.

As shown in FIG. 18 and FIG. 19, a rolling bearing 510 as an example of the embodiment of the invention is constituted by disposing a cage 513 for rollingly retaining a plurality of rolling elements (not illustrated: balls in this embodiment) disposed between an outer ring 511 and an inner ring 512 in the circumferential direction by arranging a plurality of planar members 515 made of a resin having pocket portions 514 for rollingly retaining the rolling element in the circumferential direction. In the planar member 515, as shown in FIG. 19, an opening 516 for inserting a rolling element into the pocket portion 514 on one lateral surface in the lateral direction is formed in communication with the pocket portion 514 and a snap fit portion is disposed to the opening 516. Then, the rolling elements is inserted into the pocket portion 514 by causing the rolling element to pass through the opening 516 while elastically enlarging the opening 516 by the rolling element, and the opening 516 elastically resumes the original position after insertion.

Further, the planar members 515 are disposed in plurality so as to fill the entire circumference of the clearance in the circumferential direction between the outer ring 511 and the inner ring 512 to thereby ensure a necessary number of rolling elements. Further, an arc 517 of R identical with the circle of the pocket portion 514 is formed to each of longitudinal ends of the planar member 515, in which one rolling element is disposed between each of the planar members 515 adjacent in the circumferential direction to each other and the arc 517 formed to each of the longitudinal ends of the planar member 515 plays a role as the pocket portion for the rolling element.

As the resin material for the planar member 515, nylon, PEEK, etc. are used for example and, in addition, phenol resin, epoxy resin, PES, PPS, PEI, and PAI can be mentioned as examples. Further, in this embodiment, it is adapted such that one planar planar member 515 does not conduct sliding movement to the outer ring 511 and the inner ring 512 at the three points simultaneously by satisfying the relation: $t<0.5(D2-L2)^{1/2}-0.5d$, assuming the longitudinal length of the planar member 515 as L, the thickness of the planar member 515 as t, the inner diameter size of the outer ring 511 as D, and the inner diameter size of the inner ring 512 as d.

Referring more specifically, with reference to FIG. 20, assuming that one planar cage 513 disposed between the outer ring 511 and the inner ring 512 is in a state of arrangement that the both ends are in contact with the inner diametrical surface of the outer ring 511 and the central portion is in contact with the outer diametrical surface of the inner ring 512, the following equation (1) is established.

$$(D/2)_2 = (L/22) + (t+(d/2))_2 \quad (1)$$

the equation (1) is arranged into the following equations (2), (3)

$$D2-L2 = 4(t+(d/2))_2 \quad (2)$$

$$(D2-L2)^{1/2} = 2(t+d/2)) = 2t+d \quad (3)$$

Accordingly, the condition in which $t=0.5((D2-L2)^{1/2}-d)$ and one planar member 515 does not conducted sliding movement to the outer ring 511 and the inner ring 512 at three point simultaneously is given by the following formula (4).

$$t<0.5(D2-L2)^{1/2}-d) = 0.5(D2-L2)^{1/2}-0.5d \quad (4)$$

That is, in the formula (4), in a case where t is smaller than the right side, one planar member 515 does not conduct sliding movement to the outer ring 511 and the inner ring 512 at three points simultaneously. That is, it no more undergoes bending caused by the sliding movement of one planar member 515 to the outer ring 511 and the inner ring 512 at three points simultaneously, and a plurality of planar members 515 constituting the cage 513 move always with no contact at three points through the clearance between the outer ring 511 and the inner ring 512. This can avoid occurrence of ware to the planar member 515.

As described above, in this embodiment, since the cage 513 is constituted by disposing a plurality of planar members 515 made of the resin with lower hardness and lower rigidity compared with the metal in the circumferential direction in a clearance between the outer ring 511 and the inner ring 512, even in a case of using the cage 513 for the thin-wall rolling bearing for use in semiconductor production apparatus used under a vacuum circumstance and DFO lubrication as the most conspicuous example of the lean lubrication, the planar member 515 constituting the cage 513 is not displaced due to the elasticity and the flexibility of the resin in the direction other than the rotational direction by the force from the rolling elements, and spring up of a portion of the cage 513 to the outside of the bearing can be prevented. In addition, even when sliding movement is caused between the planar member 515 made of the resin constituting the cage 513 and the outer ring 511 and the inner ring 512, since the surface pressure is decreased, wear of the planar member 515 in a great amount can be prevented.

Further, since the cage 513 is constituted by disposing a plurality of the planar members 515 made of the resin in the circumferential direction, it is not necessary to provide injection molding dies on every bearing designations and the cage 513 can be constituted by utilizing identical planar members 515 to the bearings of all of the bearing designations in the series. Further, the heat setting step for bending the planar member 515 is no more necessary. The cost of the cage 513 can be reduced by the foregoings. Particularly, the cage 513 can be used suitably to the rolling bearing lubricated by DFO lubrication which is the most conspicuous example of lean lubrication and which is a rolling bearings of bearing designations limited for the number of products as the thin-wall rolling bearing for semiconductor production apparatus used under a vacuum circumstance.

Further, since the heat setting step for bending the planar member 515 into an arcuate shape is no more necessary, the planar member 515 does not deform by spring back and does not deform with time upon use of the bearing at high temperature, as well as it is possible to prevent deformation of the pocket portion 514 and the opening 516 by outward expansion due to bending. Further, assuming the longitudinal length of the planar member 515 as L, the thickness of the planar member 515 as t, the inner diameter size of the outer ring 511 as D, and the inner diameter size of the inner ring 512 as t, and satisfying the relation: $t<0.5(D2-L2)^{1/2}-0.5d$, it is possible to adapt one planar member 515 such that it does not conduct sliding movement to the outer ring 511 and the inner ring 512 at the three points simultaneously. As a result, the planar member 515 does not result in bending strength and can move circumferentially in the clearance between the outer ring 511 and the inner ring 512 in the circumferential direction by which the planar member 515 does not cause wear.

The invention is not restricted to the embodiment described above and can be properly modified within a range not departing from the gist of the invention. For example, in the embodiment described above, a thin-wall rolling bearing used under a lean lubrication circumstance is shown as an example, it is not restricted thereto. Depending on the case, the invention may also be applied to the rolling bearing used under a rich lubrication circumstance, or the invention may be applicable to usual rolling bearings without being restricted only to the thin-wall rolling bearings. In addition, the constitution such as for outer ring, inner ring, rolling element, cage, pocket portion, planar member, and lubrication means exemplified in the embodiment described above is optional and not restricted so long as the invention can be attained.

Fourth Embodiment

This embodiment concerns a thin-wall roll bearing including those concerned with first to Third Embodiments.

Heretofore, for the thin-wall rolling bearing used for semiconductor-related apparatus and manipulators, those of open type have often been used and those of sealing type have also been in some apparatus. Thin-wall rolling bearing are those having a bearing cross sectional area a of 0.2 or less. The bearing cross sectional ratio α is defined by the following equation.

$$\alpha = (D-d)/(2 \times DPW)$$

In the formula, D is a bearing outer diameter, d is a bearing inner diameter, and DPW is a central diameter for the rolling element of the bearing.

While a grease is used mainly for the lubrication of the thin-wall rolling bearing as described above, in a case of an open type thin-wall rolling bearing, the grease present on the raceway surface may possibly be centrifugally leaked or pushed out from the inside of the bearing by the cage or the rolling element during rotation of the bearing. Further, also in a case of a sealed thin-wall rolling bearing, the grease may possibly be leaked from a portion between a seal lip and the outer diametrical surface of the inner ring.

In view of the above, JP2003-329049A discloses a thin-wall roll bearing which dissolves the problem described above thereby making it maintenance free by sealing a solid lubricant to the inside.

However, in a case of using a product prepared by baking a mixture of a polymeric material comprising a polyolefin as a main ingredient and a lubrication oil as a lubricant, while the lubricant less leaks, since the lubricant ingredient is present in a great absolute amount, it involves a problem of tending to release a great amount of the outgas. Further in a case of the solid lubricant, while the lubrication oil is supplied by the sliding contact of the lubricant with the rolling element or the raceway surface, it also involves a problem that the amount of dust increases by the sliding contact.

In a case of coating the raceway surface with a lubrication film comprising a solid lubricant such as of molybdenum disulfide (MoS), graphite, hexagonal boron nitride (h-BN), fluorinated graphite, etc., while the amount of the outgas is small, it tends to be worn to possibly make the durability insufficient.

In view of the above, it is a subject of the invention to solve the problems involved in the prior art described above and provide a thin-wall roll bearing causing less dusting or outgas and less leaking a lubricant, and excellent in the durability thereby capable of making it maintenance free.

For solving the subject described above, the invention comprises the following constitution. That is, a thin-wall roll bearing of the invention has a feature in a thin-wall rolling bearing comprising an inner ring, an outer ring, a plurality of rolling elements disposed rollingly between the inner ring and the outer ring with a bearing cross sectional ratio of 0.2 or less, in that at least one of the raceway surface of the inner ring and the raceway surface of the outer ring is coated with a lubrication film comprising a lubricant formed by mixing a fluoro resin with a base oil containing at least one of flouor-oil, alkylated cyclopentane, polyphenyl ether, and ester oil.

Provision of the lubrication film described above suppresses contact between metals during rolling operation of the rolling elements and provides low dust scattering and stable lubricity. That is, since the lubrication film comprises the lubricant of the base oil mixed with the fluoro resin, the lubrication oil (base oil) is not exhausted from the raceway surface and stable lubricity is provided. In addition, since an excess lubrication oil (base oil) is trapped by the fluoro-resin, it is low dust and causes less leakage of the lubricant. More preferably, the fluoro-resin is powderized.

The thickness of the lubrication film is preferably 0.1 μm or more and 10 μm or less. While smaller thickness of the lubrication film is preferred for decreasing an amount of dust or an amount of outgas, a larger film thickness is preferred for making the durability of the thin-wall rolling bearing excellent. In view of balance between both of them, the thickness of the lubrication film is, preferably, 0.1 μm or more and 10 μm or less.

The thin-wall rolling bearing of the invention causes low dust scattering and low outgas, less leaks the lubricant and is excellent in the durability.

Figure 26:
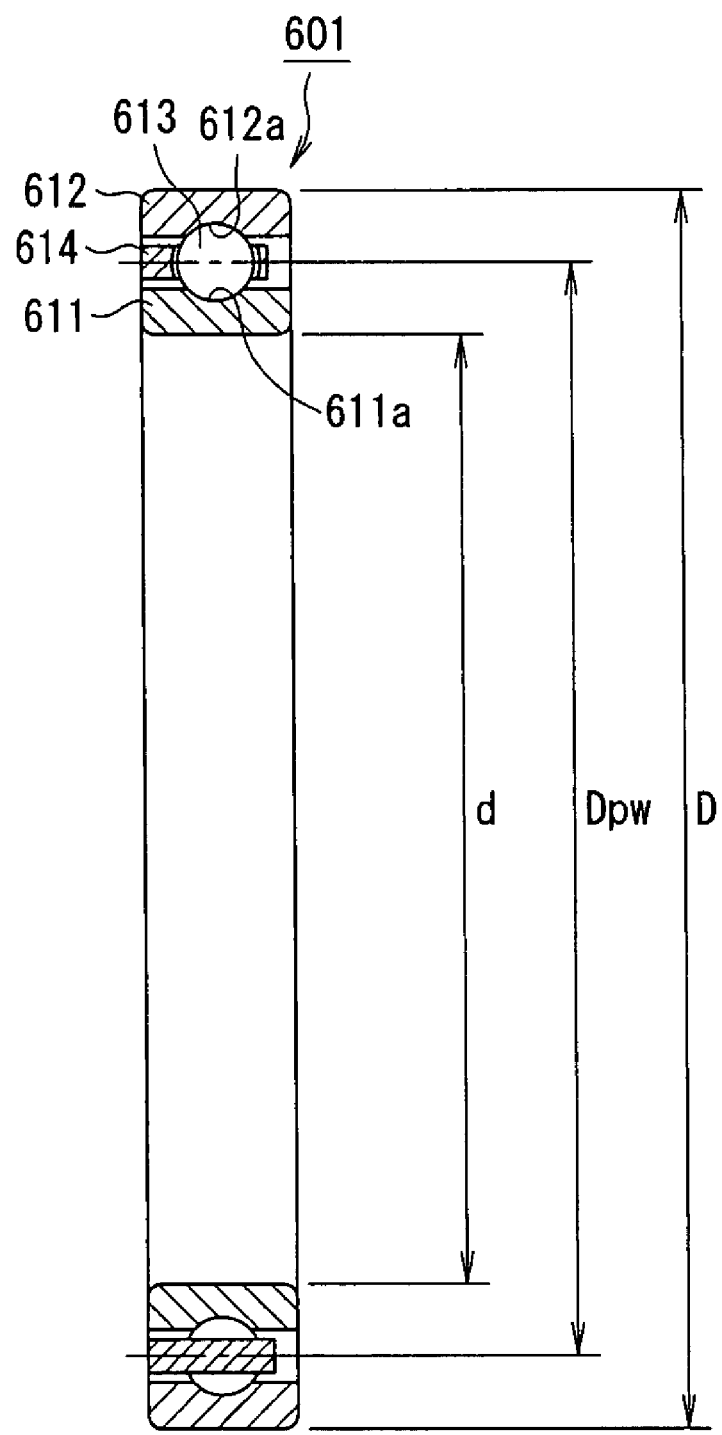
FIG. 26 is a longitudinal cross sectional view showing a thin-wall rolling bearing of a Fourth Embodiment.

An embodiment of the thin-wall rolling bearing according invention is to be described specifically with reference to the drawings. FIG. 26 is a longitudinal cross sectional view showing an embodiment of a thin-wall rolling bearing according to the invention.

A thin-wall rolling bearing 601 of FIG. 26 has an inner ring 611 having a raceway surface 611a at the outer circumferential surface, an outer ring 612 having a raceway surface 612a opposed to the raceway surface 611a at the inner circumferential surface, a plurality of rolling elements (balls) 613 rollingly disposed between both of the raceway surfaces 611a and 612a, and a cage 614 for retaining a plurality of the rolling elements 613 between the inner ring 611 and the outer ring 612. Further, in the thin-wall rolling bearing 601, the bearing cross sectional ratio α represented by the formula described above is 0.2 or less.

Further, at least one of both of the raceway surfaces 611a and 612a is coated with a lubrication film (not illustrated) comprising a lubricant formed by mixing a fluoro resin with a base oil containing at least one of fluoro-oil, alkylated cyclopentane, polyphenyl ether, and ester oil.

Since the thin-wall rolling bearing 601 of this embodiment is lubricated with the lubrication film described above, it less causes dust scattering or outgas and less leaks the lubricant even when it is not equipped with seal or the like. Further, it is excellent in the durability and can be maintenance free. Accordingly, it can be used suitably also under a vacuum circumstance or a clean circumstance. Further, since the rotational resistance of the bearing is extremely smaller compared with the case of conducting lubrication by using a grease, a rotational performance at high accuracy can be obtained.

It is preferred that lubrication film is formed at a required minimum to the raceway surface of the inner ring, the raceway surface of the outer ring, the rolling contact surface of the rolling element, and the sliding portion of the cage. This can suppress dusting due to scattering or the like of excessive lubrication oil (base oil). Further, use of a lubrication oil (base oil) having low vapor pressure can suppress the release of the outgas.

While the kind of the fluoro-resin is not particularly restricted, polytetrafluoroethylene (hereinafter referred to as PTFE), tetrafluoroethylene-perfluoroalkylvinyl ether copolymer (PFA), tetrafluoroethylene-ethylene copolymer (ETFE), tetrafluoroethylene-hexafluoropropylene copolymer (FEP), and polychlorotrifluoroethylene (PCTFE) are preferred, PTFE being most preferred among them.

Further, the fluoro-resin is more preferably in a powdered state and the grain size is preferably from sub-micron order to micron order. Further, while the thickness of the lubrication film is not particularly restricted, it is, preferably, 0.1 μm or more and 10 μm or less in view of the balance between the suppression of dust scattering and outgas and the durability of the bearing.

Then, the base oil is to be described. The fluoro-oil includes fluorine-polyether polymer and polyfluoroalkyl polymer and may further contain derivatives thereof (those having functional groups).

As the fluorine-polyether polymer, polymers having the repeating unit shown by the following chemical formula 9 is preferred. The number average molecular weight is, preferably, 1,000 or more and 50,000 or less. As the derivatives of the fluoro polyether polymer, those in which functional groups having high affinity to a metal are bonded to the fluoro polyether polymer are preferred. Examples of the functional group include epoxy group, amino group, carboxyl group, hydroxyl group, mercapto group, sulfone group, and ester group.

—CXF2X—O— (X is an integer of 1 to 4).  [Chemical Formula 9]

Further, the polyfluoroalkyl polymers include those shown by the following chemical formula 10.

Y in the formula is a functional group of high affinity with a metal as described above.

$CF_3(CF_2)_7$—Y,H$(CF_2)_6$—Y,$CF_2$Cl$(CF_2)_{11}$—Y $(CF_3)_2CF(CF_2)_7$—Y,$CF_2$ClCF$_3$CF$(CF_2)_7$—Y  [Chemical Formula 10]

As the polyfluoro alkyl polymer, those shown in the chemical formula 10 and, in addition, those shown, for example, by the following chemical formulae 11, 12 can be used suitably.

[Chemical formula 11]

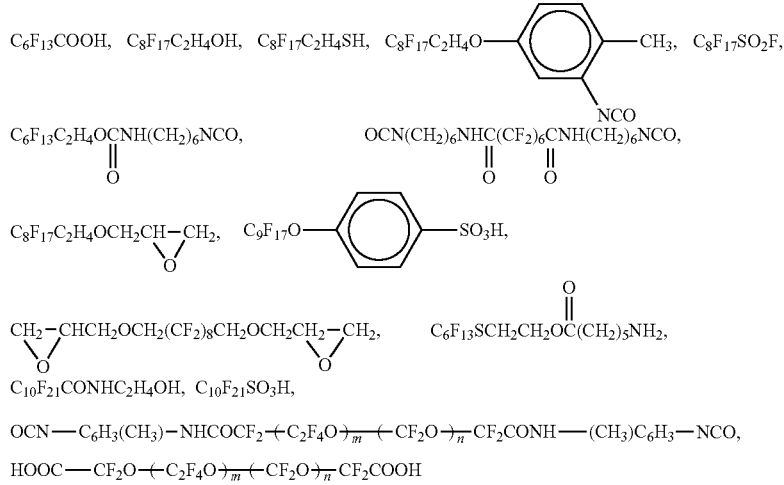

[Chemical formula 12]

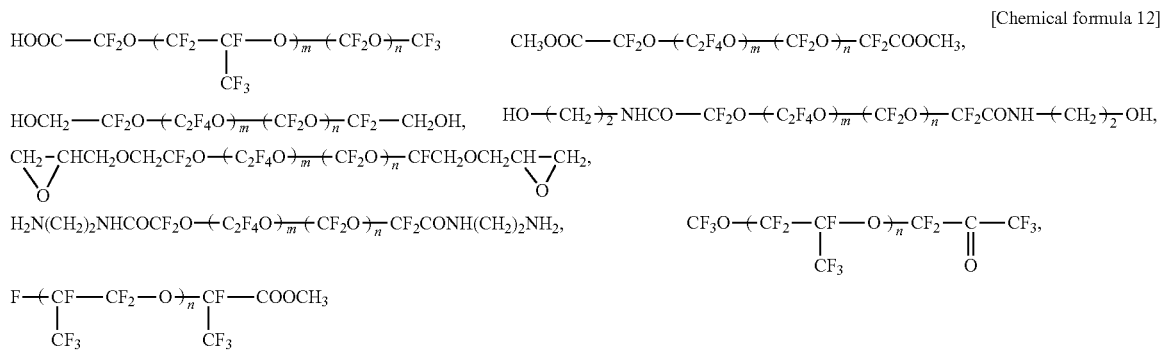

Examples of commercial products of the fluoro-oil having the functional groups described above include, for example, Krytox 157FSL, 157FSM, and 157FSH, manufactured by DuPont Co., Demnum modified products SA, SH, SY-3 manufactured by Daikin Industries Ltd., and FoNblin Z DEAL, Z DIAC, Z DISCO, Z CDL, Z DOL TX2000, etc. manufactured by Solvay Solexis Inc.

Further, as the perfluoropolyether (PFPE) oil as a sort of the fluoro polyether polymer, commercial products can be used and include, for example, S-65, S-100, and S-200, manufactured by Daikin Industries Ltd., FoNblin Z-25, Z-60, and 40/11 manufactured Solvay Solexis Inc., and Krytox 16140 manufactured by DuPont Co.

Further, the alkylated cyclopentanes include, for example, tri(20octyldodecyl)cyclopentane (Synthetic Oil 2001A manufactured by Nye Lubricants Co.), tri-n-octylcyclopentane, tetra-n-octylcyclopentane, penta-n-octylcyclopentane, tri-n-nonylcylopentane, penta-n-decylcyclopentane, penta-n-dodecylcyclopentane, and tetra-2-ethylhexylcyclopentane. Since such alkylated cyclopentanes have low vapor pressure even in vacuum, the base oil less evaporises and outgas release is low even when the thin-wall rolling bearing of the invention is used in vacuum.

Further polyphenyl ethers include, for example, tetraphenyl ether, pentaphenyl ether, alkyldiphenyl ether, monoalkyl triphenyl ether, monoalkyl tetraphenyl ether, and dialkyl teteraphenyl ether. Since such polyphenyl ethers have low vapor pressure and are excellent also in the heat resistance, the thin-wall roll bearing of the invention can be used in vacuum or under a high temperature circumstance.

Further, the ester oils include, for example, Nye Torr5101 manufactured by Nye Lubricants Co.

For each of the inner ring 611, the outer ring 612, the rolling element 613, and the cage 614, metal materials generally used for the bearing material can be used with no troubles. For example, they include, those applied with an appropriate hardening heat treatment to corrosion resistant metal materials, for example, martensitic stainless steel such as JIS standard SUS 440C and precipitation hardening type stainless steels such as JIS standards SUS630. Further for light load application, those applying a surface hardening treatment to austenitic stainless steel such as JIS standard SUS304 and SUS316, and titanium alloys are suitable.

For the cage 614, brass, titanium, etc. are used suitably in addition to the metal materials described above and resin materials can also be used. The resin materials include, for example, fluoro resins such as PTFE and ETFE, and engineering plastics such as polyether ether ketone resin (PEEK), polyphenylene sulfide resin (PPS), polyether sulfone resin (PES), and polyamide resin.

The resin materials may contain fibrous fillers for improving mechanical strength, heat resistance, dimensional stability, etc. While the fibrous fillers are not particularly restricted for the kind, they include, for example, aluminum borate whiskers, potassium titanate whiskers, carbon whiskers, aramid fibers, aromatic polyimide fibers, liquid crystalline polyester fibers, graphite whiskers, glass fibers, carbon fibers, boron fibers, silicon carbide whiskers, silicon nitride whiskers, alumina whiskers, aluminum nitride whiskers, and wollastonite.

The kind of the cage is not particularly restricted and the cage may be a ribbon cage, snap cage, machined cage, or the like. The cage 614 may be saved.

This embodiment shows an example of the invention and the invention is not restricted to this embodiment. For example, for the embodiment, while description has been made to a deep groove ball bearing as an example of the thin-wall rolling bearing, the invention is applicable to various other types of rolling bearings. For example, they include, radial type rolling bearings such as angular contact ball bearings, self-aligning ball bearing, cylindrical roller bearing, tapered roller bearing, needle roller bearing and self-aligning roller bearing, and thrust type rolling bearing such as thrust ball bearing and thrust roller bearing.

Example

The present invention is to be described more specifically below with reference to examples. A rolling bearing (example) of a constitution substantially identical with the thin-wall rolling bearing 601 described above, and an existent thin-wall rolling bearing sealed with a fluoro-grease (comparative example) were provided and respective property of dust emission for each of them was evaluated and compared. The thin-wall rolling bearings of the example and the comparative example are bearing designation NBX15206 manufactured by NSK Limited (inner diameter d: 152.4 mm, outer diameter D: 165.1 mm, width: 6.35 mm, central diameter of the rolling element DPW: 158.75 mm).

At first, the thin-wall bearing of the example is to be described. An inner ring, an outer ring, a rolling element and a cage are assembled into a rolling bearing, which is degreased and cleaned. Then, a lubricant to be described later is supplied to the vicinity of the rolling elements by a dropper and the lubricant is coated to the raceway surface of the inner ring, the raceway surface of the outer ring, the rolling contact surface of the rolling element and the sliding portion of the cage by rotating the rolling bearing for several rotations. The method of depositing the lubricant is not restricted to the coating method described above but may be deposited by a spray method or a dipping method.

When the rolling bearing coated with the lubricant is heated at 100 to 140° C. for 30 min to remove a dilution solvent contained in the lubricant, a lubrication film comprising the lubricant is formed to the raceway surface of the inner ring, the raceway surface of the outer ring, the rolling contact surface of the rolling elements and the sliding portion of the cage. When a baking treatment is applied further, the outgas amount can be preferably decreased further. The condition for the baking treatment includes, for example, a pressure of 10 Pa or lower, a temperature of 100° C. or higher and a treating time for 4 hrs. or more.

Then, the lubricant used for the thin-wall rolling bearing of the example is to be described. The lubricant is formed by mixing 60 mass parts of tri(2-octyldodecyl)cyclopentane (Synthetic Oil 2001A, manufactured by Nye Lubricants Co.) and 40 mass parts of a PTFE powder with a grain size of 1 μm or less, and mixing 1 mass part of the mixture and 99 mass parts of a dilution solvent such as hexane or Asahi Clean AK-225 (manufactured by Asahi Glass Co.). As the PTFE powder, a dispersion in which a PTFE powder is dispersed in a solvent (Dry film RA/IPA manufactured by DuPont Co.) with the amount of the PTFE powder being of a value as described above was used.

Figures 27A, 27B:
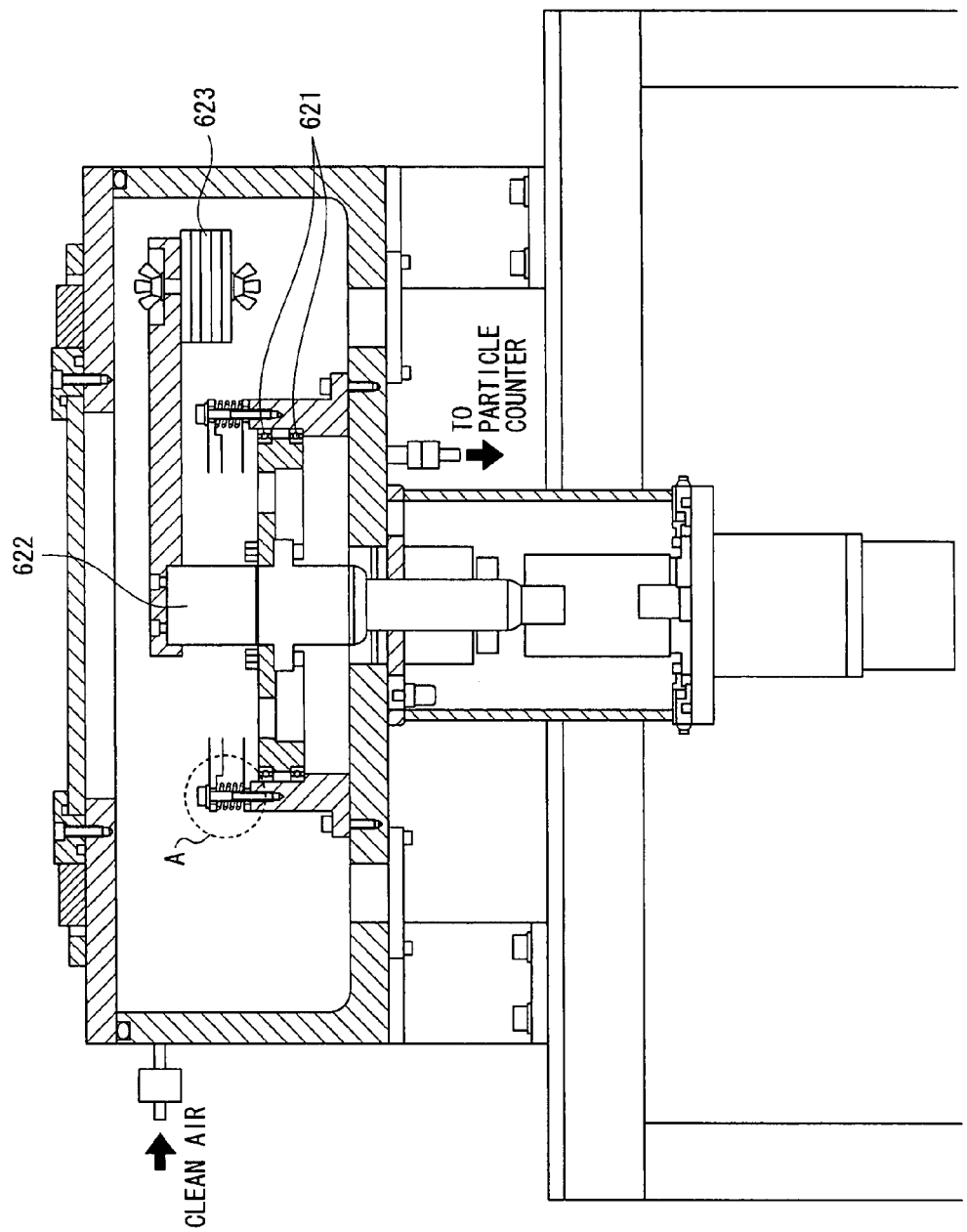
FIGS. 27A and 27B are schematic views for explaining the structure of an apparatus for dust emission measurement.

Then, the evaluation method for the property of dust emission is to be described. The thin-wall rolling bearing of the example and the comparative example were assembled in an apparatus as shown in FIGS. 27A and 27B, driven under the following conditions for 24 hrs and the amount of dust scattering caused in the period was measured. In FIGS. 27A and 27B, are shown a reference 621 for the test bearing, a reference 622 for a shaft, a reference 623 for a moment load and a reference 624 for a coil spring for axial load.

Figure 28:
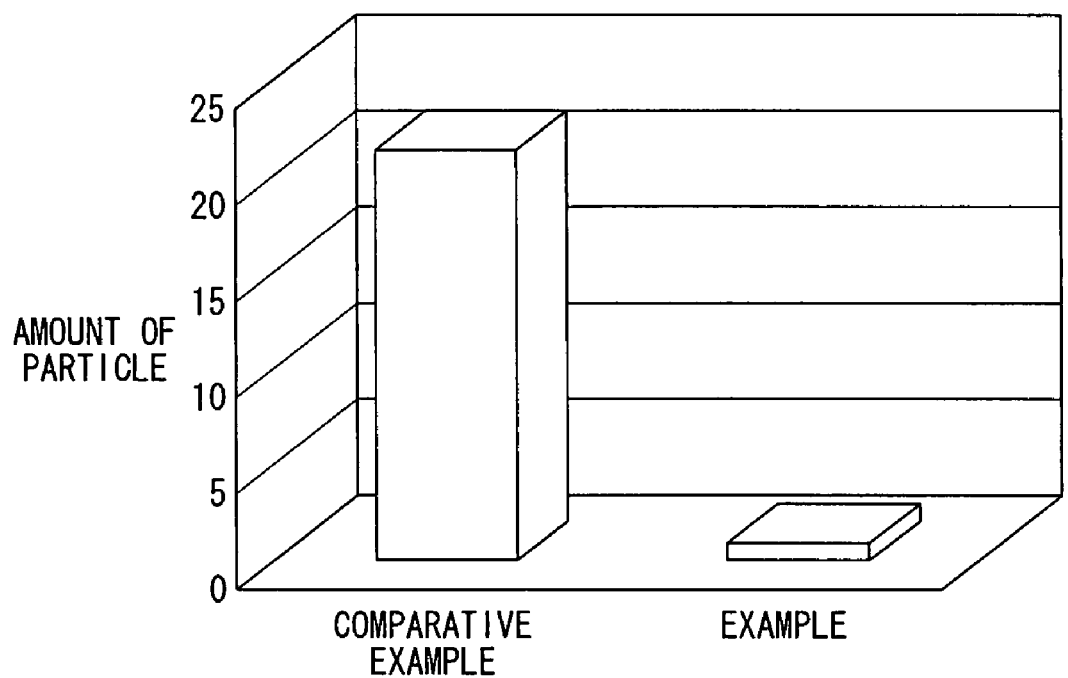
FIG. 28 is a graph showing the result of evaluating the property of dust emission.

Axial load: 18N
Moment load: 1N·m
Swinging angle of actuator: −60° to +60°
Swinging speed of actuator: 40 cycle/min The test result is shown in the graph of FIG. 28. The numerical values of the amount of dust scattering shown in the graph are shown by relative values based on the amount of dust scattering for the thin-wall rolling bearing of the example being assumed as 1. As can be seen from the graph, the thin-wall rolling bearing of the example is extremely less dust scattering with the amount of dust scattering being as ¹⁄₂₀, compared with the thin-wall rolling bearing of the comparative example sealed with the fluoro-grease.

Since the thin-wall rolling bearing of the invention can be used suitably even under a vacuum circumstance and a clean circumstance, it can be used suitably, for example, for a conveying apparatus and conveying manipulators of semiconductor production facilities, liquid crystal panel production facilities, and hard disk production facilities.

Fifth Embodiment

The invention concerns a rolling device and, particularly, relates to a rolling device applied with lubrication to the rolling portion. It also includes portions having a relation with the bearings of the first to Fourth Embodiments.

Rolling devices such as a rolling bearing, a linear guide, a linear bearing and, a ball screw are sometimes used, for example, in a conveying system device disposed in the inside of a semiconductor production apparatus. For the rolling device used under a vacuum circumstance or in a clean atmosphere such as a clean room (hereinafter sometimes referred to as "under vacuum circumstance, etc."), it is demanded that the amount of dust scattering is low in addition to the smoothness in the operation and high durability.

Accordingly, in the prior art, the lubricant is coated and sealed to the rolling portion of the rolling device thereby preventing wear of the rolling elements and the portion in contact with the rolling element and keeping smoothness of the operation. Further, in a rolling device used under the vacuum circumstance, etc. where contamination due to dust scattering or the like is scarcely permitted, the amount of the lubricant scattering or evaporating to the outside of the rolling device is suppressed by using a fluoro-lubricant comprising a fluoro-lubrication oil of extremely low volatility as a base oil.

JP2001-173667A and JP62-246621A show examples of rolling devices using such fluoro-lubricants. In the rolling device, a fluoro-lubricant is deposited to the lubrication portion to form a lubrication film comprising the fluoro-lubricant. Further, a fluoro-lubricant having functional groups in the molecular structure and with high affinity to the bearing material is used as the fluoro-lubricant thereby forming a lubrication film strongly adsorbing to the bearing material to attain a less dust scattering and a durability.

Further as an example of the fluoro-lubricant, JP1-284542A discloses a fluoro-grease containing a fluoro-lubrication oil as a base oil and polytetrafluoroethylene as a thickener. Further, JP2003-13974A and JP2002-357225A disclose examples of rolling devices using a fluoro-grease by sealing. Further, JP5-240257A discloses a rolling bearing using a fluoro-solid lubricant mainly containing in the polytetrafluoroethylene.

However, in a case of using the fluoro-grease, while it is necessary to decrease the amount of use of the fluoro-grease in order to suppress external scattering, this obliges to make the lubrication effect insufficient and lowers the durability. As a countermeasure, while it may be considered to coat the rolling portion with the fluoro-polymer solid lubricant, in a state where a comparatively large axial load is applied, since flaking or chipping of the solid lubricant is resulted or the amount of dust scattering due to wear is increased, it is sometimes insufficient in view of the durability and the property of dust emission.

Further, while a method of improving the property of dust emission and the durability by depositing a fluoro-lubrication oil having functional groups in the molecular structure has been proposed as described above, molecules chemically deposited to the bearing material or the like are of a single molecule layer and the excessive fluoro-lubrication oil having functional groups is not chemically deposited. Generally, a fluoro-lubrication oil having functional groups has higher vapor pressure compared with a fluoro-lubrication oil not having the functional groups. Accordingly, an outgas tends to be released by evaporation of the excessive fluoro-lubrication oil not deposited chemically. Further, since the excessive fluoro-lubrication oil is released also as dusting particles, a countermeasure capable of suppressing the outgas or the dust scattering at a higher level has been demanded for using the same under a circumstance in which organic contamination due to the outgas or the dust scattering is scarcely permitted. In this respect, in a case where the fluoro-lubricant comprises only a single molecular layer with no presence of excessive fluoro-lubrication oil is free from the problem of the outgas, etc. described above, it cannot but be said that the durability is insufficient.

The invention has been achieved in view of the problems described above and intends to provide a rolling device usable suitably under a vacuum circumstance or the like, with less dusts or outgases generated from the device, and having excellent durability.

The rolling device of the invention has a feature in a rolling device having an inner member having a race surface at the outer surface, an outer member having a raceway surface opposed to the raceway surface of the inner member, and disposed outside of the inner member and a plurality of rolling elements disposed rollingly in both of the raceway surfaces, in that a lubrication film comprising a lubricant containing a fluoro-resin and a lubrication oil having a vapor pressure at 20° C. of $1\times10^{-5}$ Pa or less is formed by an oil plating treatment to at least one of the raceway surface of the outer member, the raceway surface of the inner member, and the rolling contact surface of the rolling element.

The oil plating treatment is a treatment of depositing a thin film to the raceway surface of the outer member, the raceway surface of the inner member, or the rolling contact surface of the rolling element. For example, the lubrication film of the invention can be formed as will be described later by depositing a diluted lubricant to the rolling contact surface or the like and removing a dilution solvent by a heat treatment.

As a result of earnest studies, the present inventors have found that addition of fluoro-resin to the lubrication oil is effective for attaining lowering of the amount of the dust scattering. When a lubrication film is formed with a lubricant containing a lubrication oil having a vapor pressure at 20° C. of $1\times10^{-5}$ Pa or less and a fluoro-resin, since the lubricant is always supplied to the raceway surface, the raceway surface and the rolling contact surface are not in contact directly, and the excessive lubrication oil is trapped by the fluoro-resin, the lubrication effect can be maintained stably with less dust scattering and low outgas. Further, since the fluidity is maintained different from a solid lubrication film, flaking or chipping caused in the solid lubrication film and dust scattering due to wear are suppressed. Further, since the lubrication film is formed by the oil plating treatment, the rotational resistance is decreased extremely compared with usual grease lubrication or the like, so that rotational performance at high accuracy is obtained.

As described above, the lubrication oil in the invention has a vapor pressure at 20° C. of $1\times10^{-5}$ Pa or less and those having lower vapor pressure are preferred since the outgas is decreased. On the other hand, in a case where the vapor pressure at 20° C. exceeds $1\times10^{-5}$ Pa, no sufficient effect for suppressing the outgas can be obtained even with addition of the fluoro-resin. Further, while dust scattering and the outgas have to be suppressed so far by thinly forming the lubrication film, since the effect of suppressing the dust scattering and the outgas can be obtained by the addition of the fluoro-resin in the invention, the lubrication film can be formed to a somewhat increased thickness, so that improvement can also be obtained for the durability. That is, the lubrication film is preferably formed to such an extent as can cover respectively roughness protrusions on the surface to be formed with the lubrication film. This is because a portion of the protrusion is easily exposed as the thickness of the lubrication film decreased to form a boundary lubrication state where an oil film on the mating side in contact therewith tends to be scraped off to make the durability insufficient such that local seizing tends to occur easily. On the other hand, in a case where the thickness of the lubrication film is excessively large, since an excessive lubricant tends to be scattered, the effect of suppressing the dust scattering or the outgas is lowered. The thickness of the lubrication film can be controlled, for example, in the oil plating treatment to be described later by controlling the dilution concentration of the dilution solution for the lubricant to be deposited to the surface where the lubrication film is to be formed.

Further, as a fluoro-resin, polytetrafluoroethylene (hereinafter simply referred to as PTFE), as well as tetrafluoroethylene perfluoro vinyl ether copolymer (PFA), and fluorinated ethylenepropylene copolymer (FEP), etc. can be used suitably.

In the rolling device of the invention, the lubrication oil is, preferably, a fluoro-lubrication oil. When the fluoro-lubrication oil is used as the lubrication oil, since it is extremely less evaporating, the outgas is reduced. Further, in the rolling device of the invention, the content of the fluoro-resin in the lubricant is preferably 5 mass % or more and 40 mass % or less. In a case where the content of the fluoro-resin is less than 5 mass %, the effect of suppressing the dust scattering is deteriorated. In a case where it is higher than 40 mass %, since the content of the lubrication oil is lowered, the lubricity is deteriorated. More preferably, it is 10 mass % or less and 30 mass % or less.

Further, in the rolling device of the invention, the fluoro-lubrication oil preferably comprises 10 mass % or more and 98 mass % or less of the fluoro-lubrication oil not having the functional groups in the molecular structure and 90 mass % or less and 2 mass % or more of the fluoro-lubrication oil having the functional groups in the molecular structure.

As described above, by forming a lubrication film adhered strongly to the raceway surface or the like by using a fluoro-lubrication oil having functional groups in the molecular structure with high affinity to the material constituting the raceway surface or the like as the fluoro-lubrication oil, the durability and the effect of suppressing the dust scattering can be improved. On the other hand, since the fluoro-lubrication oil having the functional groups in the molecular structure generally has a high vapor pressure and tends to generate an outgas, the content thereof is desirably controlled so as to adjust the amount of the outgas in accordance with the condition of the working circumstance while maintaining the effect provided by strong adhesion to the material.

That is, while the outgas can be suppressed more than usual by the addition of the fluoro-resin to the lubrication oil in a circumstance where the demand for the suppression of the outgas is severe, it is desirable to constitute the fluoro-lubrication oil with the composition described above, that is, 10 mass % or more and 98 mass % or less of the fluoro-lubrication oil not having the functional groups in the molecular structure and 90 mass % or less and 2 mass % or more of the fluoro-lubrication oil having the functional groups in the molecular structure.

Further, in a circumstance where the demand for the suppression of the outgas is severer, it is desirable to constitute the fluoro-lubrication oil with 50 mass % or more and 98 mass % or less of the fluoro-lubrication oil not having functional groups in the molecular structure and 50 mass % or less and 2 mass % or more of the fluoro-lubrication oil having the functional groups in the molecular structure. Further, in a circumstance where the demand for suppressing the outgas is most severer, it is preferred to use only the fluoro-lubrication oil not having the functional groups in the molecular structure as the fluoro-lubrication and adding a fluoro-resin.

Further, in the rolling device of the invention, the lubrication oil preferably contains an alkylated cyclopentane or polyphenyl ether as the main ingredient. Since the lubrication oil containing the alkylated cyclopentane polyphenyl ether as the main ingredient has a vapor pressure at 20° C. of $1\times10^{-5}$ Pa or less, it has an effect of suppressing the outgas also under vacuum. In addition, the hydrocarbon lubrication oils as described above are excellent in the lubricity compared with the fluoro-lubrication oil and extends the life of the rolling device.

Further, in the rolling device of the invention, it is preferred that the content of the fluoro-resin in the lubricant is 5 mass % or more and 60 mass % or less. In a case where the content of the fluoro-resin is less than 5 mass %, the effect of suppressing the dust scattering is deteriorated. In a case where it is higher than 60 mass %, since the content of the lubrication oil is lowered, the lubricity is deteriorated to increase the torque. More preferably, it is 5 mass % or more and 40 mass % or less.

Further, in the rolling device of the invention, the lubrication film is preferably formed by depositing a dilution solution of a lubricant comprising 0.5 mass % or more and 10 mass % or less of the lubricant and 99.5 mass % or less and 90 mass % or more of a dilution solution to the surface to be formed with the lubrication film, and removing the dilution solvent by heating at 50° C. or higher and 250° C. or lower for 15 min or more and 300 min or less.

With the oil plating treatment as described above, a lubrication film providing the function and the effect described above can be formed. In this case, when the content of the lubricant is less than 0.5 mol %, since the thickness of the lubrication film deposited to the raceway surface and the rolling contact surface is excessively reduced, the durability is insufficient as described above. On the other hand, when it is more than 10 mass %, since the lubricant dilution solution becomes viscous to give undesired effects on the uniform deposition or working property, as well as the thickness of the lubrication film becomes excessive, deterioration is resulted to the effect of suppressing the dust scattering and the outgas as described above.

Further, for the heating temperature and the heating time in a case where the upper limit temperature and the upper limit heating time described above are exceeded, the lubricity of the lubricant constituting the lubrication film is deteriorated, and they cause lowering of the hardness and change of the dimension for the raceway surface of the inner member and the outer member and the rolling contact surface of the rolling element. On the other hand, in a case where they are set to an excessively low temperature or short heating time, the dilution solution can not be removed completely. Accordingly, in an actual oil plating treatment, the heating temperature and the heating time are set within the range as described above and to a sufficient level for removing the dilution solution in accordance with the kind and the content of the dilution solvent to be used. Further, the material constituting the raceway surface, etc. is also taken into consideration and, in a case of using, for example, quenched and tempered steel, a heating temperature and a heating time are set so as not to lower the hardness and change the dimension.

The deposition method of the lubricant dilution solution includes, for example, coating, spraying, etc. Alternatively, a method of dipping into the lubricant dilution solution and then pulling up the same can also be used. In this case, an assembled rolling device may be dipped, or parts of the rolling device may be dipped to form a lubrication film and then the device may be assembled.

Further, the dilution solvent can be used as the solvent both for the lubrication oil and the fluoro-resin and specific examples include substitution fron type dilution solvent, perfluoro carbon (PEC), Novec (manufactured by Sumitomo 3M Limited) as fluoro-inactive solution, Bertrel (manufactured by DuPont Co.), and Garden (manufactured by Aujimond Co.). In a case of using the hydrocarbon lubrication oil, hexane or the like can also be used as the dilution solvent.

Further, in the rolling device of the invention, it is preferred that the centerline average roughness as Ra for the raceway surface of the outer member and the raceway surface of the inner member are 0.02 µm or more and 0.2 µm or less respectively and the centerline average roughness Ra for the rolling contact surface of the rolling element is 0.002 μm or more and 0.01 μm or less.

By setting the surface roughness as described above, the surface pressure of the contact surface can be suppressed to improve the durability. In addition, by setting the surface roughness as described above, since the lubrication film can be suppressed to a small amount, scattering of the excessive lubrication oil can be prevented to improve the effect of suppressing the dust scattering and the outgas as well.

Further, the rolling device of the invention can be used in vacuum or in a clean room. Since the amount of dust scattering and amount of the outgas are extremely small, the rolling device of the invention is suitable for use in vacuum or in a clean room for precision machine production factories, etc.

As has been described above specifically according to the rolling device of the invention, since the lubrication film comprising the lubricant containing the lubrication oil and the fluoro-resin is formed, dust scattering and outgas can be suppressed while maintaining high rotational performance and it is also excellent in the durability.

Then, the embodiment of the invention is to be described with reference to the drawings. In each of the drawings referred to in the following description, portions identical with those in other drawings in the Fifth Embodiment are shown by identical references.

Fifth Embodiment A

Figure 29:
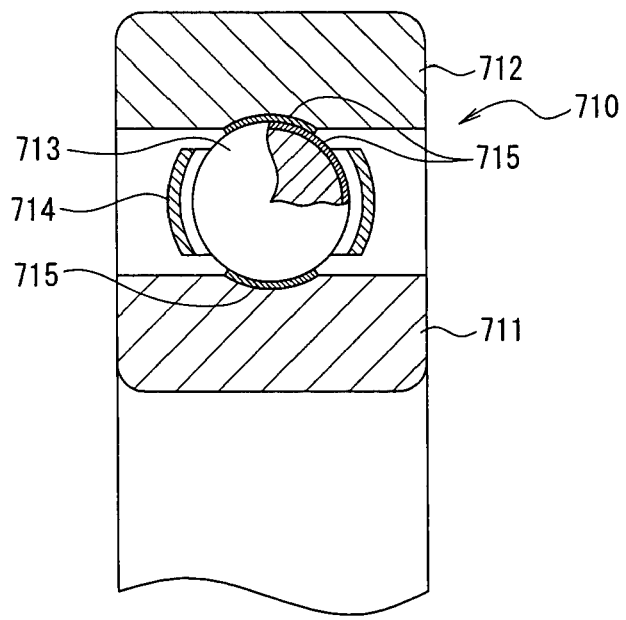
FIG. 29 is a cross sectional view of a rolling bearing of a Fifth Embodiment A formed with a lubrication film.

FIG. 29 is a cross sectional view of a rolling bearing (rolling device) 710 applied with an oil plating treatment using a lubricant (fluoro-lubricant) containing a fluoro lubrication oil and a fluoro-resin while cutting a portion of a ball 713 as a rolling element. The rolling bearing 710 comprises an outer ring (outer member) 712, an inner ring (inner member) 711, a ball 713, and a ribbon cage manufactured by pressing.

More specifically, an outer ring 712, an inner ring 711, a ball 713, and a cage 714 are formed of a metal material used generally for bearings, as well as formed, for example, of a metal material having corrosion resistance. The metal material of this kind includes bearing steels such as JIS Standard SUJ2, martensitic stainless steel such as JIS Standard SUS440C, precipitated hardened type stainless steel such as JIS standard SUS630, and those metal materials applied with an appropriate hardening heat treatment such as a carburising treatment, a nitriding treatment, or a film treatment with diamond-like carbon.

Among the hard films obtained by the hardening heat treatment, a diamond-like carbon film is particularly preferred since diamond-like carbon has a high hardness and is not worn per se and has a property of not wearing mating member. Further, the diamond-like carbon in a form of containing a metal element is also suitable.

The method of forming the hard film is not particularly restricted and the film can be formed by a method such as sputtering, plasma CVD, or ion plating. In a case where the hard film is a diamond-like carbon film, an unbalanced magnetron sputtering method (non-equilibrium sputtering method) as a sort of sputtering is suitable.

The thickness of the hard film is preferably 0.5 μm or more and 10 μm or less. In a case where the thickness of the hard film is less than 0.5 μm, the wear resistance cannot be provided. On the other hand, in a case where the thickness of the hard film exceeds 10 μm, it is not preferred since the hard film may possibly be fractured by the internal stress of the hard film per se, and, in addition, the film forming cost is increased.

Particularly, in a case where the hard film is a diamond-like carbon film, it is more preferred that the film thickness is 1 μm or more and 10 μm or less.

Further, in a case where the raceway ring and the rolling element is made of steel such as SUJ2, stainless steel or the like, an intermediate layer comprising at least one metal selected from Cr, W, Ti, Si, Ni, Fe, etc. may be disposed between the underlayer made of the steel and the diamond-like carbon film. Alternatively, an intermediate gradient layer comprising the metal and carbon with the carbon concentration being increased toward the diamond-like carbon film as the uppermost layer. The thickness of the intermediate layer or the intermediate gradient layer is preferably 0.1 μm or more and 5 μm or less.

In a case where the rolling bearing is used for light load application, for example, austenitic stainless steel such as JIS Standard SUS304 and SUS316, and a titanium alloy applied with a surface hardening treatment can be used as the metal material. For the ball 713, ceramics such as silicon nitride, alumina and, zirconia can be used in addition to the metal material described above. Among the metal materials and ceramics set forth above, use of materials having corrosion resistance is preferred and, particularly, use of a martensitic stainless steel for the outer ring 712 and the inner ring 711 and use of martensitic stainless steel or ceramics for ball 713 are preferred. The reason is as described below. Usually, a method of adding an anti-rusting agent to the lubricant is adopted for providing the rolling bearing with corrosion resistance. However, since the anti-rusting agent tends to be evaporated more compared with the fluoro-lubricant constituting the lubrication film of the invention, addition of the anti-rusting agent results in a factor of increasing the dust scattering or the outgas. Then, since the corrosion resistance can be attained and the amount of the lubricant used can be decreased by using the corrosion resistant material for the inner ring 711, the outer ring 712, etc., suppression of the dust scattering and the outgas as the object of the invention can also be attained.

Further, for the cage 714, while brass, titanium material or the like in addition to the metal material described above are used suitably, synthetic resin materials can also be used. As the synthetic resin material, for example, fluoro-resins such as PTFE, ethylene tetrafluoroethylene (ETFE), engineering plastics such as polyether ether ketone (PEEK), polyphenylene sulfide (PPS), polyether sulfone (PES), and nylon 46 can also be used. Reinforcing fibers such as glass fibers may be added to the synthetic resin materials. The cage 714 may be in a snap fit or machined type in addition to the ribbon type.

Figure 30:
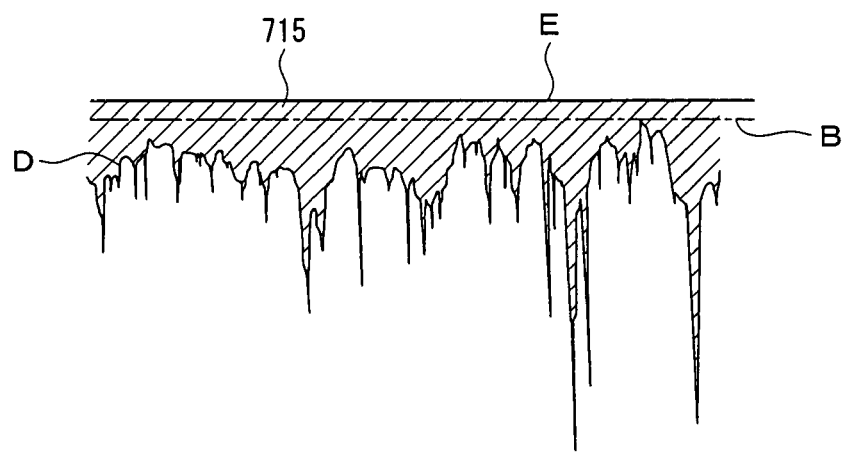
FIG. 30 is an enlarged schematic view showing the state of forming a lubrication film of a Fifth Embodiment A.

Then, in the rolling bearing 710 in this embodiment, a lubrication film 715 comprising a fluoro-lubricant is formed by an oil plating treatment to the contact surface of the outer ring 712 with the ball 713 (raceway surface), the contact surface of the inner ring 711 with the ball 713 (raceway surface) and the rolling contact surface of the ball 713. FIG. 30 is an enlarged schematic view showing the state of the lubrication film to the raceway surface of the outer ring 712, the raceway surface of the inner ring 711, or the rolling contact surface of the ball 713. The rolling bearing 710 shown in FIG. 30 is formed with a lubrication film 715 (to a position by a solid line E in the drawing) to such an extent as exceeding the crest line (shown by a dotted chain B in the drawing) of the roughness at the surface D to be formed with the lubrication film 715. The durability can be improved by covering the surface D to such an extent that the crests of the roughness are not exposed respectively as described above. While the lubrication film 715 is preferably formed continuously to the raceway surface or the like as shown in FIG. 30, it may also be formed discontinuously, for example, in an island shape.

Further, in the rolling bearing 710 of this embodiment, the centerline average roughnesses Ra for the raceway surface of the outer ring 712 and the raceway surface for the inner ring 711 are set to 0.02 µm or more and 0.2 µm or less, respectively and the center average roughness Ra for the rolling contact surface of the ball 713 is set to 0.002 µm or more and 0.01 µm or less. By setting to such surface roughness, it is possible to suppress the amount of the lubrication film 715 to be formed to improve the effect of suppressing the dust scattering. The fluoro-lubricant forming the lubrication film 715 contains a PTFE powder as the fluoro-resin and the fluoro-lubrication oil, which is in a so-called gel state.

As the fluoro-lubrication oil, for example, a fluoro-polyether polymer or a polyfluoroalkyl polymer is used. The fluoropolyether polymer includes polymers having a unit represented by the general formula of —CxF2x—O— (X is an integer of 1 to 4) as a main repeating unit having a number average molecular weight of 1000 to 50,000. Further, the polyfluoroalkyl polymer is represented by the formula: R1—(CF2)n—R2 (n is natural number), and R1 and R2 include those shown by the following chemical formula 13. R1 and R2 may be identical or different with each other.

[Chemical formula 13]

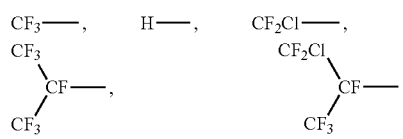

[Chemical formula 13]

Further, for the fluoro-lubrication oil, those having functional groups in the molecular structure may also be added by a predetermined amount in addition to those not having the functional groups in the molecular structure. For the functional groups, those having high affinity with metals, for example, epoxy group, amino group, carboxyl group, hydroxyl group, mercapto group, sulfone group, or ester group are preferred and examples of the fluoro lubrication oil having the functional groups in the molecular structure include those shown by the following chemical formulae 14, 15.

[Chemical formula 14]

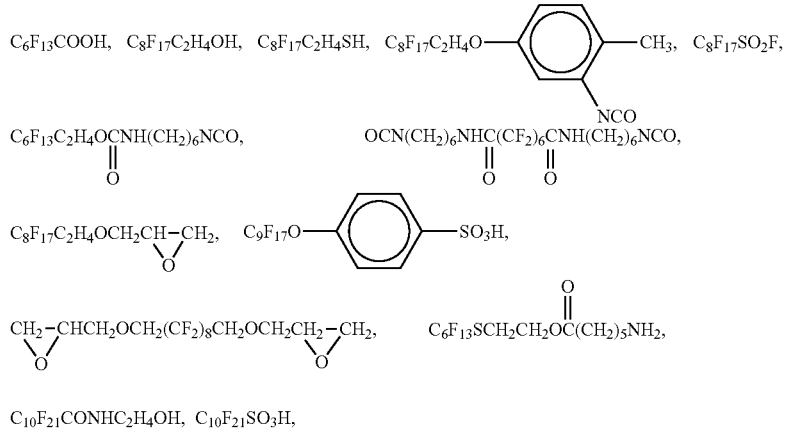

[Chemical formula 14]

[Chemical formula 15]

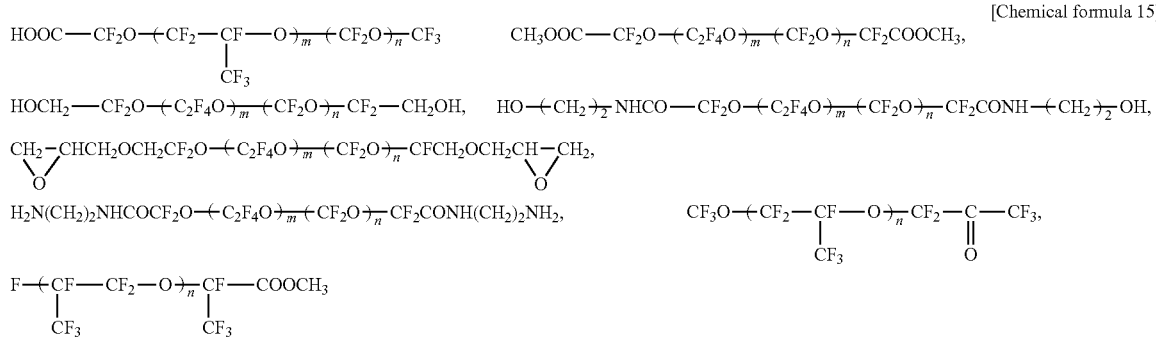

[Chemical formula 15]

As the fluoro-lubrication oil, more specifically, perfluoropolyether (PEPE) or a mixture with derivatives thereof, for example, FONBLIN Y standard, FONBLIN emulsion (FE20, EM04, etc.) or FONBLIN Z derivatives (FONBLIN Z DEAL, FONBLIN Z DIAC, FONBLIN Z DISOC, FONBLIN Z DOL, FONBLIN Z DOLTX2000, FONBLIN Z TETRAOL, etc), trade name of products of Aujimond Co. can be used suitably.

As the fluoro-resin, PTFE, as well as a tetrafluoroethylene perfluoro vinyl ether copolymer (PFA), a fluoroethylene propylene copolymer (FEP), etc. can be used.

A mixture of a fluoro-lubrication oil and a PTFE powder is used as the fluoro-lubricant. However, in the state of mixing the PTFE powder with each of the fluoro-lubrication oils exemplified above as it is, since the concentration is high, it is preferred to use a fluoro-lubricant dilution solution diluted with an appropriate dilution solvent as will be described later is preferably used for oil plating.

Then, an example of the oil plating treatment is to be described. At first, the outer ring 712, the inner ring 711, the ball 713, and the cage 714 are assembled respectively into a completed state of the rolling bearing 710 and then a prepared fluoro-lubricant dilution solution is injected by a necessary amount by means of a dropper or the like to a portion where the ball 713 is present between the outer ring 712 and the inner ring 711 after degreasing cleaning. Then, by rotating rolling bearing 710 several times, the fluoro-lubricant dilution solution is deposited to the rolling portion and the sliding movement portion of the outer ring 712, the inner ring 711, the ball 713, and the cage 714. Supply of the fluoro-lubricant dilution solution may be conducted by coating or conducted by spraying using a spray. Alternatively, the fluoro-lubricant dilution solution may be supplied also by dipping and then pulling up the assembled rolling bearing 710 into and out of a reservoir for the fluoro-lubricant dilution solution.

The fluoro-lubrication oil prepared herein comprises, for example, 90 mass % of FONBLIN Z 25 (fluoro-lubrication oil not having functional groups in the molecular structure) and 10 mass % of FONBLIN Z DOL (fluoro-lubrication oil having functional group in the molecular structure). The deposited fluoro-lubricant dilution solution is obtained by preparing a fluoro-lubricant in which 80 mass % of the fluoro-lubrication oil and 20 mass % of a PTFE powder with a grain size of 1 μm or less are mixed together, and diluting the same till 1 mass % with a dilution solvent, Asahi Clean AT-225 (manufactured by Asahi Glass Co.).

Then, the entire rolling bearing 710 deposited with the fluoro-lubricant dilution solution was heated at 120 to 140° C. for about 30 min, and the dilution solvent contained in the deposited fluoro-lubricant dilution solution is removed. In this way, a lubrication film comprising the fluoro-lubricant can be formed. For the embodiment described above, a test for an amount of dust scattering, a test for outgas rate, and a test for a torque endurance were conducted, for which description is to be made. For a comparative example, in the test for an amount of dust scattering, the test for the outgas rate, and the test for the torque endurance, a fluoro-lubricant consisting only of the fluoro-lubrication oil having functional groups in the molecular structure, specifically, a fluorine-containing polymer having carboxyl groups at terminal ends of the molecular structure (FONBLIN Z DIAC) was constituted and used. Other conditions such as the dilution solvent, the oil plating treatment method or the constitution of the rolling bearing are identical with those described above. The dilution concentration of the fluoro-lubricant dilution solution used for the oil plating treatment was set to 1% both for the example and the comparative example.

Further, the test bearing is bearing designation 608 manufactured by NSK Ltd. Further, the surface roughness Ra of the raceway surfaces for the inner ring and the outer ring is set to 0.05 μm and the surface roughness Ra of the ball is set to 0.005 μm respectively and formed with the lubrication film by the oil plating treatment as described above.

Figure 31A:
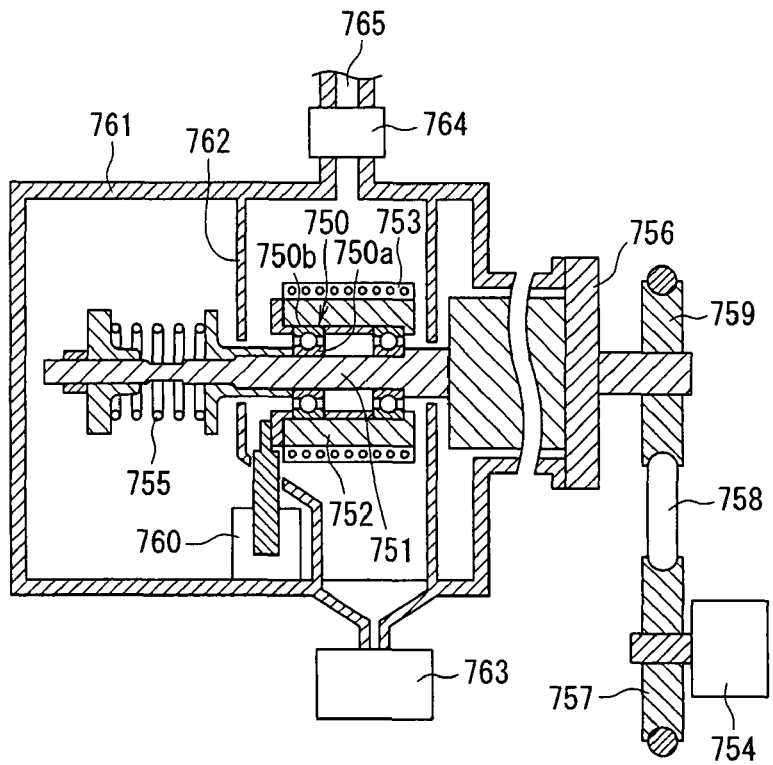
FIG. 31A is a view for explaining a rolling bearing rotation tester and FIG. 31B is a graph showing the result of the test for amount of dust.

At first, a test for the amount of dust scattering is to be described. FIG. 31A shows a bearing rotation tester used upon conducting the test for the amount of dust scattering (manufactured by NSK Ltd.). An inner ring 750a of the test bearing 750 is attached to a spindle shaft (made of SUS440C) 751 of the bearing rotation tester. The axial load of the test bearing 750 is adjustable by a spring 755.

Then, a magnetic fluid seal unit 756 is disposed to one end of the spindle shaft 751, and the rotation torque of a motor 754 is transmitted to the spindle shaft 751 by way of a pulley 757, a belt 758, a pulley 759, and the magnetic fluid seal unit 756. On the other hand, the outer ring 750b of the test bearing 750 is connected by way of a housing 752 to a minute load converter 760 and, accordingly, the torque of the test bearing 750 can be measured by using the minute load converter 760.

Further, the test bearing 750 is surrounded with a container 761 and a partition wall 762, and the bottom of the space is connected with a laser light scattering type particle counter 763. An air introduction port 765 is disposed above the surrounded space by way of a filter 764. Then, by supplying clean air at a predetermined flow rate into the space from the air introduction port 765 into the space surrounded with the container 761 and the partition wall 762, since an air stream is caused from the air introduction port 765 to the particle counter 763, the amount of an abrasion powder resulted from the test bearing 750 can be detected by the particle counter 763.

Figure 31B:
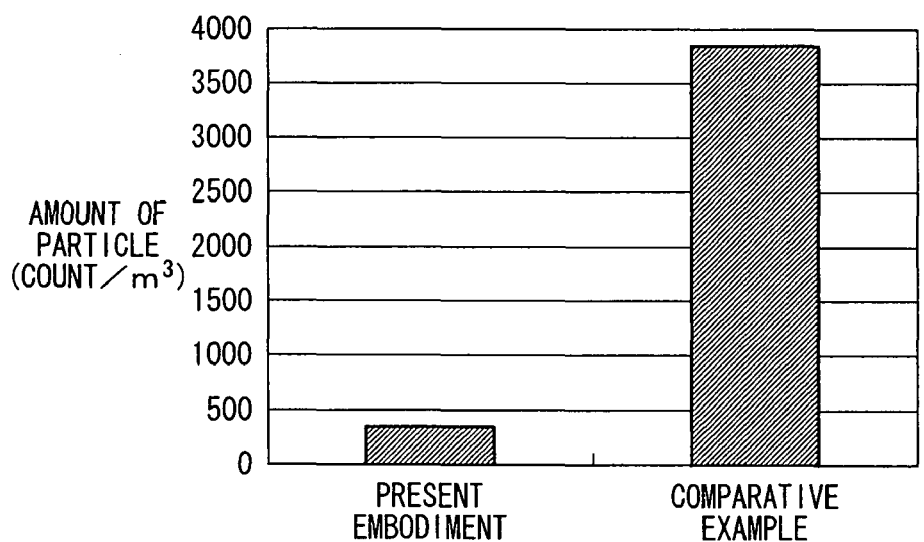
Figure 32A:
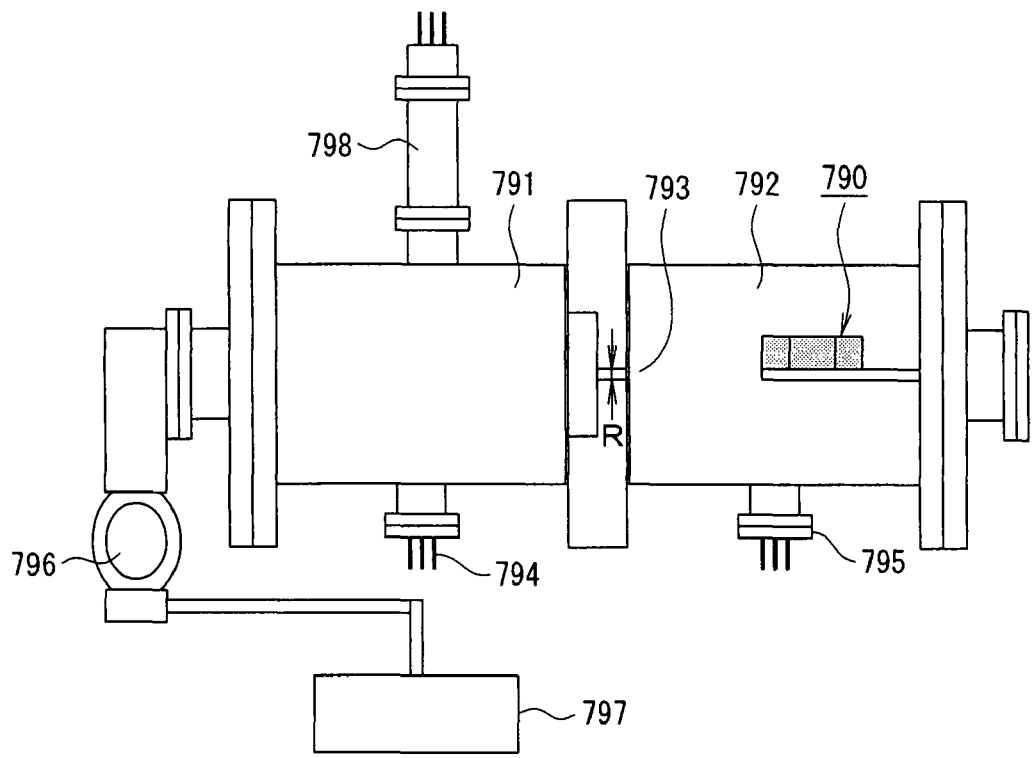
FIG. 32A is a view showing an outgas rate testing apparatus and FIG. 32B is a graph showing the result of an outgas rate.

As a result of conducting the test for the amount of dust scattering under the test conditions at a rotational speed of the test bearing 750 of 1000 rpm and under a load of 50N, as shown in FIG. 31B, the amount of particle (count/m3) in this embodiment was at an extremely low level as 1/10 or less compared with that of the comparative example. Then, the test for the outgas rate (throughput method) is to be described. FIG. 32A shows an evaluation testing apparatus for the outgas rate used in this test.

In the evaluation testing apparatus for the outgas rate, a sample chamber 792 in which a test bearing 790 is contained and an analysis chamber 791 connected with a turbo molecular pump 796 and a rotary pump 797 are in communication through an orifice 793 having a circular cross section with a diameter R of 2 to 3 mm. Then, gases in the analysis chamber 791 are sucked by the turbo molecular pump 796 and the rotary pump 797, since the air pressure in the analysis chamber 791 is lower than that in the sample chamber 792, gases in the sample chamber 792 flow through the orifice 793 to the inside of the analysis chamber 791. In the analysis chamber 791 in the drawing, a quadruple mass spectrometer 798 is also disposed, so that the kinds of gases generated in the sample chamber 792 and flowing into the analysis chamber 791 can be analyzed.

In a state where gases flow from the sample chamber 792 to the analysis chamber 791, air pressures are measured by ion gages 794 and 795 placed respectively in the sample chamber 792 and the analysis chamber 791, and the generation rate of the outgas (outgas rate) from the test bearing 790 is measured. The outgas rate is determined by the following formula (1)

$$Qb = C(P2 - P1) - Qc \qquad (1)$$

Each of the values in the formula (1) is as shown below.
Qb: outgas rate from the test bearing (Pa·m3/s)
Qc: outgas rate in the chamber (Pa·m3/s)
C: conductance of the orifice (constant) (m3/s)
P1: pressure in the analysis chamber (Pa)
P2: pressure in the sample chamber (Pa)

The outgas rate Qc in the chamber is an outgas rate measured when the test bearing 790 is not contained in the sample chamber 792 and determined according to the following formula (2) based on the measured value for the air pressure.

$$Qc = C(P2' - P1') \qquad (2)$$

in which P1', P2' are respectively a pressure in the analysis chamber and a pressure in the sample chamber measured respectively when the test bearing 790 is not contained.

Figure 32B:
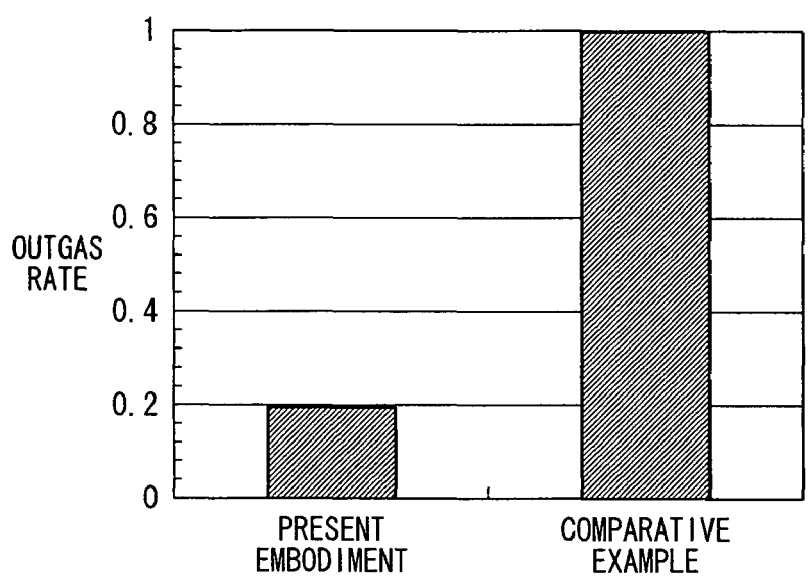

Further, for the result of the outgas rate test as shown in FIG. 32B, it has been found that the rate in this embodiment is outstandingly lower as about ⅕ compared with the comparative example. The outgas rate shown in FIG. 32B is indicated by a relative value based on the outgas rate of the comparative example being assumed as it is.

Figure 33:
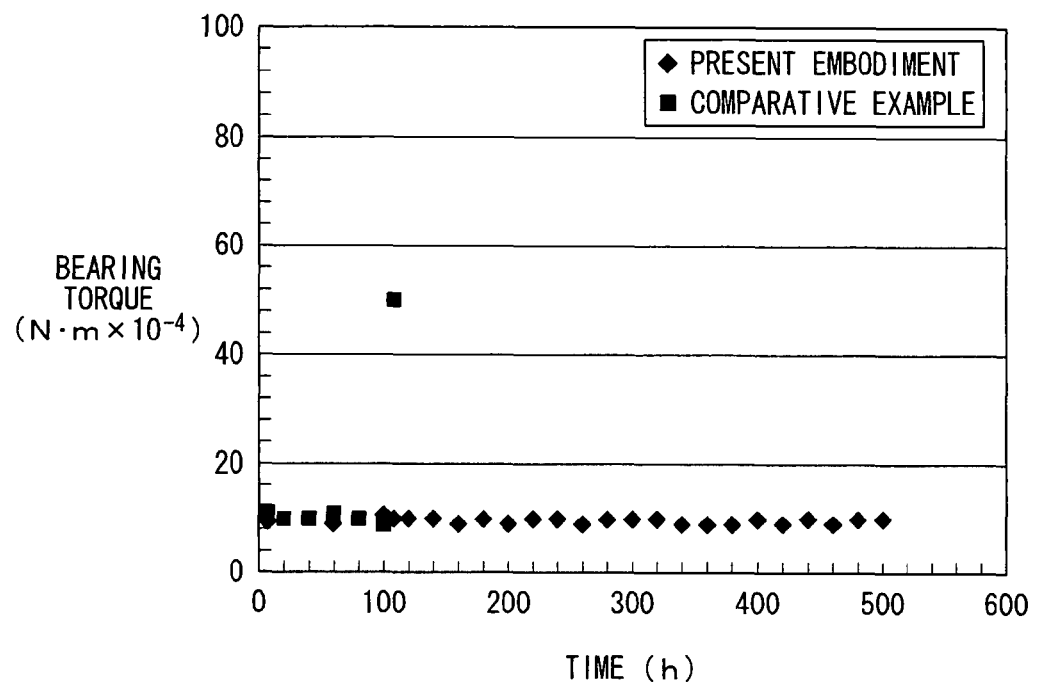
FIG. 33 is a graph showing the result of a torque endurance test.

Further, the test for the torque endurance is to be described. In the test for the torque endurance, the bearing rotation tester (manufactured by NSK Ltd.) shown in FIG. 31A was used in the same manner as in the test for the amount of dust scattering. The test bearing 750 was driven at a rotation speed of 1000 rpm and a load of 50N, and the torque of the test bearing 750 after lapse of a predetermined time was measured by using the minute load converter 760. For the result of the test for the torque endurance (in atmospheric air), as shown in FIG. 33, while the torque value increased remarkably about 100 hours after starting the test in the comparative example, the operation could be continued at a low torque value as it was with scarce change even after 500 hours in this embodiment.

The invention is not restricted only to the embodiment described above but various applications or modifications may be considered. For example, while the invention is applied to the deep groove ball bearing in this embodiment, the invention is applicable also to rolling bearings of other bearing types. Further, in addition to the rolling bearing, the invention is applicable in the same manner also to a linear motion bearing such as a linear guide or a linear bearing as shown in FIG. 34 and FIG. 35, or a ball screw shown in FIG. 36.

Figure 34:
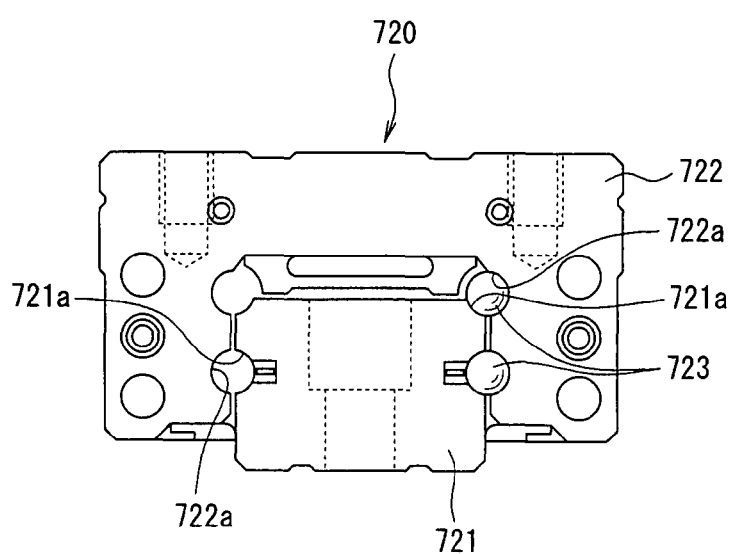
FIG. 34 is a view explaining a linear guide to which the invention is applied.
Figure 35:
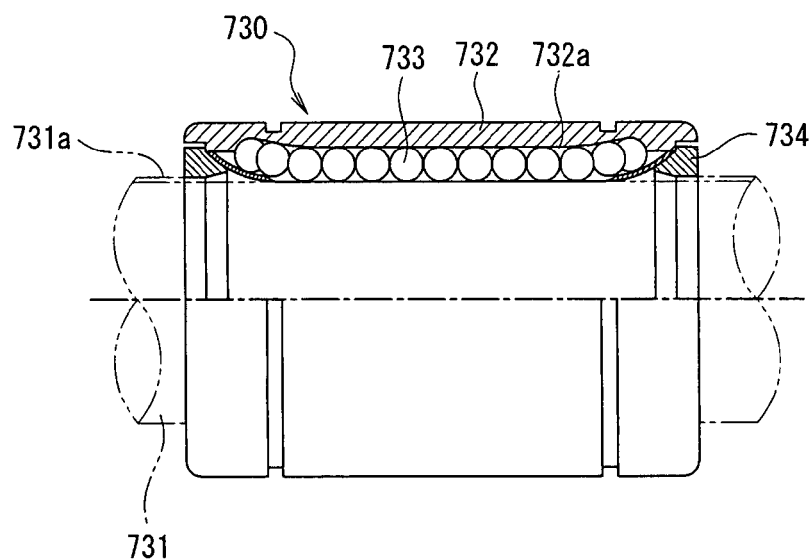
FIG. 35 is a view explaining a linear bearing to which the invention is applied.

FIG. 34 is a front elevational view of a linear guide (rolling device) 720 with an end cap being omitted. The linear guide 720 (bearing designation: LS20AL, manufactured by NSK Ltd.) includes a square guide rail (inner member) 721 having a rolling element rolling groove 721a of an arcuate cross section in the axial direction on both lateral surfaces and a slider (outer member) 722 having a substantially ⊐-shaped lateral cross sectional shape which rides over a guide rail 721 relatively movably in the axial direction.

Rolling element rolling grooves 722a of an arcuate cross section opposed to the rolling element rolling grooves 721a of the guide rail 721 are provided on both inner lateral surfaces of the slider 722, and a plurality of balls 723 as rolling elements (only partially illustrated) are rollingly loaded in a ball rolling linear space of a substantially circular cross section formed of the rolling element rolling groove 721a of the guide rail 721 and the rolling element rolling groove 722a of the slider 722.

The contact surface between the rolling element rolling groove 721a of the guide rail 721 and the ball 723, and the contact surface between the rolling element rolling groove 722a of the slider 722 and the ball 723 of the linear guide 720 correspond to the raceway surfaces of the inner and the outer rings of the rolling bearing 710 of the embodiment described above, and the ball 723 in the linear guide 720 corresponds to the ball 713 in the rolling bearing 710 of the embodiment described above. Accordingly, the surface roughness of the rolling element rolling grooves 721a, 722a, and the ball 723 are set respectively in the same manner as in the embodiment described above, and the identical lubrication films (not illustrated) are formed respectively in accordance with method described above. Accordingly, the linear guide 720 causes less dust scattering and outgas and is excellent in the durability.

Further, the linear bearing 730 shown in FIG. 35 includes a shaft (inner member) 731, an outer cylinder (outer member) 732 disposed to the outside of the shaft 731, a plurality of balls 733 loaded rollingly between the outer circumferential surface 731a of the shaft 731 and the inner diametrical surface 732a of the outer cylinder 732 in which the shaft 731 or the outer cylinder 732 moves relatively in the axial direction in accordance with the rolling movement of the balls 733. A stopper metal 734 is for blocking the movement along with rolling movement of the ball 733 for a predetermined distance or more.

In the linear bearing 730 described above, the outer circumferential surface 731a of the shaft 731 and the inner diametrical surface 732a of the outer cylinder 732 correspond to the raceway surfaces of the inner and the outer rings of the rolling bearing 710 in the embodiment described above, and the ball 733 in the linear bearing 730 corresponds to the ball 713 in the rolling bearing 710 of the embodiment described above. Accordingly, the surface roughnesses for the outer circumferential surface 731a, the inner diametrical surface 732a, and the ball 733 are set respectively in the same manner as in the embodiment described above, and identical lubrication films (not illustrated) are formed respectively in accordance with the method described above. Accordingly, the linear bearing 730 causes less dust scattering and the outer gas and is excellent in the durability.

Figure 36:
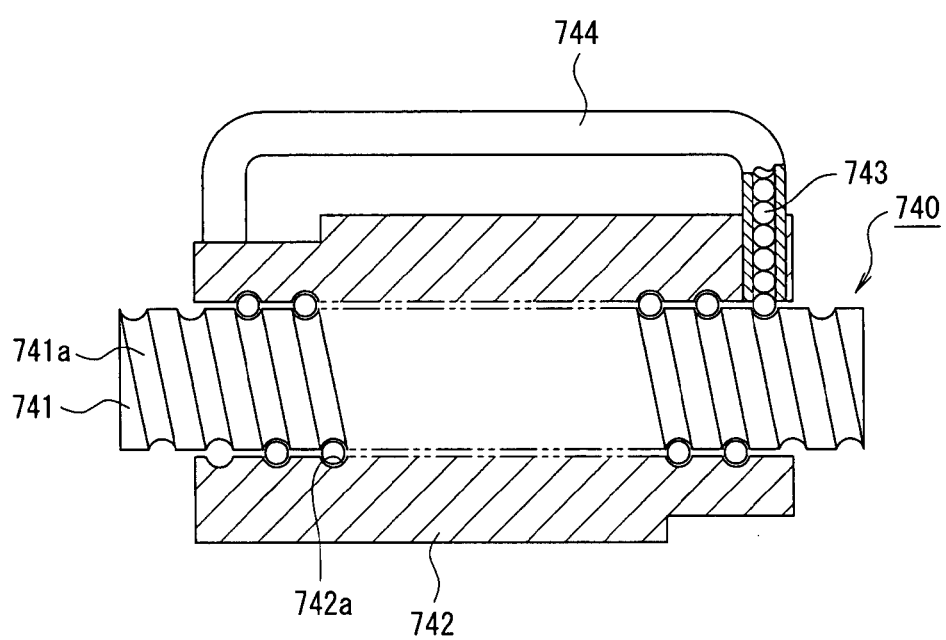
FIG. 36 is a view explaining a ball screw to which the invention is applied.

Further, a ball screw 740 shown in FIG. 36 includes a screw shaft (inner member) 741 having a spiral raceway groove at the outer circumferential surface, a nut (outer member) 742 having a spiral raceway groove at the inner circumferential surface, and a plurality of balls (rolling elements) 743 interposed rollingly between both of the raceway grooves, in which one of the screw shaft 741 or the nut 742 relatively moves linearly in the axial direction by the rotational operation of one of them. The balls 743 are in the form of rolling between the raceway groove 741a of the screw shaft 741 and the raceway groove 742b of the nut 742 and then circulating through a circulator tube 744 attached to the nut 742.

The surfaces of the raceway groove of the screw shaft 741 and the raceway groove of the nut 742 in the ball screw 740 correspond to the raceway surfaces of the inner and the outer rings 711, 712 in the rolling bearing 710 of the embodiment described above, and the ball 743 in the ball screw 740 correspond to the ball 713 in the rolling bearing 710 of the embodiment described above. Accordingly, the surface roughness for each the raceway groove of the screw shaft 741, the raceway groove of the nut 742, and the ball 743 is set respectively in the same manner as in the embodiment described above and identical lubrication films (not illustrated) are formed respectively in accordance with the method described above. Accordingly, the ball screw 740 causes less dust scattering and outgas and it is excellent in the durability.

Fifth Embodiment B

Difference from the Fifth Embodiment A is that a hydrocarbon lubrication oil is used instead of the fluoro-lubrication oil as the lubrication oil constituting the lubrication film in the invention. Description is to be made mainly for an oil plating treatment for the hydrocarbon lubrication oil and the lubricant containing the lubrication oil.

Figure 37:
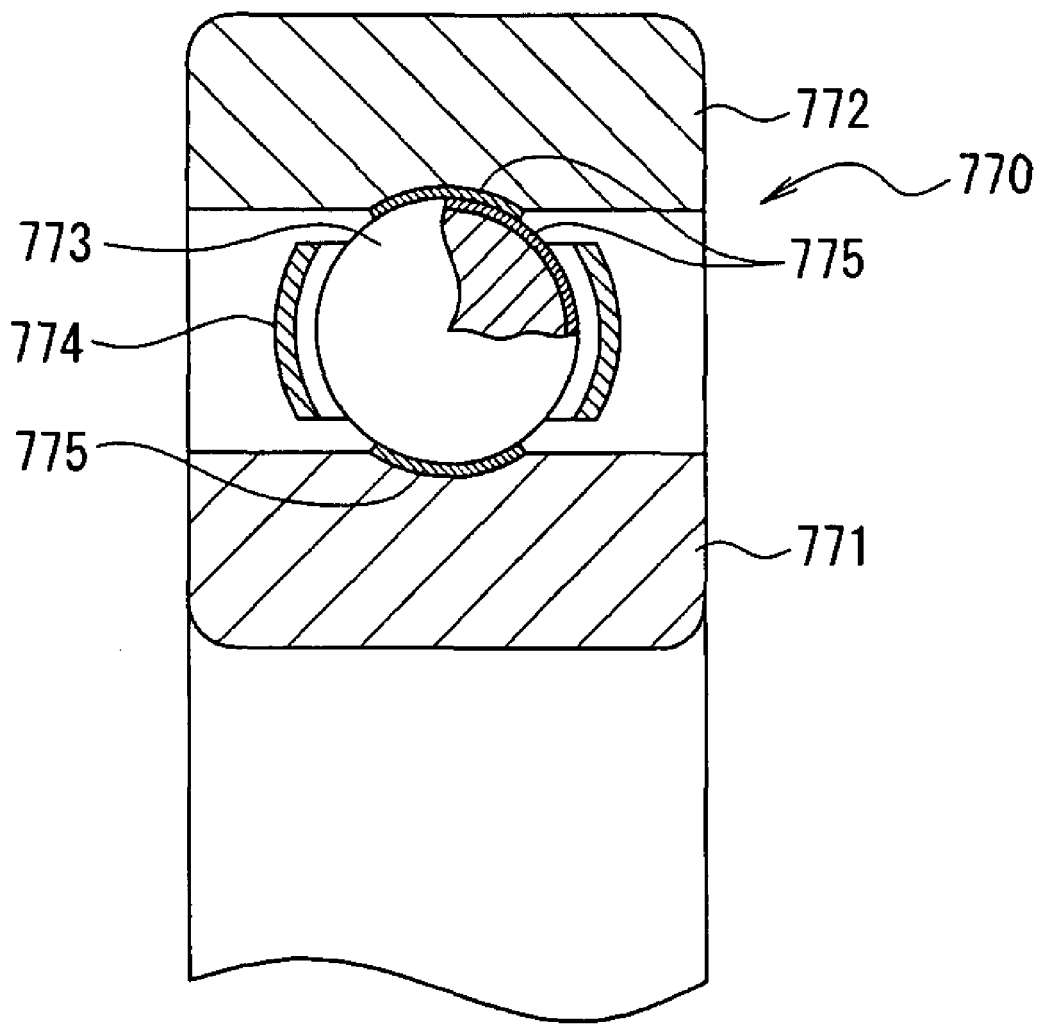
FIG. 37 is a cross sectional view of a rolling bearing of a Fifth Embodiment B formed with a lubrication film.

FIG. 37 is a cross sectional view while partially cutting a ball 773 as a rolling element of a rolling bearing (rolling device) 770 applied with an oil plating treatment using a lubricant containing a hydrocarbon lubrication oil and a fluoro-resin. The rolling bearing 770 of the Fifth Embodiment B has substantially the same constitution as the rolling bearing 710 shown in FIG. 29, which is different only with respect to the constituent material for a lubrication film 775 and the deposition state of the lubrication film 775. There are shown an inner ring by reference 771, an outer ring by 772, a ball by 773, and the cage by 774.

Figure 38A:
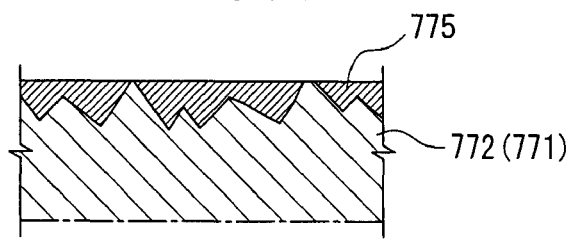
FIGS. 38A and 38B are enlarged schematic views showing the state of forming a lubrication film of the Fifth Embodiment B.
Figure 38B:
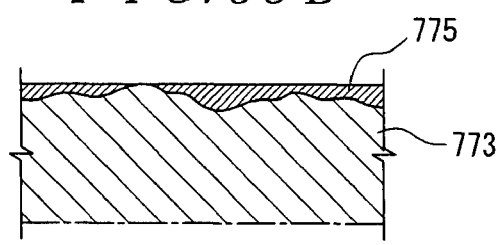

FIGS. 38A and 38B are enlarged schematic views showing the state of forming the lubrication film 775 to the raceway surface of the outer ring 772, the raceway surface of the inner ring 771, or the rolling contact surface of the ball 773, in which FIG. 38A shows the raceway surface of the outer ring 772 (inner ring 771) and FIG. 38B shows a rolling contact surface of the ball 773.

As shown in the drawing in this embodiment, the lubrication film 775 is formed to a position substantially identical with a crest line of the roughness at the surface to be formed with the lubrication film 775. For improving the durability, while it is desirable to cover the raceway surface, etc. with the lubrication film about to such an extent of exceeding the crest line of the roughness as in the Fifth Embodiment A, the lubrication film may also be formed to a position about equal with the crest line as in this embodiment. In this case, since the amount of the lubrication film is small, the dust scattering and the outgas are reduced further. In the drawing, while the lubrication film 775 is formed continuously in the raceway surface, etc., it may be formed discontinuously, for example, in an island shape.

Further, the centerline average roughness Ra for each of the raceway surface of the outer ring 772 and the raceway surfaces of the inner ring 771 of the rolling bearing 770 in this embodiment is 0.02 µm or more and 0.2 µm or less and, more preferably, 0.02 µm or more and 0.08 µm or less. The centerline average roughness Ra of the rolling contact surface of the ball 713 is 0.002 µm or more and 0.01 µm or less and, more preferably, 0.002 µm or more and 0.005 µm or less.

The lubricant forming the lubrication film 775 contains a fluoro-resin powder and a lubrication oil containing an alkylated cyclopentane or polyphenyl ether as the main ingredient which is in a so-called gel state.

The alkylated cyclopentane includes tri(2-octyldodecyl) cyclopentane. As tri(2-octyldodecyl)cyclopentane, for example, Synthetic Oil 2001A (trade name of products, manufactured by Nye Lubricants Co.) was marketed. Further, since alkylated cyclopentane such as tri-n-octylcyclopentane, tetra-n-octylcyclopentane, penta-n-octylcyclopentane, tri-n-nonylcyclopentane, penta-2-nonylcyclopentane, penta-n-decylcyclopentane, penta-n-dodecylcyclopentane, and tetra-2-ethylhexyl cyclopentane have a low vapor pressure at 20° C. of $1\times10^{-5}$ Pa or less (for example, $1\times10^{-7}$ to $1\times10^{-8}$ Pa), they can be used as the lubrication oil. By the use of the alkylated cyclopentane, the lubricant is scarcely evaporated even in a case of using the rolling device of the invention in vacuum.

As the polyphenyl ether, for example, phenyl ether synthesis oil of Matsumura Oil Research Corp., for example, can be used. Among them, pentaphenyl ether, tetraphenyl ether, monoalkyl tetraphenyl ether, dialkyl tetraphenyl ether, monoalkyl triphenyl ether, and alkyl diphenyl ether can be used suitably. Since the polyphenylethers have low vapor pressure and are also excellent in the heat resistance, they cause less outgas also in vacuum or under a high temperature circumstance.

Then, an example of the oil plating treatment with the lubricant of this embodiment is to be described. At first, the outer ring 772, the inner ring 771, the ball 773, and the cage 774 are assembled respectively into a completed state of the rolling bearing 770 and then a prepared dilution solution of the lubricant is injected by a necessary amount by means of a dropper or the like to a portion where the ball 773 is present between the outer ring 772 and the inner ring 771 after degreasing cleaning. Then, by rotating the rolling bearing 770 several times, the dilution solution is deposited to the rolling portion and the sliding movement portion of the outer ring 772, the inner ring 771, the ball 773, and the cage 774. Supply of the dilution solution may be conducted by coating or conducted by spraying using a spray. Alternatively, the dilution solution may be supplied also by dipping and then pulling up the assembled rolling bearing 770 into and out of a reservoir for the dilution solution.

The prepared lubricant comprises, for example, 60 mass % of Synthetic Oil 2001A (trade name) manufactured by Nye Lubricants Co. and 40 mass % of a PTFE powder with a grain size of 1 µm or less. The dilution solution for the lubricant is obtained by diluting the lubricant to 1 mass % with a dilution solvent such as hexane or Asahi clean AK-225 (manufactured by Asahi Glass Co.). As the fluoro-resin, a dry film RA/IPA manufactured by DuPont Co. in which PTFE was dispersed in the solvent was used.

Then, the entire rolling bearing 770 deposited with the dilution solution is heated to 100 to 140° C. for about 30 min, and the dilution solvent contained in the deposited dilution solution is removed. In this way, a lubrication film comprising the lubricant of this embodiment can be formed.

For the Fifth Embodiment B described above, a test for an amount of dust scattering and a test for a torque endurance were conducted, and description is to be made. In the test for the amount of dust scattering and the test for the torque endurance for a comparative example, a lubricant consisting only of a fluoro-lubrication oil having functional groups in the molecular structure, specifically, a fluorine-containing polymer having carboxyl groups at terminal ends of the molecular structure (FONBLIN Z DIAC) was constituted and used. Other conditions such as the kind of the dilution solvent, the oil plating treatment method or the constitution of the rolling bearing are identical with those described above in the Fifth Embodiment B. The dilution concentration of the dilution solution used for the oil plating treatment was set to 1% both for the example and the comparative example.

Further, the test bearing is a bearing designation 608 (inner diameter: 8 mm, outer diameter: 22 mm, width: 7 mm) manufactured by NSK Ltd. Further, the surface roughness of the raceway surfaces of the inner ring and the outer ring is set to 0.05 µm and the surface roughness Ra of the ball is set to 0.005 µm, respectively, and a lubrication film is formed to each of the surfaces by the oil plating treatment as described above. In the test bearing, the test for the amount of dust scattering was conducted by using the same tester as the bearing rotation tester (refer to FIG. 31A) used in the test for the amount of dust scattering in the Fifth Embodiment A and by the same method as the test for the amount of dust scattering in the Fifth Embodiment A. Further, test conditions are also identical, with the rotation speed of the test bearing 750 of 1000 rpm and a load of 50N.

Figure 39:
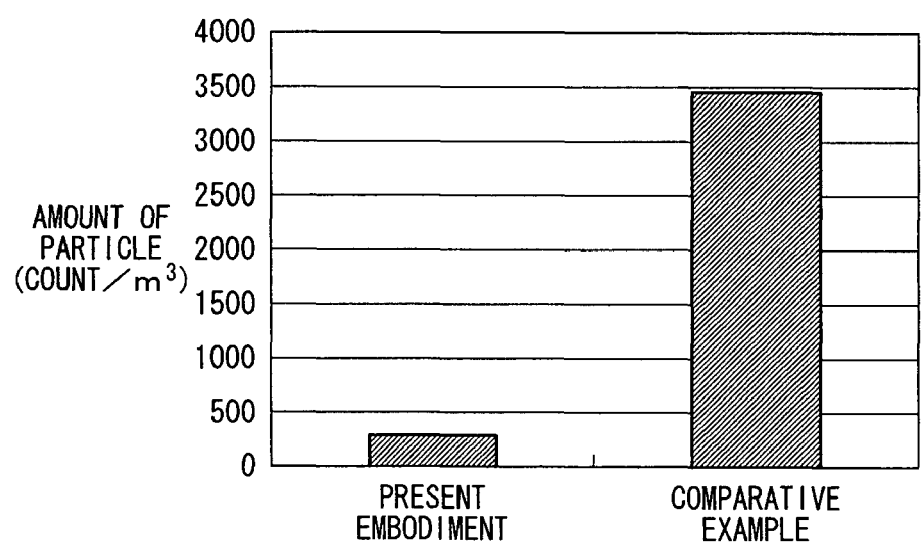
FIG. 39 is a graph showing the result of the test for amount of dust.

The test result is shown in the graph of FIG. 39. As shown in the graph, the amount of particle (count/m3) was at an extremely lower level in this embodiment as ¹/₁₀ or less compared with that in the comparative example.

Figure 40:
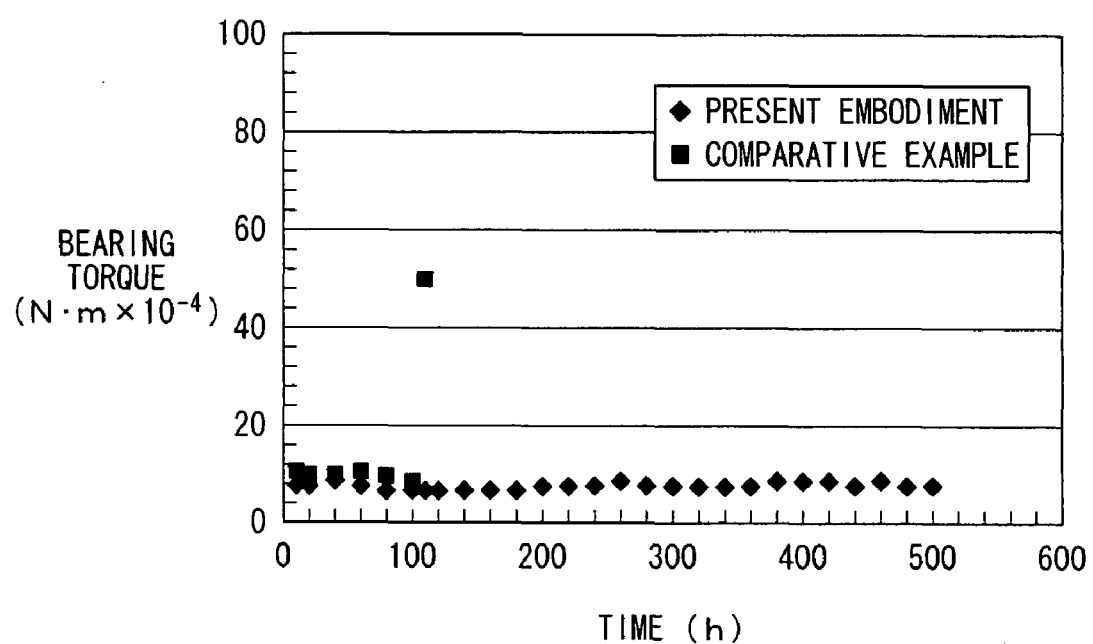
FIG. 40 is a graph showing the result of a torque endurance test.

Then, description is to be made to the torque endurance test conducted for the test bearing. Also in the torque endurance test, a bearing rotation tester shown in FIG. 31A was used in the same manner as in the test for the amount of dust scattering, the test bearing 750 was driven at a rotational speed of 1000 rpm and under a load of 50N, and the torque of the test bearing 750 after lapse of a predetermined time was measured by using a minute load converter 760. The test result is shown in the graph of FIG. 40.

As shown in the graph, while the torque value was increased remarkably about at a point exceeding 100 hours from the start of the test in the comparative example, it could be continued with no substantial change in this embodiment at a low torque value as it was even exceeding 500 hrs.

The invention is not restricted only to the Fifth Embodiment B and various applications or modifications may be considered. For example, as described also for the Fifth Embodiment A, the invention is applicable to the rolling bearings of the bearing type other than the deep groove ball bearing and, in addition to the rolling bearing, it is also applicable to liner motion bearings such as a linear guide or linear bearing as shown in FIG. 34 and FIG. 35, and a ball screw in FIG. 36.

Sixth Embodiment

This embodiment concerns a rolling support device such as a rolling bearing, a ball screw, and a linear guide, as a well as vacuum conveying apparatus. An inorganic hard film in this embodiment is suitable also as an underlayer for the lubrication film such as the DFO lubrication film in the First to Fifth Embodiments described above.

The application use of the linear guide includes apparatus used in a vacuum state for the inside such as a sputtering device, a plasma CVD device and an ion injection device as a portion of facilities for producing liquid crystal display panels, semiconductor devices, solar cell panels, and hard disk devices, as well as apparatus used under a clean circumstance. In the linear guide for such application use, as a guide rail and a slider, those formed of stainless steel (mainly SUS440C) and applied at the surface with quench hardening and tempering treatments are used and a fluoro-grease is used as the lubricant.

By the way, it has been known that the performance of products such as liquid crystal display panels, semiconductor devices, solar cell panels, and hard disk devices are deteriorated by the deposition of fine particles (obstacles) on the surface. In recent years, along with progress in the miniaturization and integration of the devices, it has been demanded to produce them under a circumstance of higher cleanliness in order to improve the yield. Further, along with increase in the speed of the linear guide used for conveying apparatus for improving the productivity of products, problems which did not come into question so far have become remarkable. Further, as it has been demanded for making the apparatus per se maintenance-free or making the maintenance period longer for decreasing the production cost in addition to the improvement of the yield, it has been demanded for the durability of the linear guide used in such apparatus.

For solving such a problem, JP2003-314572A proposes to provide a bearing with less dust scattering, lubricity and durability, by forming a hard film comprising a metal compound or the like to at least one of the inner ring raceway surface, the outer ring raceway surface and the rolling element raceway contact surface of a bearing for use in rotation introduction machines and coating the hard film with a lubrication film containing a fluoro-polymer having a functional groups and PFPE.

However, adhesion between the hard film and the lubrication film is not mentioned for the bearing described in the laid-open publication described above. When the lubrication film is defoliated from the hard film, the less dust scattering, the lubricity, and the durability are deteriorated. Accordingly, there is a room for the improvement in the bearing described in the laid-open publication with respect to the suitable use under a vacuum circumstance or under a clean circumstance.

In view of the above, a first subject of the invention is to provide a rolling support device capable of being used suitably even under a vacuum circumstance and a clean circumstance by improving the adhesion between the hard film and the lubrication film. Further, the invention has a second subject of reducing the dust scattering and improving the lubricity and the durability in a vacuum conveying apparatus used under a vacuum circumstance.

For solving such subjects, the invention provides a rolling support device including a first member and a second member having raceway surfaces opposed to each other, a third member disposed between the first member and the second member, in which one of the first member and the second member moves relatively to the other by rolling movement or sliding movement of the third member, wherein at least one of both raceway surfaces for the first member and the second member is formed of a metal, an inorganic hard film is formed by thermal spraying to the raceway surface, the inorganic hard film coated with a lubrication film, and the porosity of the inorganic hard film is 0.5 vol % or more and 10 vol % or less.

Then, since pores present in the inorganic hard film act as a lubricant reservoir and an anchor (reinforcing material), adhesion between the inorganic hard film and the lubrication film is improved. In this case, when the porosity of the inorganic hard film is less than 0.5% by volume, pores present in the inorganic hard film can no more act effectively as the lubricant reservoir and the anchor. In a case where the porosity exceeds 10.0% by volume, the inorganic hard film per se tends to be defoliated. A preferred range of the porosity is within a range of 1.0% by volume or more and 8.0% by volume or less and a more preferred range is 3.0% by volume or more and 5.0% by volume or less in the inorganic hard film.

The type of the thermal spraying includes a plasma spraying, a gas spraying, an arc spraying, a flame spraying, an ultrasonic flame spraying, a detonation flame spraying, and a low pressure plasma spraying. The kind of thermal spray materials include fine particles of gray alumina, white alumina, titania, chromia, alumina titania, spinnel, mullite zirconia-yttria, zirconia-magnesia, zirconia-calcia, zirconia-mullite, zirconia-silica, and cobalt blue. Other thermal spray materials include vanadium carbide, chromium carbide, tungsten carbide, tungsten carbide-cobalt-chromium, tungsten carbide-cobalt, boron carbide, zirconium carbide, titanium boride, molybdenum boride, zirconium boride, taitanium carbide-nickel, titanium nitride, zirconium nitride, silicon carbide, and silicon nitride alone or in combination.

The inorganic hard film formed by thermal spraying is roughened for the surface roughness and the surface sometimes acts as abrasives (polishing material) to wear the mating material. Accordingly, it is preferred to apply machining such as grinding after forming the inorganic hard film by thermal spraying thereby decreasing the surface roughness of the inorganic hard film to a predetermined value or less. For example, in a case where the rolling support device is a rolling bearing, a linear guide, a ball screw, or a linear bush, the surface roughness (Ra) of the inorganic hard film formed to at least one of both raceway surfaces is preferably controlled to 0.2 μm or less.

Further, the kind of metals forming at least one of both raceway surfaces of the first member and the second member includes martensitic stainless steels such as "SUS440C", "steel material with the alloy ingredient of C, 0.65 mass %, Cr: 13 mass %", and "steel material with the alloy ingredient of C, 0.45 mass %, Cr: 13 mass %, N: 0.14 mass %", austenitic stainless steels such as "SUS304" and "SUS316" and precipitation hardening stainless steels such as "SUS630". Further, it is preferred to work the material comprising the steel into a predetermined shape and then apply a hardening heat treatment or a diffusion treatment to harden the surface.

In the rolling support device of the invention, the inorganic hard film preferably comprises at least one of cemented carbide, cermets, and ceramics. Further, in the rolling support device of the invention, the thickness of the inorganic hard film is preferably 0.05 mm or more and 1 mm or less. In a case where the thickness of the inorganic hard film is less than 0.05 mm, no wear resistance can be provided to the rolling support device. On the other hand, in a case where the thickness of the inorganic hard film exceeds 1 mm, the inorganic hard film may possibly be fractured by internal stress in the inorganic hard film per se, as well as the film deposition cost increases. A preferred range for the thickness of the inorganic hard film is from 0.1 mm or more and 0.5 mm or less.

Further, in the rolling support device of the invention, the lubrication film preferably comprises a lubrication oil having a vapor pressure at 25° C. of 1×10-5 Pa. The kind of such lubrication includes fluoro-oil, polyphenyl ether oil, alkylated cyclopentane, silahydrocarbon oil, and ester oil. According to this, even when the rolling support device is used in a vacuum circumstance, since the lubrication oil constituting the lubrication film does not evaporate, the lubrication film is maintained over a long period of time on the upper surface of the inorganic hard film.

The fluoro-oil usable in the invention includes, for example, fluoro-polyether, polyfluoroalkyl and those having functional groups therein. The fluoro-polyether includes polymers with a number average molecular weight of 1,000 to 50,000 having a unit represented by the general formula: —CxF2X—O (X is an integer of 1 to 4) as a main repeating unit.

The polyfluoro alkyl includes those shown in the following chemical formula 16. Y shown in the chemical formula 16 is a functional group having high affinity to a metal and, preferably, epoxy group, amino group, carboxyl group, hydroxyl group, mercapto group, sulfone group, and ester group. The polyfluoroalkyl also includes those shown by the following chemical formula 17 and the chemical formula 18 in addition to those shown by the chemical formula 16.

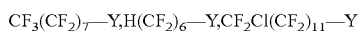

[Chemical formula 16]

[Chemical formula 17]

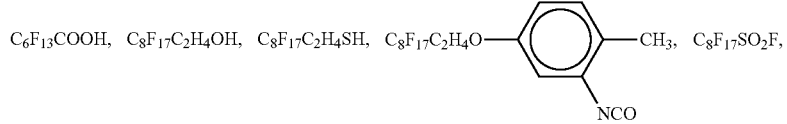

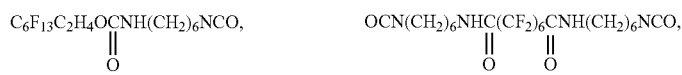

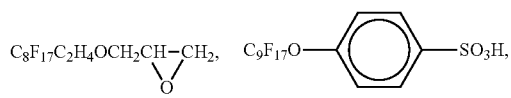

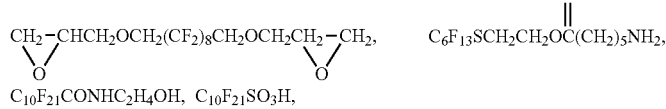

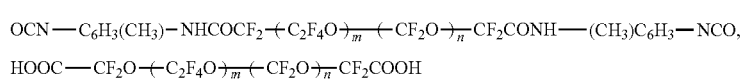

[Chemical Formula 18]

[Chemical formula 18]

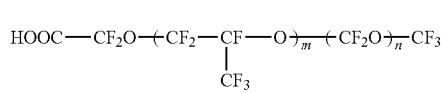

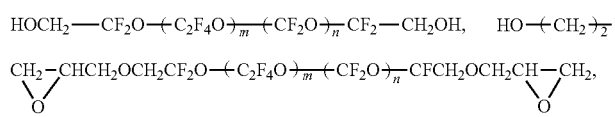

$H_2N(CH_2)_2NHCOCF_2O\!-\!\!(\!C_2F_4O\!)_m\!(\!CF_2O\!)_n\!CF_2CONH(CH_2)_2NH_2,$

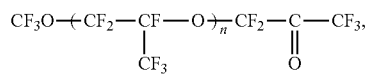

$F\!-\!(\!CF\!-\!CF_2\!-\!O\!)_n\!CF\!-\!COOCH_3$
 |   |
 $CF_3$  $CF_3$

Specific examples of the fluoro-oil having the functional groups described above include Krytox 157FSL, 157FSM, and 157FSH trade names of products manufactured by DuPont Co., Demnum modified products SA, SH, SY-3, SP trade names of products manufactured by Daikin Industries Ltd., FONBLIN Z-DEAL, Z-DLAC, Z-DISCO, Z-DOL, Z-DOLTX2000 trade names of products manufactured by Montecatini Co.

Further, specific examples of the perfluoro polyether (PFPE) as a kind of the fluoro polyether includes S-200, S-100, S-65 trade names of products manufactured by Daikin Industries Ltd., FONBLIN Z-25, Z-60, 40/11, trade names of products manufactured by Montecatini Co. and Krytox 16140, trade name products manufactured by DuPont Co. The polyphenyl ether oil usable in the invention includes pentaphenyl ether, tetraphenyl ether, monoalkyl tetraphenyl ether, dialkyl tetraphenyl ether, monoalkyl triphenyl ether, and alkyl diphenyl ether manufactured by Matsumura Oil Research Corp. Co. Since the polyphenyl ether oils have low vapor pressure and excellent heat resistance, they can be used suitably also under a vacuum circumstance or high temperature circumstance.

The alkylated cyclopentane usable in the invention includes, for example, tri(2-octyldodecyl)cyclopentane. Specific examples of tri(2-octyldodecyl)cyclopentane includes Synthetic Oil 2001A, trade name of products manufactured by Nye Lubricants Co. Further, other examples of the alkylated cyclopentane include tri-n-octylcyclopentane, tetra-n-octylcyclopentane, penta-n-octylcyclopentane, tri-n-nonylcyclopentane, penta-n-nonylcyclopentane, penta-n-decylcyclopentane, penta-n-dodecylcyclopentane, and tetra-2-ethylhexylcyclopentane. Since the alkylated cyclopentanes have low vapor pressure, they can be used suitably even under a vacuum circumstance.

The silahydrocarbon oil usable in the invention includes those polymers having a unit represented by the general formula of the following chemical formula (19) as a main repeating unit. R1 to R3 shown in the chemical formula (19) are hydrocarbon groups identical or different with each other and n represents an integer of 0 to 2. Specific examples of the silahydrocarbon oil include those shown by the following chemical formula 20.

[Chemical formula 19]

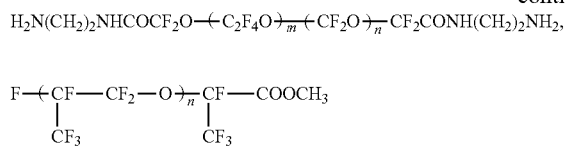

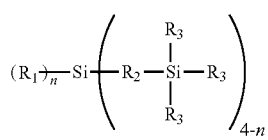

[Chemical formula 20]

The ester oil usable in the invention includes, for example, Nye Torr5101 manufactured by Nye Lubricants Co.

Further, in the rolling support device of the invention, the lubrication oil preferably contains particles (grain size from 0.3 to 5 μm) comprising the fluoro-resin. According to this, since particles comprising the fluoro-resin trap excessive lubrication oil which causes dust scattering, dust scattering from the rolling support device is decreased. The fluoro-resin usable in the invention includes, for example, polytetrafluoroethylene (PTPE), tetrafluoroethylene perfluorovinyl ether copolymer (PFA), and fluoroethylene propylene copolymer (FEP).

The method of forming the lubrication film includes, for example, a method of diluting or mixing a fluoro-oil with a fluoro-solvent to a predetermined concentration, adding a PTFE powder and dipping and pulling a member for disposing a lubrication film into and out of the solution. Further, it also includes a method of injecting a predetermined amount of the solution to the inside of the rolling support device and then operating the rolling support device. Further, the thickness of the lubrication film can be optionally controlled by the setting of the concentration, charging amount, etc. of the solution. Further, after forming the lubrication film, vacuum drying is applied preferably for removing volatile components.

Further, in the rolling support device of the invention, the thickness of the lubrication film is preferably 0.1 μm or more and 10 μm or less. In a case where the thickness of the lubrication film is less than 0.1 μm, no lubrication effect can be obtained. On the other hand, in a case where the thickness of the lubrication film exceeds 10 μm, the torque increases or the dust scattering increase due to the resistance of the lubrication film. A preferred range for the thickness of the lubrication film is 0.2 μm or more and 5 μm or less.

Further, the present invention provides a vacuum conveying apparatus including a conveying section provided with a surface to be guided, a conveying roller for guiding the conveying section by sliding movement on the surface to be guided and a rolling bearing for slidably supporting the conveyor roller to the surface to be guided wherein at least one of the surface to be guided and the sliding surface of the conveyor roller in sliding movement thereto is formed of a metal, inorganic hard films are formed to the surface to be guided and the sliding surface by thermal spraying, the inorganic hard film is coated with a lubrication film, the porosity of the inorganic hard film is 0.5% by volume or more and 10.0% by volume or less, and the raceway surface of the rolling bearing is covered with the lubrication film.

In the vacuum conveying apparatus, it is preferred that the inorganic hard film formed to at least one of the surface to be guided and the sliding surface of the conveyor roller is formed of least one of a cemented carbide, cermets, and ceramics in the same manner as the inorganic hard film used in the rolling support apparatus described above, and the thickness is 0.05 mm or more and 1 mm or less. Further, the surface roughness (Ra) of the inorganic hard film is, preferably, 1.6 μm or less, more preferably, 0.8 μm or less and, further preferably, 0.4 μm or less.

Further, it is preferred that the lubrication film covering the inorganic hard film formed to at least one of the surface to be guided and the sliding surface of the conveyor roller is formed of a lubrication oil having a vapor pressure at 25° C. of 1×10-5 Pa or less in the same manner as the lubrication film used in the rolling support device described above and that the thickness is 0.1 µm or more and 10 µm or less. In this case, the lubrication oil is preferably at least one of fluoro-oil, polyphenyl ether oil, alkylated cyclopentane, silahydrocarbon oil, and ester oil and, more preferably, those containing particles comprising a fluoro-resin in the same manner as the lubrication oil used in the rolling support device described above.

In the invention, "rolling support device" means a rolling bearing, a ball screw, a rolling linear guide, a sliding linear guide, and a linear bush. In a case where the rolling support device is the rolling bearing, the first member and the second member mean an inner ring and an outer ring and the third member means a rolling element. Further, in a case where the rolling support device is the ball screw, the first member and the second member means a screw shaft and a nut, and the third member means a rolling element. Further, in a case where the rolling support device is the rolling linear guide, the first member and the second member mean a guide rail and a slider, and the third member means a rolling element. Further, in a case where the rolling support device is a sliding linear guide, the first member and the second member mean a guide rail and a slider, and the third member means a sliding member. Further, in a case where the rolling support device is a linear bush, the first member and the second member mean a raceway shaft and an outer cylinder, and the third member means a rolling element.

According to the rolling support device of the invention, since an inorganic hard film with the porosity being specified by thermal spraying is formed to at least one of both raceway surfaces of the first member and the second member, and the inorganic hard film is further coated with the lubrication film, adhesion between the inorganic hard film and the lubrication film is improved. Accordingly, since the rolling support device of the invention is reduced with the dust scattering and improve with the lubricity and the durability, it can be used suitably also under a vacuum circumstance or under a clean circumstance.

Further, in the vacuum conveying apparatus of the invention, since the inorganic hard film with the porosity being specified by the thermal spraying is formed to at least one of the surface to be guided provided to the conveying section and the sliding surface of the conveyor roller in sliding movement therewith and, further, the inorganic hard film is coated with the lubrication film, adhesion between the inorganic hard film and the lubrication film is improved. Accordingly, the vacuum conveying apparatus of the invention is reduced for the dust scattering and improved in the lubricity and the durability.

A Sixth Embodiment is to be described with reference to the drawings.

Sixth Embodiment A

Figure 41:
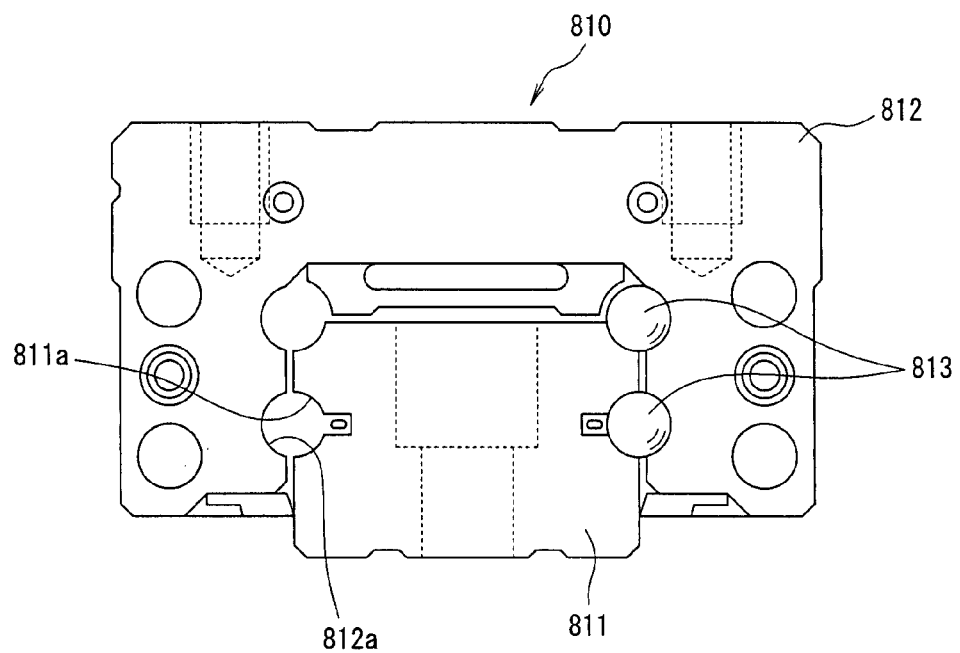
FIG. 41 is a view showing a linear guide as an example of a rolling support device of a Sixth Embodiment.

FIG. 41 is a linear guide as an example of a rolling support device of the invention. As shown in FIG. 41, a linear guide 810 includes a guide rail (first member) 811, a slider (second member) 812, and a plurality of balls (third member) 813. Then, it is adapted that the slider 812 conducts liner motion along the guide rail 811 by rolling movement of the plurality of balls 813 between the raceway groove (raceway surface) 811a formed to the guide rail 811 and the raceway groove (raceway surface) 812a formed to the slider 812.

In this embodiment, the guide rail 811 and the slider 812 were manufactured at first by fabricating a material comprising SUS440C into a predetermined shape and then applying quenching and tempering treatments. Then, a hard film comprising a WC-12% Co alloy (inorganic hard film) was formed such that the porosity is from 1 to 8% by volume and the thickness is 0.15 mm by a high velocity flame spraying to both of the raceway groove (raceway surface) 811a formed to a guide rail 811 and the raceway groove (raceway surface) 812a formed to the slider 812.

Figure 42:
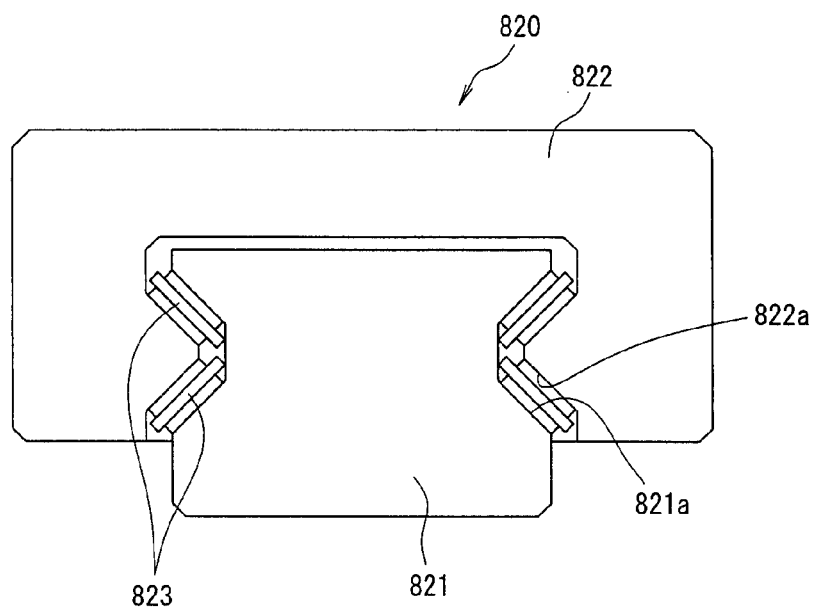
FIG. 42 is a view showing a linear guide as an example of rolling support device of the Sixth Embodiment.

Then, the surface roughness (Ra) of the hard film was set to 0.1 µm by polishing. Then, a lubrication film comprising a fluoro-oil containing 10% PTFE with a grain size of 0.3 to 5 µm was formed to a thickness of 1 µm by a dipping method so as to coat the hard film. Then, a linear guide was assembled by using the thus obtained guide rail 811, the slider 812, and the balls 813 made of silicon nitride. While description has been made to the rolling linear guide as the rolling support device in this embodiment, the invention may also be applied to a sliding linear guide 820 as shown in FIG. 42 in which a sliding member (third member) 823 is disposed between a raceway surface 821a formed to a guide rail (first member) 821 and a raceway surface 822a formed to a slider (second member) 822.

Figure 43:
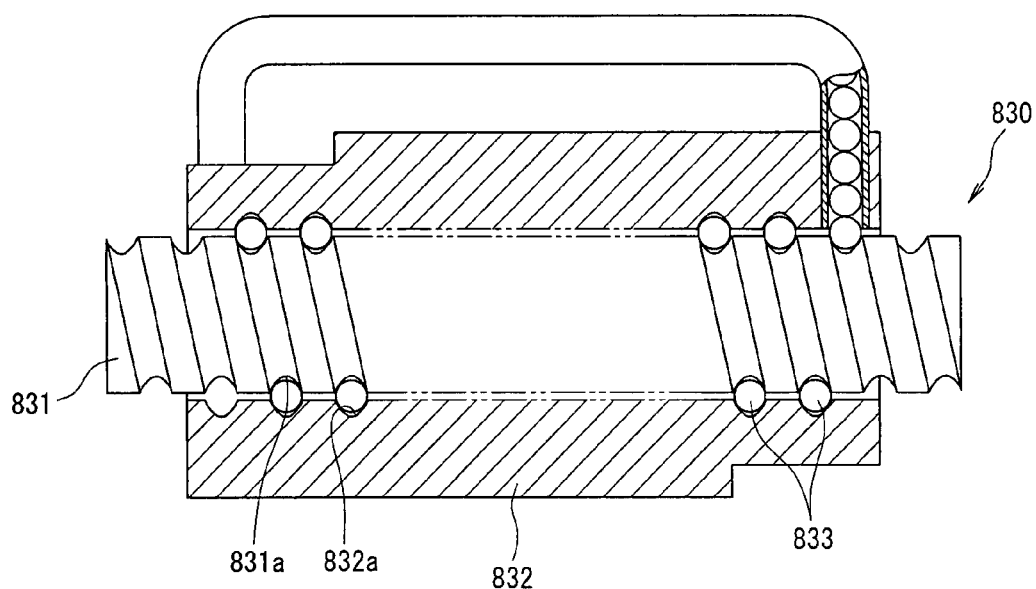
FIG. 43 is a view showing a ball screw as an example of the rolling support device of the Sixth Embodiment.
Figure 44:
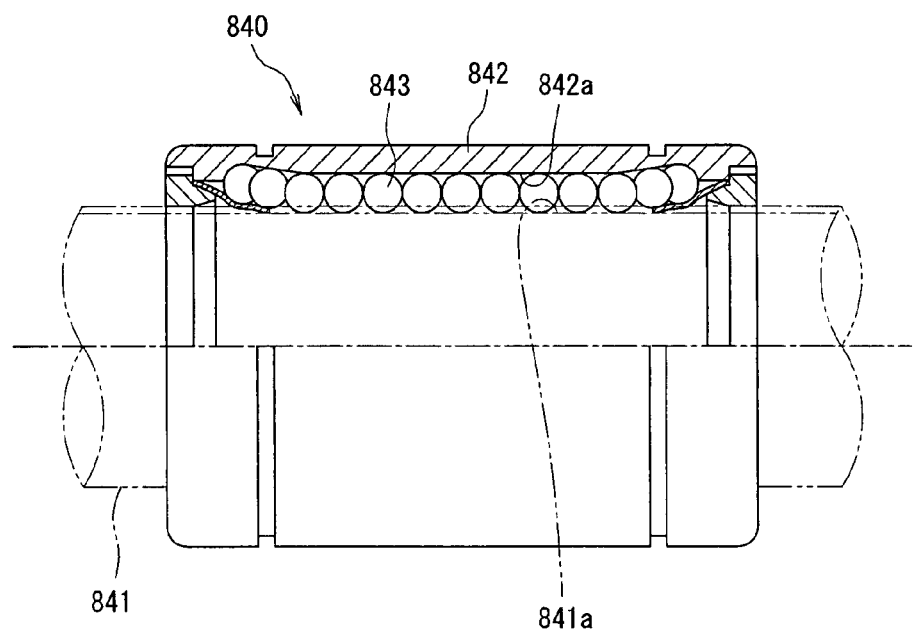
FIG. 44 is a view showing a linear bushing as an example of the rolling support device of the Sixth Embodiment.

Further, as shown in FIG. 43, the invention may also be applied to a ball screw 830 in which balls (third member) 833 are disposed between a raceway groove (raceway surface) 831a formed to a screw shaft (first member) 831 and a raceway groove (raceway surface) 832a formed to a nut (second member) 832, and the nut 832 moves linearly along a screw shaft 831. Further, as shown in FIG. 44, the invention may also be applied to a linear bush 840, in which balls (third member) 843 are disposed between a raceway groove (raceway surface) 841a formed to a raceway shaft (first member) 841 and a raceway groove (raceway surface) 842a formed to an outer cylinder (second member) 842, and adapted such that the outer cylinder 842 conducts linear motion along the raceway shaft 841.

Sixth Embodiment B

FIG. 45 is a cross sectional view showing a vacuum conveying apparatus as an example of a rolling support device of the invention. As shown in FIG. 45, the vacuum conveying apparatus includes a conveying section 850, a conveyor roller 860, a first rolling bearing 870, and a second rolling bearing 880. Then, the vacuum conveying apparatus is constituted to conduct film deposition to a substrate 850a by conveying a conveying section 850 to which a substrate 850a is set in the direction perpendicular to the sheet of the drawing in FIG. 45 and causing it to pass through a gas plasma discharge region.

The conveying section 850 includes a conveyor roller disposing portion 851 substantially of a C-shaped configuration provided with a conveyor roller 860 being disposed at the inside of the C-shaped portion, and a substrate disposing section 852 extending above the C-shaped portion and formed with a recess 852a for setting the substrate 850a. In the inner upper portion of the C-shaped portion of the conveyor roller disposing section 851, a groove portion (surface to be guided) 850A in sliding movement with the outer circumferential surface 860A of the ring-like conveyor roller 860 is formed. Further, both end faces (surface to be guided) 850B, 850C at the bottom of the C-shaped portion of the conveyor roller disposing section 851 are guided by the outer ring outer circumferential surfaces 880A of the second rolling bearing 880.

Figure 46:
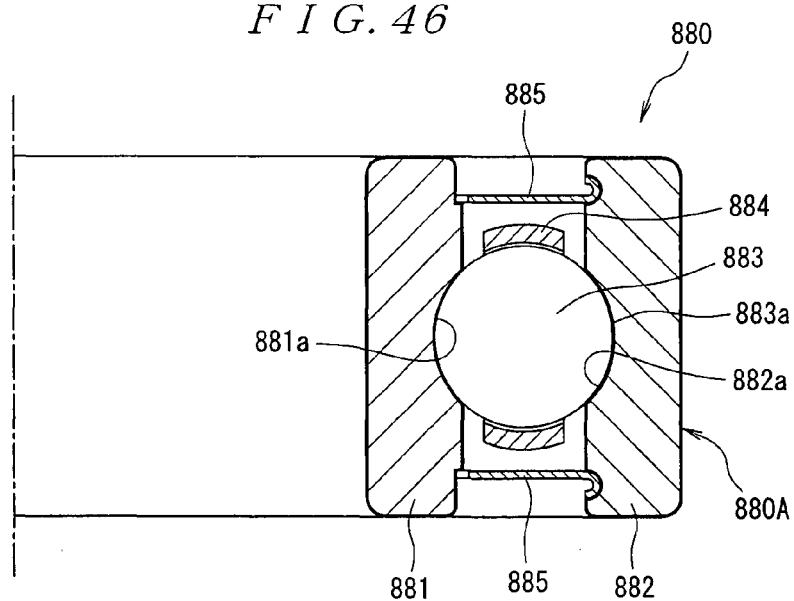
FIG. 46 is a view showing a second rolling bearing used in the vacuum conveying device shown in FIG. 45.

The first rolling bearing 870 has an inner ring 871, an outer ring 872, and balls 873. The inner circumferential surface 860B of the conveyor roller 860 is engaged with the outer ring outer circumferential surface 870A of the first rolling bearing 870. The first rolling bearing 870 supports the conveyor roller 860 such that the outer circumferential surface 860A of the conveyor roller 860 can move slidably with the surface to be guided 850A. As shown in FIG. 46, the second rolling bearing 880 has an inner ring 881, an outer ring 882, balls 883, a cage 884, and a shield plate 885. The outer ring outer circumferential surface 880A of the second rolling bearing 880 functions as a conveyor roller for guiding the conveying section 850.

That is, in the vacuum conveying apparatus, the outer circumferential surface 860A of the conveyor roller 860 moves slidably along the surface to be guided 850A provided in the conveying section 850 and the outer ring outer circumferential surface 880A of the second rolling bearing 880 guides the surfaces to be guided 850B, 850C provided in the conveying section 850, so that the conveying section 850 is conveyed. In this embodiment, the conveying section 850, the conveyor roller 860, the inner ring 871 and the outer ring 872 of the first rolling bearing 870, and the inner ring 881 and the outer ring 882 of the second rolling bearing 880 were manufactured by working a material made of SUS440C into a predetermined shape and then applying quenching and tempering treatments. Further, the balls 873 of the first rolling bearing 870 and the balls 883 of the second rolling bearing 880 were manufactured by a material comprising silicon nitride and a cage 884 of a second rolling bearing 880 is manufactured with a material comprising SUS304.

Then, after forming a hard film comprising a WC-12% Co alloy so as to have a porosity of 1 to 8% by volume and a thickness of 0.1 mm by a high velocity flame spraying to the surfaces to be guided 850A, 850B, 850C of the conveying section 850 and the outer circumferential surface 860A of the conveyor roller 860 and the outer ring outer circumferential surface 880A of the second rolling bearing 880, the surface roughness (Ra) of the hard film was reduced to 1.6 µm or less by polishing. Then, a lubrication film comprising a fluoro-oil containing a 10% PTFE powder of a grain size of 0.3 to 5 µm was formed to a thickness of 1 µm so as to coat the hard film by a dipping method.

Further, a lubrication film comprising a fluoro-oil containing a 10% PTFE powder was formed to a thickness of 1 µm to the inner ring raceway surface 881a and the outer ring raceway surface 882a of the second rolling bearing 880 by a dipping method. Then, a vacuum conveying apparatus was assembled by using the thus prepared conveying section 850, the conveying roller 860, the first rolling bearing 870, and the second rolling bearing 880.

The effect of the invention is to be demonstrated based on the example of the invention and the comparative example.

First Example

At first, a guide rail and a slider for use in a linear guide LS15AL (rail width: 15 mm, rail length: 400 mm) worked by NSK Ltd. were fabricated with a material comprising SUS440C each into a predetermined shape and then applying quenching and tempering.

Then, in Nos. 1 to 10 shown in Table 1, a hard film and a lubrication film were formed to at least one of both raceway grooves of the guide rail and the slider. Specifically, a hard film comprising a WC-12% Co alloy was formed to the raceway grooves so as to have a porosity within a range from 0.4 to 10.1% by volume and a thickness of 0.1 mm (100 µm) by a high velocity flame spraying to the raceway grooves. Then, the surface of the hard film was polished to decrease the surface roughness (Ra) to 0.2 µm or less. Then, so as to coat the hard film, a lubrication film comprising a fluoro-oil, or a lubrication film comprising a fluoro-oil containing a 10% of PTFE powder with a grain size of from 1 to 2 µm to a thickness of 1 µm (0.001 mm) by a dipping method.

On the other hand, in No. 11 shown in Table 1, a lubrication film comprising a fluoro-oil containing a 10% PTFE powder with a grain size of 1 to 2 µm was formed to a thickness of 1 µm by a dipping method to both of raceway grooves of the guide rail and the slider. A linear guide was assembled by using the thus obtained guide rail and the slider, and balls comprising the material shown in Table 1. Then, an endurance test was conducted while assuming that the linear guide is used under a vacuum circumstance ($1 \times 10^{-4}$ Pa). In the endurance test, a linear motion was conducted till damages were caused to the raceway groove for either the guide rail or the slider and the time for the motion from the start of the test to the occurrence of damages was defined as an endurance life. The results are also shown in Table 1 as a ratio based on the endurance life of No. 11 being assumed as 1.

TABLE 1

| | Constituting of linear guide | | | | | | | | |
|---|---|---|---|---|---|---|---|---|---|
| | Guide rail | | | Slider | | | | | |
| | | Lubrication film | | | Lubrication film | | | | |
| | Hard film | | Presence or | Hard film | | Presence or | | Endurance | |
| No. | Material | Porosity (vol %) | Material | absence of PTFE | Material | Porosity (vol %) | Material | absence of PTFE | Ball Material | test result (ratio) | Remarks |
| 1 | WC-12% Co | 3.0 | Fluoro-oil | present | WC-12% Co | 3.0 | Fluoro-oil | present | Silicon nitride | 3.3 | Example |
| 2 | | 3.0 | | present | | 3.0 | | present | SUS440C | 2.6 | |
| 3 | | 3.0 | | present | — | — | — | — | Silicon nitride | 2.4 | |
| 4 | — | — | — | — | WC-12% Co | 3.0 | Fluoro-oil | present | | 2.8 | |
| 5 | WC-12% Co | 3.0 | Fluoro-oil | absent | WC-12% Co | 3.0 | Fluoro-oil | absent | | 2.8 | |
| 6 | | 3.0 | | absent | | 3.0 | | absent | SUS440C | 2.3 | |
| 7 | | 3.0 | | absent | — | — | — | — | Silicon | 2.0 | |
| 8 | — | — | — | — | WC-12% Co | 3.0 | Fluoro-oil | absent | nitride | 2.4 | |
| 9 | WC- | 0.4 | Fluoro- | present | 12% Co | 0.4 | oil | present | Silicon | 0.8 | Comp. |

TABLE 1-continued

| | Constituting of linear guide | | | | | | | | | |
|---|---|---|---|---|---|---|---|---|---|---|
| | Guide rail | | | | Slider | | | | | |
| | Hard film | | Lubrication film | | Hard film | | Lubrication film | | | |
| No. | Material | Porosity (vol %) | Material | Presence or absence of PTFE | Material | Porosity (vol %) | Material | Presence or absence of PTFE | Ball Material | Endurance test result (ratio) | Remarks |
| 10 | 12% Co | 10.1 | oil | present | | 10.1 | | present | nitride | 0.3 | Example |
| 11 | — | — | Fluoro-oil | present | — | — | Fluoro-oil | present | SUS440C | 1 | |

As shown in Table 1, Nos. 1 to 8 in which the hard film and the lubrication film of the constitution of the invention (film deposition method, porosity) were formed to at least one of both raceway grooves of the guide rail and the slider had a long endurance life compared with Nos. 9, 10 formed with a hard film and a lubrication film out of the constitution of the invention.

Among Nos. 1 to 8, No. 1 and No. 5, No. 2 and No. 6, No. 3 and No. 7, and No. 4 and No. 8 are examples in which only the type of the lubrication film is changed between each of them. From the result, it has been found that examples formed with a lubrication film A comprising a fluoro-oil containing a PTFE powder has a longer endurance life than examples formed with a lubrication film B comprising a fluoro-oil not containing a PTFE powder.

On the other hand, in No. 9 formed with a hard film with the porosity being less than the range of the invention, since the pores present in the hard film could not effectively function as a lubrication reservoir and an anchor, the endurance life was short. Further, in No. 10 formed with a hard film with the porosity being more than the range of the invention, since the hardened film per se is defoliated, the endurance life was short. From the foregoing result, it can be found that the endurance life can be extended by forming a hard film and a lubrication film of the constitution of the invention to at least one of both raceway grooves of the guide rail and the slider even in a case of using the linear guide under a vacuum circumstance.

Second Example

At first, cylindrical rollers (outer diameter: 50 mm) and spherical roller (outer diameter: 50 mm, radius of curvature R for the spherical surface=100 mm) each having constitution shown in Table 2 were manufactured by working a material comprising SUS440 into a predetermined shape and then applying quenching and tempering treatments. In this case, the cylindrical roller had a constitution assuming the surface to be guided of the conveying section for use in vacuum conveying apparatus and the spherical roller had a constitution assuming the sliding surface of the conveyor roller for use in the vacuum conveying apparatus.

Then, a hard film and a lubrication film were formed to at least one of both outer circumferential surfaces of the cylindrical roller and the spherical roller in Nos. 21 to 25 shown in Table 2. Specifically, a hard film comprising a WC-12% Co alloy was at first formed such that the porosity was within a range from 0.4 to 10.1% by volume and the thickness was 0.1 mm (100 μm) by a high velocity flame spraying to the outer circumferential surface of them. Then, the surface of the hard film was polished to reduce the surface roughness (Ra) to 1.6 μm in the case of the cylindrical roller and 0.4 μm or less in the case of the spherical roller. Then, a lubrication film comprising a fluoro-oil, or a lubrication film comprising a fluoro-oil containing a 10% PTFE powder was formed to a thickness of 1 μm (0.001 mm) by a dipping method so as to coat the hard film.

A single row deep groove ball bearing #6201 manufactured by NSK Ltd. (outer diameter: 28 mm, inner diameter: 12 mm, width: 10 mm) was assembled to each of the outer circumferential surfaces of the cylindrical roller and the spherical roller obtained as described above. In this case, each of the inner ring, the outer ring, and the rolling elements of the deep groove ball bearing was prepared from a material comprising SUS440C and the cage was prepared from a material comprising SUS304. A lubrication film comprising a fluoro-oil was formed to both raceway surfaces of the inner ring and the outer ring to a thickness of 0.6 μm by a dipping method.

Figure 47A:
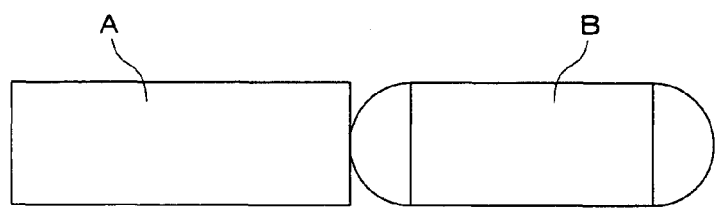
FIGS. 47A and 47B are views showing a 2-cylinder tester.
Figure 47B:
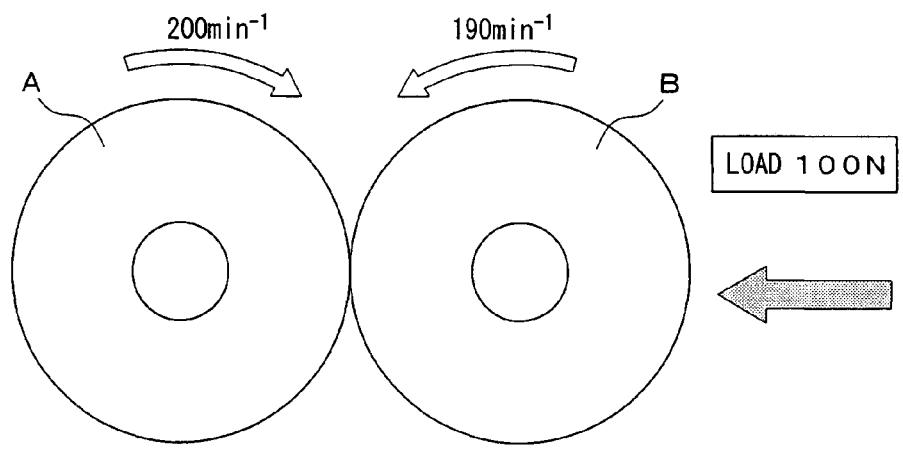

Then, as shown in FIGS. 47A and 47B, a two-cylinder tester was assembled by arranging a cylindrical roller A and a spherical roller B with each axis being aligned such that both outer circumferential surfaces thereof are in contact with each other. Then, the cylindrical roller A and the spherical roller B of each constitution were rotated under the following conditions to conduct a test for the amount of dust. In the test for the amount of dust, the number of generated particles of 0.2 μm or more was measured by a particle counter and the time from the start of the test till the number of the generated of particles of 0.2 μm or more reached 100 count/min was defined as a dust scattering life. The result is also shown in Table 2 based on the ratio for the dust scattering life of No. 26 being assumed as 1.

[Condition of the Test for the Amount of Dust]

Atmosphere: vacuum atmosphere ($1 \times 10^{-4}$ Pa)

Temperature: room temperature

Load: 100N

Rotational speed: (cylindrical roller) 200 $\text{min}^{-1}$ (spherical roller) 190 $\text{min}^{-1}$ Slippage between the cylindrical roller and the spherical roller: 10%

TABLE 2

| | Constitution of cylindrical roller | | | | Constitution of spherical roller | | | | |
|---|---|---|---|---|---|---|---|---|---|
| | Hard film | | Lubrication film | | Hard film | | Lubrication film | Result of test for | |
| No. | Material | Porosity (vol %) | Material | Presence or absence of PTFE | Material | Porosity (vol %) | Material | Presence or absence of PTFE | amount of dust (ratio) | Remarks |
| 21 | WC-12% Co | 3.0 | Fluoro-oil | present | WC-12% Co | 3.0 | Fluoro-oil | present | 3.2 | Example |
| 22 | 3.0 | oil | absent | 12% Co | 3.0 | oil | absent | 2.8 | |
| 23 | — | — | — | — | | 3.0 | | present | 2.2 | |
| 24 | WC-12% Co | 0.4 | Fluoro-oil | present | | 0.4 | Fluoro-oil | present | 1.2 | Comp. Example |
| 25 | 12% Co | 10.1 | oil | present | | 10.1 | oil | present | 0.2 | |
| 26 | — | — | — | — | — | — | — | — | 1 | |

As shown in Table 2, Nos. 21 to 23 in which a hard film and a lubrication film having the constitution of the invention (film deposition method, porosity) to at least one of both outer circumferential surfaces of the cylindrical roller and the spherical roller had longer dust scattering life compared with Nos. 24, 25 in which a hard film and a lubrication film out of the constitution of the invention were formed. Further, from the result of No. 21 and No. 22 which were different only with respect to the kind of the lubrication film, it has been found that No. 21 in which a lubrication film A comprising a fluoro-oil containing a PTFE powder was formed had a longer dust scattering life than No. 21 in which a lubrication film B comprising a fluoro-oil not containing a PTFE powder was formed.

On the other hand, No. 24 in which a hard film with the porosity being less than the range of the invention was formed, since pores present in the hard film could not function effectively as the lubrication reservoir and the anchor, the dust scattering life was short. Further, No. 25 in which a hard film with the porosity higher than the range of the invention was formed, since the hard film per se was defoliated, the dust scattering life was short. From the result described above, it can be seen that the dust scattering life of the vacuum conveying apparatus can be extended by forming the surface to be guided in the conveying section for use in the vacuum conveying apparatus with the same constitution as the cylindrical rollers for Nos. 21 to 23 and forming the sliding surface of the conveyor roller for use in the vacuum conveying apparatus with the same constitution as the spherical roller of Nos. 21 to 23.

Seventh Embodiment

The present invention concerns a rolling bearing and a manufacturing method thereof. Further, it relates to a cleaning method suitable as a pre-treatment to be applied to a portion forming a lubrication film such as a DFO lubrication film in the first to Sixth Embodiments described above.

Since the hydrocarbon compounds, etc., when evaporized from parts of semiconductor production apparatus, contaminates semiconductor wafers to lower the production yield, it has been demanded for rolling bearings used in semiconductor production apparatus, etc. that the evaporation amount of the hydrocarbon compound, etc. is small. In view of the above, in recent years, cleaning with an organic solvent or plasma cleaning is conducted intensely in order to decrease evaporating ingredients such as hydrocarbon compounds deposited to rolling bearings or clean the surface of the bearings.

However, in the cleaning with the organic solvent, it was difficult to completely remove as far as those intruded into the fine roughness on the surface, among processing oils and anti-rusting oils deposited to rolling bearings. Further, an organic solvent used for cleaning can not possibly be eliminated completely from the rolling bearing.

Accordingly, hydrocarbon compounds such as processing oils, anti-rusting oils, and organic solvents are remain in a considerable amount to the surface of the rolling bearing and when they are used in the semiconductor production apparatus, they are evaporated from the rolling bearing to sometimes contaminate semiconductor wafers.

In view of the above, it is a subject of the invention to solve the problems involved in the prior art described above and provide a rolling bearing with less evaporation amount of evaporating ingredients, as well as a method of manufacturing such a rolling bearing.

For solving the subject described above, the invention has the following constitution. That is, the rolling bearing according to the invention has a feature in a rolling bearing including an inner ring, an outer ring, and a plurality of rolling elements disposed rollingly between the inner ring and the outer ring in that the amount of hydrocarbon compounds with the number of carbon atoms of 25 or less deposited on the surface is restricted to 0.5 ng/mm$^2$ or less.

Further, the method of manufacturing a rolling element according to the invention has a feature in manufacturing a rolling bearing including an inner ring, an outer ring, and a plurality of rolling elements disposed rollingly between the inner ring and the outer ring, in that bearing parts including the inner ring, the outer ring, and the rolling elements are cleaned with at least one of organic solvents, alkalis and acids after the completion of assembling and, further, cleaned with pure water with an electrical resistivity of 5 MΩ·cm or more.

The present inventors have made an earnest study for solving the foregoing subjects and, as a result, have found that the hydrocarbon compounds tend to be evaporated more as the number of carbon atom is smaller and tend to be less evaporated as the number of carbon atoms is larger, and a hydrocarbon compound having such a volatility as giving undesired effects on semiconductor wafers are hydrocarbon compounds with the number of carbon atoms of 25 or less. Then, it has been found that in the case where the amount of the hydrocarbon compounds with the number of carbon atoms of 25 or less deposited to the surface of the rolling bearing is restricted to 0.5 ng/mm$^2$ or less, they give less undesired effects on the semiconductor wafers.

Further, it has also be found that oil components deposited to the rolling bearing and intruded to the fine roughness on the surface are also removed, and detergents such as organic solvents, alkalis, and acids used for cleaning the oil components are also removed by conducting cleaning using pure water having an electrical resistivity of 5 MΩ·cm or more as the detergent.

The rolling bearing according to the invention shows less evaporation amount of the evaporating ingredient. Further, according to the method of manufacturing the rolling bearing of the invention, a rolling bearing with less evaporating amount of evaporation ingredients can be manufactured.

Figure 48:
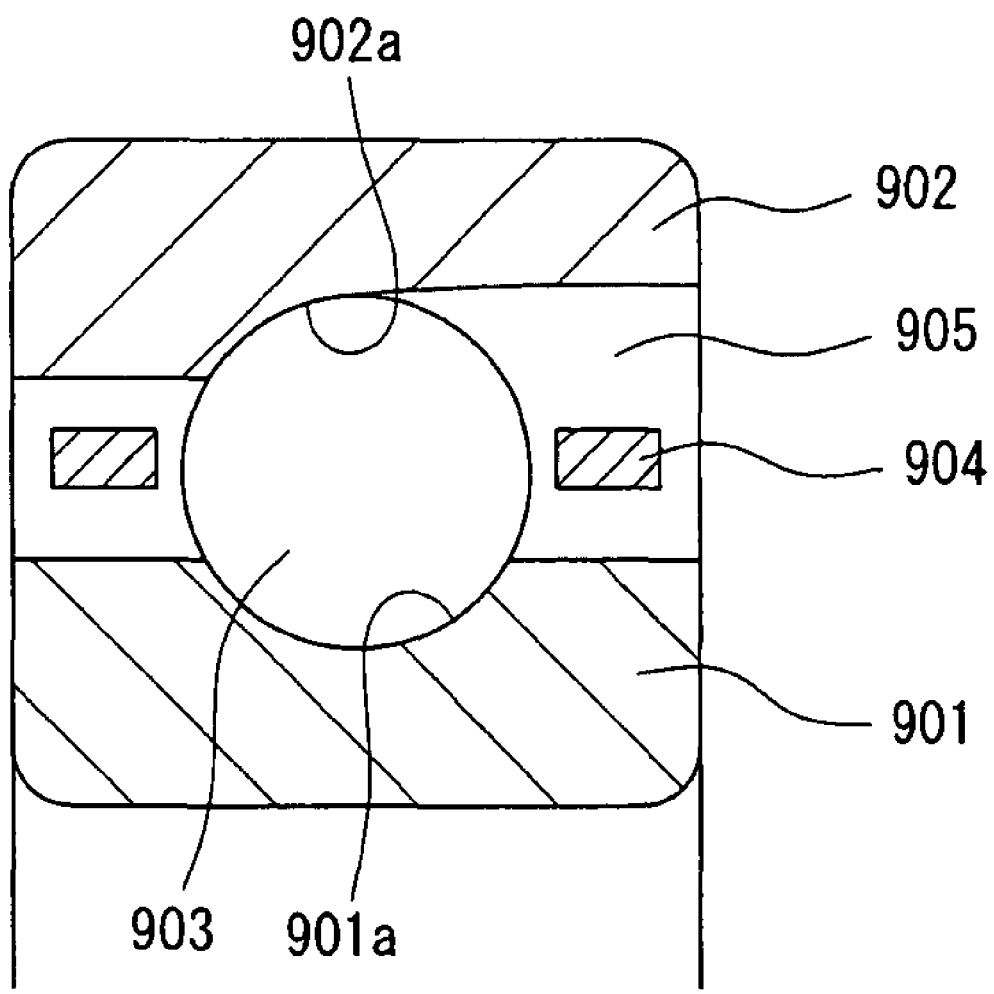
FIG. 48 is a fragmentary longitudinal cross sectional view showing the structure of an angular ball bearing as an example of a rolling bearing according to a Seventh Embodiment.

An embodiment of a rolling bearing and a manufacturing method thereof according to the invention are to be described specifically with reference to the drawings. FIG. 48 is a fragmentary vertical cross sectional view showing a structure of an angular contact ball bearing as an embodiment of a rolling bearing according to the invention. The angular contact ball bearing in FIG. 48 includes an inner ring 901 having a raceway surface 901a at an outer circumferential surface, an outer ring 902 having a raceway surface 902a at an inner circumferential surface, a plurality of rolling elements 903 disposed rollingly between both of the raceway surfaces 901a and 902a, a cage 904 for retaining rolling elements 903 between both of the raceway surfaces 901a and 902a, and a lubricant (not illustrated) disposed in a clearance 905 formed between the inner ring 901 and the outer ring 902 with the rolling element 903 being disposed therein.

The angular contact ball bearing is obtained by manufacturing and assembling the inner ring 901, the outer ring 902, the rolling element 903, and the cage 904 as the bearing parts respectively, then conducting cleaning for oil components, etc. and filling the lubricant in the clearance 905. The cleaning is conducted divisionally in two stages. At first, in the primary cleaning, oil components such as processing oils; anti-rusting oils, etc. deposited on the surface of the rolling bearings (that is on the surface of bearing parts) are removed by using hydrocarbon organic solvents such as petroleum benzine, kerosene, fron substitution cleaning oils, hexane, etc. An acid or alkali may also be used instead of the organic solvent.

Among the oil components deposited to the surface of the rolling bearing, those intruded into the fine roughness on the surface cannot sometimes be removed completely by the primary cleaning. Further, the organic solvent used in the primary cleaning may sometimes remain in the rolling bearing. Then, the remaining oil components or organic solvents are removed by using pure water with an electrical resistivity of 5 MΩ·cm or higher. Pure water with the electrical resistivity of 5 MΩ·cm or higher is excellent in the cleaning property and, in addition, has no worry of contaminating the rolling bearing by the used pure water per se.

Further, while the grease composition or lubrication oil is used as the lubricant, a less evaporating base oil is used therefor. The less evaporating base oil includes hydrocarbon compounds with the number of carbon atoms of 26 or more (preferably, number of carbon atoms of 30 or more) and, specifically, they include alkyl cyclopentane, fluoro-oil, ester oil, ether oil, etc. with the number of carbon atoms of 26 or more (more preferably, number of carbon atoms of 30 or more). In a case where the lubricant is a grease composition, polytetrafluoroethylene resin, urea resin, metal soap, etc. are used as a thickener.

Since the angular contact ball bearing of this embodiment is applied with such cleaning, the amount of the hydrocarbon compounds with the number of carbon atoms of 25 or less deposited to the surface of the rolling bearing is reduced to 0.5 ng/mm2 or less. Further, since the lubricant having the base oil as described above is used, there are scarce evaporating ingredients from the lubricant. Accordingly, since the amount of the evaporating ingredients evaporated from the rolling bearing is small, it gives less undesired effects on semiconductor wafers in a case of use for semiconductor production apparatus.

Further, in a case of forming a lubrication film comprising a lubricant by an oil plating treatment, grease plating treatment, etc. to a portion requiring lubrication such as a raceway surface of a rolling device, for example, a rolling bearing, it is preferred to clean the portion to be treated before forming the lubrication film and it is preferred to clean the portion to be treated by the cleaning method described above. Then, since the portion to be treated can be made extremely clean, this is preferred for forming the lubrication film.

This embodiment shows an example of the invention and the invention is not restricted to this embodiment. For example, while description has been made in this embodiment for the angular contact ball bearing as an example of the rolling bearing, the invention is applicable to various other types of rolling bearings. For example, they include radial type rolling bearings such as a deep groove ball bearing, a self-aligning ball bearing, a cylindrical roller bearing, a tapered roller bearing, a needle roller bearing, and a self-aligning roller bearing, and thrust type rolling bearing such as a thrust ball bearing and a thrust roller bearings.

Example

The present invention is to be described more specifically below showing examples. Four types of angular contact ball bearings having the same constitution as the angular contact ball bearing in FIG. 48 as described above excepting that the cleaning method and the kind of the lubricant are different were provided (refer to Table 3) and the evaporation amount of the hydrocarbon compounds with the number of carbon atoms of 25 or less were measured.

TABLE 3

| | | Detergent | | Kind of | |
| | | Primary cleaning | Secondary cleaning[1] | the Lubricant | Deposition amount[2] |
|---|---|---|---|---|---|
| Example | 1 | Alkali | Pure water (6 MΩ·cm) | Grease A | 0.45 |
| | 2 | Organic solvent | Pure water (10 MΩ·cm) | Grease A | 0.40 |
| Comp. Example | 1 | Organic solvent | Pure water (4.5 MΩ·cm) | Grease A | 0.60 |
| | 2 | Alkali | Pure water (6 MΩ·cm) | Grease B | 5 or more |

[1] numerical values in brackets each represents electrical resistivity of pure water used
[2] amount of hydrocarbon compound with the number of carbon atoms of 25 or less deposited to the surface of the angular contact ball bearing, at a unit of ng/mm2

The measuring method is as described below. An angular contact ball bearing was placed in a container of an outgas capturing apparatus HM-04II, manufactured by Japan Analytical Industry Co., Ltd. and while heating at 200° C., a purge gas was supplied at a flow rate of 20 mL/min and evaporation ingredients were evaporated for 60 min. Then, the purge gas containing the evaporation ingredients was captured, and analyzed in a gas chromatograph to measure the amount of hydrocarbon compounds with the number of carbon atoms of 25 or less. As a standard sample, anthrathene (number of carbon atoms of 14) was used.

Then, assuming that all of the detected hydrocarbon compounds with the number of carbon atoms of 25 or less were deposited to the surface of the angular contact ball bearing, the deposition amount per unit area (unit: ng/mm2) was calculated. The result is shown in Table 3. The lubricant used for the bearings in Examples 1, 2 and Comparative Example 1 was fluoro-grease YVAC3 for use in vacuum manufactured by Solvay Solexis Co. which is indicated as grease A in Table 3. Further, the lubricant used for the bearing of Comparative Example 2 was fluoro-grease KPM for use in atmospheric pressure manufactured by NSK Ltd., which is indicated as grease B in Table 3.

As can be seen from Table 3, since the bearings of Examples 1, 2 were put to primary cleaning by using the alkali or the organic solvent as the detergent and then put to secondary cleaning by using pure water with an electrical resistivity of 5 MΩ·cm or higher as the detergent, and a lubricant using, as a base oil, a hydrocarbon compound with the number of carbon atoms of 26 or more is used, the amount of the hydrocarbon compounds with the number of carbon atoms of 25 or less deposited to the surface of the bearing was 0.5 ng/mm2 or less.

On the contrary, in the bearing of Comparative Example 1, while a lubricant having the hydrocarbon compound with the number of carbon atoms of 26 or more as the base oil is used, since the secondary cleaning is conducted by using pure water with an electrical resistivity of lower than 5 MΩ·cm as the detergent, the amount of the hydrocarbon compound with the number of carbon atoms of 25 or less deposited on the surface of the bearing exceeded 0.5 ng/mm2. Further, while the bearing of Comparative Example 2 was put to the secondary cleaning using pure water with the electrical resistivity of 5 MΩ·cm or higher as the detergent, since it had a lubricant of using a base oil containing hydrocarbon compounds with the number of carbon atoms of 25 or less, the amount of the hydrocarbon compounds with the number of carbon atoms of 25 or less deposited to the surface of the bearing exceeded 0.5 ng/mm2.

The rolling bearing of the invention can be used suitably, for example, in semiconductor production apparatus for which less evaporation amount of evaporation ingredients is demanded.

INDUSTRIAL APPLICABILITY

The thin-wall bearing according to the invention can be used suitably, for example, to manipulators, etc. for use in semiconductor production apparatus.

The invention claimed is:

1. A thin-wall bearing comprising:
   an inner ring;
   an outer ring;
   a plurality of rolling elements disposed rollingly between the inner ring and the outer ring; and
   a cage comprising:
      pockets for rollingly retaining the rolling elements;
      at least one plate-like member made of a resin disposed circularly along the inner ring and the outer ring; and
      a chamfered portion arranged at a circumferential end of each of said at least one plate-like member,
   wherein a formula of $(D-d)/d \leqq 0.187$ is satisfied where D is an outer diameter of the thin-wall bearing and d is a an inner diameter of the thin-wall bearing,
   wherein each of said at least one plate-like member is disposed with both plate surfaces being directed to the inner ring and the outer ring, respectively, and the chamfered portion is formed such that thickness of each of said at least one plate-like member is gradually reduced toward the circumferential end, and
   wherein a corner formed between a circumferential end face and the chamfered portion is neither in contact with the inner ring nor the outer ring during rotation of the thin-wall bearing.

2. The thin-wall bearing according to claim 1, wherein the chamfered portion is a curved surface shape.

3. The thin-wall bearing according to claim 1, wherein the chamfered portion is a planar shape.

4. The thin-wall bearing according to claim 3, wherein the corner formed at the boundary between the plate surface and the chamfered portion of the plate-like member or the chamfered portion is in contact with the inner ring or the outer ring.

5. The thin-wall bearing according to claim 1, wherein at least one of the raceway surface of the inner ring, the raceway surface of the outer ring, and the rolling contact surface of the rolling element is covered with at least one of the following three kinds of lubrication films:
   (1) A lubrication film containing a fluorine-containing polymer having functional groups and a perfluoro polyether
   (2) A lubrication film containing a fluorine-containing polymer having functional groups, a perfluoro polyether and a fluoro resin
   (3) A lubrication film containing a lubrication oil comprising an alkylated cyclopentane or a polyphenyl ether as a main ingredient and a fluoro resin.

6. The thin-wall bearing according to claim 1, wherein a sum of a circumferential length of said at least one plate-like member is substantially equal to a circumferential length of a thin-wall bearing.

* * * * *